US012593379B2

(12) United States Patent
Pang

(10) Patent No.: US 12,593,379 B2
(45) Date of Patent: Mar. 31, 2026

(54) DISPLAY APPARATUS

(71) Applicant: HISENSE VISUAL TECHNOLOGY CO., LTD., Qingdao (CN)

(72) Inventor: Zhenhua Pang, Qingdao (CN)

(73) Assignee: HISENSE VISUAL TECHNOLOGY CO., LTD., Qingdao (CN)

(*) Notice: Subject to any disclaimer, the term of this patent is extended or adjusted under 35 U.S.C. 154(b) by 73 days.

(21) Appl. No.: 18/895,335

(22) Filed: Sep. 24, 2024

(65) Prior Publication Data

US 2025/0016897 A1 Jan. 9, 2025

Related U.S. Application Data

(63) Continuation of application No. PCT/CN2022/121412, filed on Sep. 26, 2022.

(30) Foreign Application Priority Data

Apr. 19, 2022 (CN) ......................... 202210412214.4
Apr. 20, 2022 (CN) ......................... 202210415138.2
Apr. 21, 2022 (CN) ......................... 202210421396.1

(51) Int. Cl.
*H05B 45/14* (2020.01)
*H05B 45/385* (2020.01)
*H05B 45/46* (2020.01)

(52) U.S. Cl.
CPC ........... *H05B 45/14* (2020.01); *H05B 45/385* (2020.01); *H05B 45/46* (2020.01)

(58) Field of Classification Search
CPC ...... H05B 45/14; H05B 45/385; H05B 45/46; H05B 45/30; H05B 45/37; H05B 45/382; G09G 3/32; G09G 3/34; H02M 3/335
See application file for complete search history.

(56) References Cited

U.S. PATENT DOCUMENTS

2004/0246226 A1* 12/2004 Moon ............... G02F 1/133604
345/102
2011/0128303 A1* 6/2011 Yonemaru .............. H05B 45/46
315/291

(Continued)

FOREIGN PATENT DOCUMENTS

CN 109560710 A 4/2019
CN 113763868 A 12/2021

OTHER PUBLICATIONS

The World Intellectual Property Organization (WIPO) International Search Report for PCT/CN2022/121412 Dec. 28, 2022 4 Pages (including translation).

*Primary Examiner* — Daniel D Chang
(74) *Attorney, Agent, or Firm* — ANOVA LAW GROUP, PLLC

(57) ABSTRACT

Disclosed is a display apparatus. The display apparatus includes: a transformer, voltage conversion modules, a feedback module and a light string group. The light string group includes a first light string and a second light string; a first secondary coil and a second secondary coil of the transformer are coupled with a primary coil of the transformer; the first secondary coil is configured to output a first voltage according to a power received by the primary coil. The second secondary coil is configured to output a second voltage from both ends of the second secondary coil alternately according to the power received by the primary coil. The voltage conversion module is configured to generate an additional voltage according to the first voltage, and superimpose the additional voltage onto a corresponding second voltage at both ends of the second secondary coil to output a superimposed third voltage.

20 Claims, 39 Drawing Sheets

(56) References Cited

U.S. PATENT DOCUMENTS

| | | | | |
|---|---|---|---|---|
| 2016/0143108 | A1* | 5/2016 | Nakamura | H05B 45/385<br>315/224 |
| 2020/0313561 | A1* | 10/2020 | Moore | H02M 3/33561 |

* cited by examiner

DISPLAY APPARATUS

CROSS-REFERENCE TO RELATED APPLICATIONS

The application is a continuation application of International Application No. PCT/CN2022/121412 filed Sep. 26, 2022, which claims priority to Chinese Patent Application No. 202210412214.4, filed on Apr. 19, 2022, Chinese Patent Application No. 202210415138.2, filed on Apr. 20, 2022, and Chinese Patent Application No. 202210421396.1, filed on Apr. 21, 2022, in the China National Intellectual Property Administration. The entire contents of all of the above applications are incorporated herein by reference.

TECHNICAL FIELD

The disclosure relates to the technical field of display apparatuses, and in particular to a display apparatus.

BACKGROUND

With the development of electronic technology, the integration level of electronic apparatus including display apparatus such as televisions is getting higher and higher, which also places higher and higher requirements on the power supply of the display apparatus.

Taking the TV set as an example, the system design is complex because there are two power supply requirements in the TV set, respectively for the main power supply and for backlight drive of the light emitting diode (LED) light string. Specifically, in a related design, a resonant conversion circuit (LLC) module is used to output multiple DC voltages based on AC to power the main and the light string, respectively. Each light string corresponds to a DC-DC voltage adjustment module that adjusts the fixed DC voltage output from the LLC module to match the voltage requirements of the light string. In another related design, two LLC modules are used to power the main and the light string respectively. Here, the AC voltage of the primary winding of the LLC module corresponding to the light string is adjusted to adjust the output voltage of the secondary winding, to match the voltage requirement of the light string. How to simplify the above power supply circuit has become an issue to be solved.

SUMMARY

Embodiments of the disclosure provide a display apparatus, to simplify the power supply circuit of the display apparatus.

Embodiments of the disclosure provide a display apparatus including: a transformer, a voltage conversion module, a feedback module, and a light string group. The voltage conversion module corresponds one-to-one with the light string group, and the light string group includes a first light string and a second light string. The first secondary coil and a second secondary coil of the transformer are coupled with a primary coil of the transformer. The first secondary coil is configured to output a first voltage according to a power received by the primary coil. The second secondary coil is configured to output a second voltage from both ends of the second secondary coil alternately according to the power received by the primary coil. The second secondary coil corresponds one-to-one with the light string group. The voltage conversion module is configured to generate an additional voltage according to the first voltage, and superimpose the additional voltage onto a corresponding second voltage at both ends of the second secondary coil to output a superimposed third voltage. The feedback module is configured to generate a feedback signal based on an output current of the light string group and send the feedback signal to the voltage conversion module, where the feedback signal is configured to instruct the voltage conversion module to adjust the third voltage. The first light string is connected with one corresponding end of the second secondary coil, and the second light string is connected with the other corresponding end of the second secondary coil, both configured to emit light based on the third voltage.

DETAILED DESCRIPTION

Embodiments of the disclosure will be described in details. In the description below related to the drawings, a same number in different drawings indicates a same or similar element. The described embodiments are only some of the embodiments of the disclosure, not all of them.

As people's demand for information continues to deepen, various types of display apparatuses emerge as the times require, such as computers, televisions, and projectors. The power supply circuit is one of the most important circuit structures in the display apparatus, and can provide electric energy for the display apparatus, to enable the display apparatus operating normally. Some display apparatuses are equipped with an independent power board, and a main board and the power board are respectively arranged on two different circuit boards. Some display apparatuses integrate the power board and the main board to be on one same circuit board.

Figure 1:
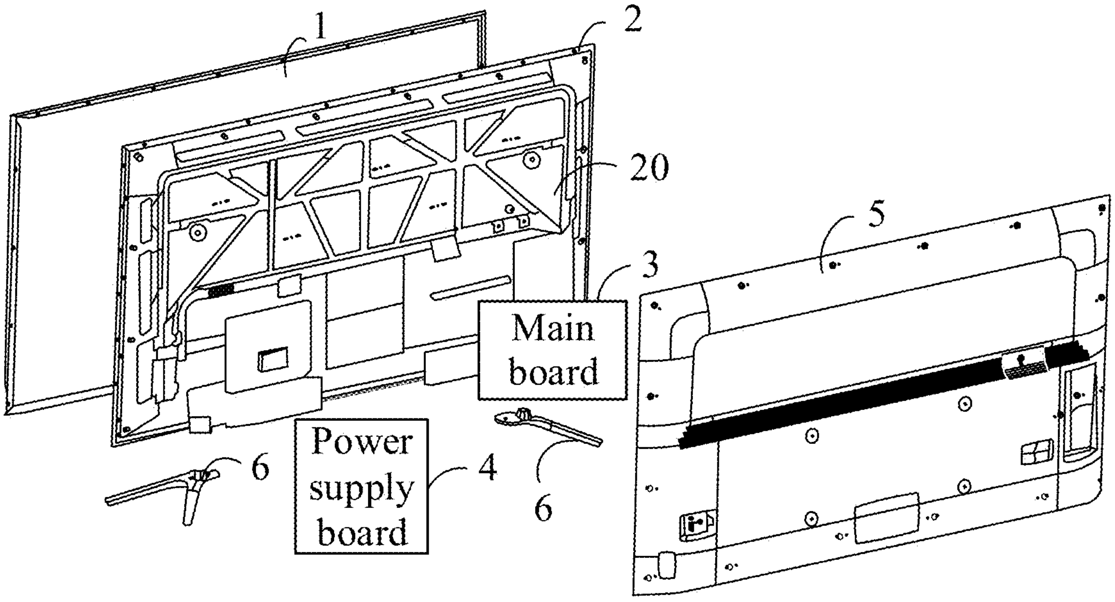
FIG. 1 is a schematic structural diagram of a display apparatus provided with an independent power board.

Taking a display apparatus with an independent power supply board as an example, the structure of the display apparatus is illustrated. As shown in FIG. 1, a schematic structural diagram of a display apparatus with an independent power supply board is shown. As shown in FIG. 1, the display apparatus may include a panel 1, a backlight component 2, a main board 3, a power board 4, a rear case 5 and a base 6. The panel 1 can be configured to present images to the user. The backlight component 2 is located below the panel 1, usually includes some optical components, and can be configured to supply evenly distributed light sources with sufficient brightness, so that the panel 1 can display images normally. The backlight component 2 further includes the backplane 20. The main board 3 and the power supply board 4 can be arranged on the backplane 20, on which some convex hull structures are usually stamped and formed. The main board 3 and the power supply board 4 can be fixed on the convex hull via screws or hooks. The rear case 5 covers the panel 1 to hide components of the display apparatus such as the backlight component 2, the main board 3 and the power board 4, so as to achieve an aesthetic effect. The base 0 is configured to support the display apparatus.

Figure 2:
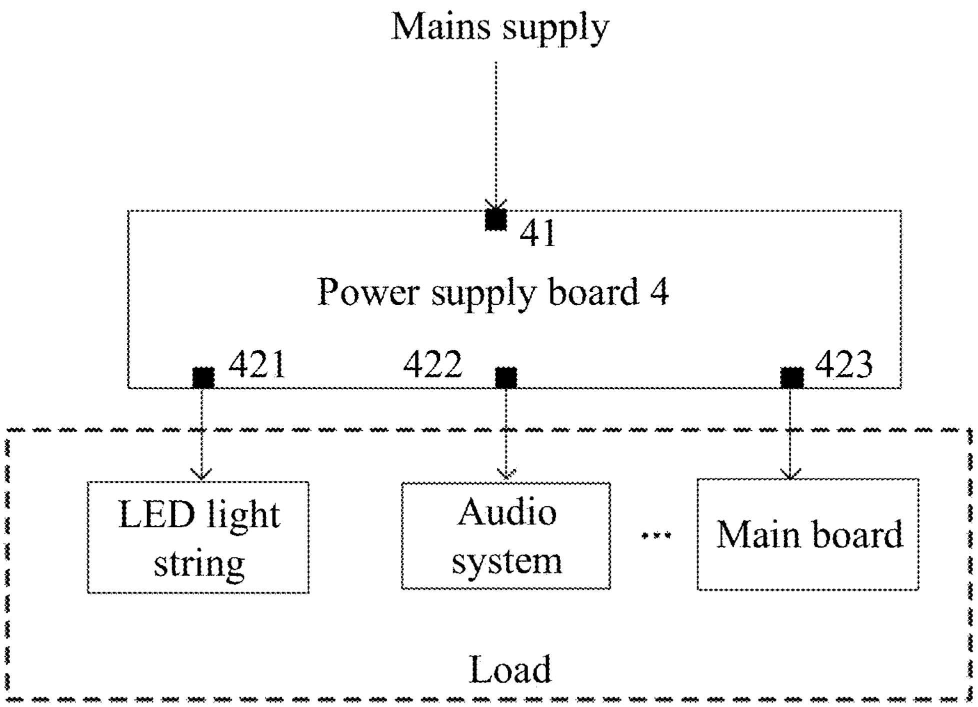
FIG. 2 is a schematic diagram illustrating a connection relationship between a power board and loads.

Further, FIG. 2 is a schematic diagram illustrating a connection relationship between the power board and loads. As shown in FIG. 2, the power board 4 may include an input end 41 and output ends 42 (the first output end 421, the second output end 422 and the third output end 423 as shown in the figure). The input end 41 can be connected with the mains supply, and the output ends 42 can be connected with the loads. For example, the first output end 421 can be connected with the LED string for lighting the display panel, and the second output end 422 can be connected with the audio system, and the third output end 423 can be connected with the main board. The power board 4 needs to convert the AC power of the mains supply into the DC power required by the loads. The DC power usually has different specifications, such as 18V for the audio system, 12V and 18V for the main board, and so on.

Figure 3:
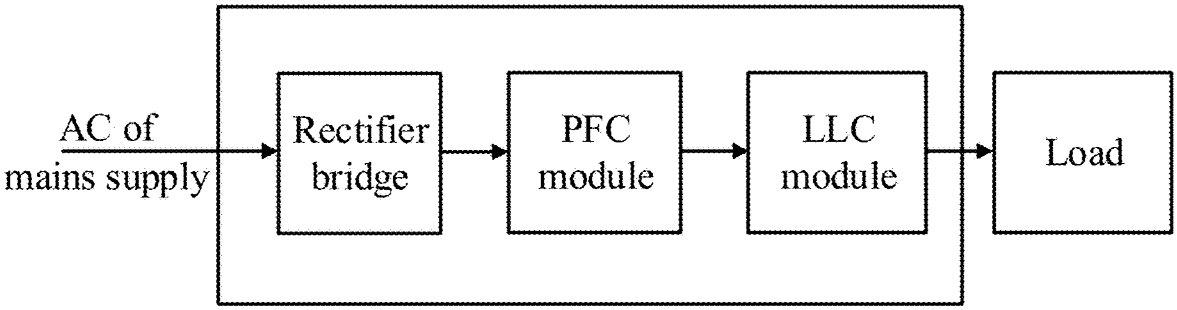
FIG. 3 is a schematic architectural diagram of a TV power supply.

In some embodiments, a TV is used as an example to describe the power supply of the display apparatus. FIG. 3 is a schematic diagram of the power supply of the TV. As shown in FIG. 3, the power supply board may include: a rectifier bridge, a Power Factor Correction (PFC) module and a resonant converter (LLC) module. The LLC module may include a synchronous rectification circuit (not shown in FIG. 3). The PFC module can be connected with the LLC module. The LLC module can be connected with the loads.

The rectifier bridge can be configured to rectify the input AC power of the mains supply, and input the full-wave signal to the PFC module. Before the AC power is input into the PFC module, an Electromagnetic Interference (EMI) filter (not shown in FIG. 3) may be connected with perform high-frequency filtering on the input AC power.

The PFC module may include a PFC inductor, a switching power device and a PFC control chip, and mainly perform power factor correction on the input AC power, and output a stable DC bus voltage (such as 380V) to the LLC module. The PFC module can effectively improve the power factor of the power supply and ensure that the voltage and current are in the same phase. Alternatively, in some embodiments, the power supply architecture in FIG. 3 may not include the PFC module.

The LLC module can adopt a LLC resonant conversion circuit of double MOS transistors. Usually, a synchronous rectification circuit is set in the LLC module. The synchronous rectification circuit may include a transformer, a controller, two MOS transistors and a diode. In addition, the LLC module may also include a Pulse frequency modulation (PFM) circuit, capacitors, inductors and other components. The LLC module 43 can step down or step up the DC bus voltage input from the PFC module, and output a constant voltage to the loads. Generally, the LLC module can output a variety of different voltages to meet the requirements of the loads. Alternatively, in some embodiments, the LLC module as shown in FIG. 3 can also be replaced by a flyback module, which steps down or steps up the voltage and then outputs the voltage to the loads.

Figure 4:
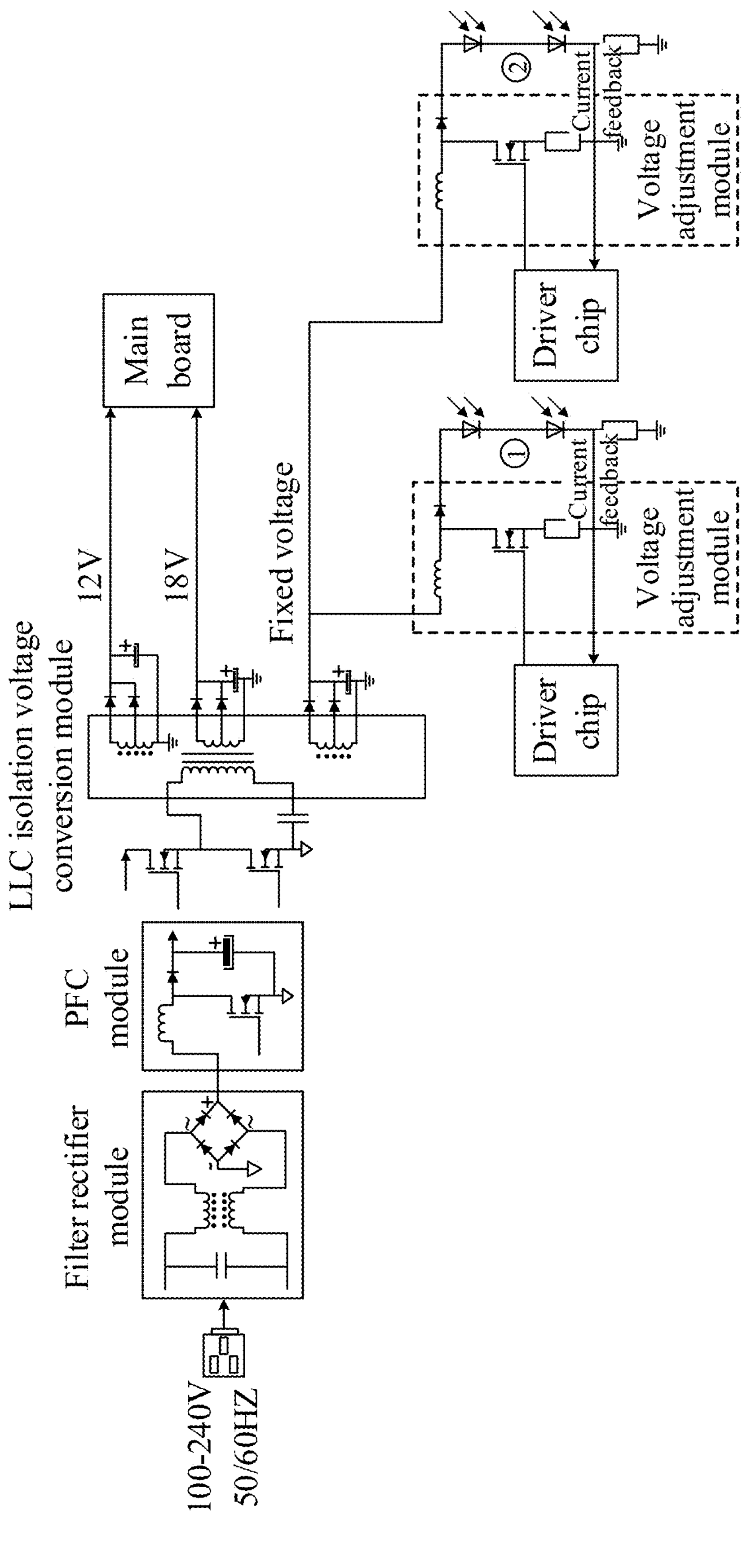
FIG. 4 is a schematic structural diagram of a circuit for supplying power to a main board and a LED string.

More specifically, taking the display apparatus as an example of a TV, FIG. 4 shows a schematic structural diagram of a power supply circuit for supplying power to the main board and the LED string. The alternating current (100V-240V, 50-60 Hz) of the mains supply obtained by the power supply circuit is supplied to the main board, the multiple LED strings and other loads (not shown in FIG. 4) of the display apparatus via the filter-and-rectifier module (rectifier bridge), PFC module and LLC isolation voltage conversion module in turn. The first secondary winding in the LLC isolation voltage conversion module provides a first voltage (such as 12V) to the main board, the second secondary winding provides a second voltage (such as 18V) to the main board, and the third secondary winding provides voltage to the multiple LED strings.

The LED strings can be used to light the display panel of the TV. LED components in the LED string need to work within a certain voltage range to achieve their rated current. For example, when the multiple LED strings are 16 LED strings, and each LED string includes 9 LED components, under the condition of 120 mA, the voltage range required for the multiple LED strings is 51.3V-58.5V, and the total current is 1.92 A.

Since the voltage range required by the LED string is related to the working environment, the hardware characteristics and the life span of the LED components, and other factors, the voltage should be adjusted in real time. Therefore, the power supply circuit further may include a voltage adjustment module (such as a buck circuit, a boost circuit, or a buck-boost circuit). The working voltage or the working current of the LED string can be detected, a feedback signal can be sent to the voltage adjustment module based on a change of the working voltage or the working current, so that the voltage adjustment module can adjust the voltage input to the LED string based on the feedback signal, thereby keeping the working current of the LED string stable.

As shown in FIG. 4, taking the power supply for the main board and two LED strings as an example, a voltage adjustment module, which is a boost circuit for example, is configured for each LED string. The voltage adjustment module can adjust the fixed voltage output from the third secondary winding according to a real-time current feedback result of each LED string, and then output the adjusted voltage to each LED string, so that each LED string can work at the rated current to prevent damage to the components due to excessive current flowing through the LED components in the LED string.

However, in the power supply circuit shown in FIG. 4, one voltage adjustment module is configured for each LED string. That is, for each additional LED string, one voltage adjustment module should be correspondingly added. As such, the circuit structure is relatively complex, occupying more area on the PCB of the power supply circuit, which increases the cost of the power supply circuit.

Figure 5:
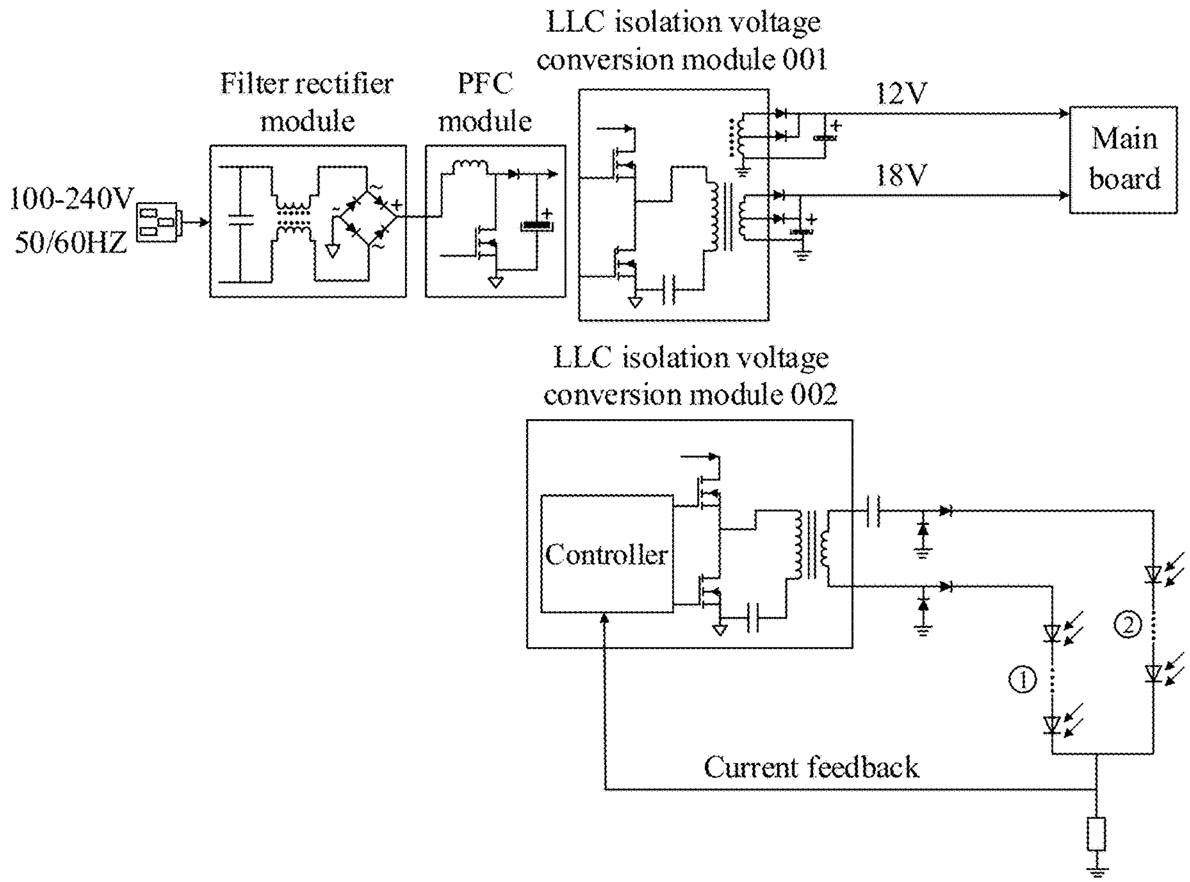
FIG. 5 is another schematic structural diagram of a circuit for supplying power to a main board and a LED string.

In some embodiments, FIG. 5 shows another schematic structural diagram of a power supply circuit for supplying power to the main board and the LED string. The alternating current (100V-240V, 50-60 Hz) of the mains supply obtained by the power supply circuit is supplied to the main board, the multiple LED strings and other loads (not shown in FIG. 5) of the display apparatus via the filter-and-rectifier module (rectifier bridge), PFC module and LLC module in turn. The first secondary winding in the LLC isolation voltage conversion module 001 provides a first voltage (such as 12V) to the main board, and the second secondary winding provides a second voltage (such as 18V) to the main board. The LLC isolation voltage conversion module 002 provides voltage to the two LED strings. The LLC isolation voltage conversion module 002 supplies power for the two LED strings based on characteristics of the alternating current. A controller of the LLC isolation voltage conversion module 002 can receive current feedback of the two LED strings, adjust the output voltage of the LLC isolation voltage conversion module 002, and then send the adjusted voltage to the two LED strings. As such, each LED string can work at the rated current, preventing damage to the components due to excessive current flowing through the LED components in the LED string.

The capacitor connected with one output end of the secondary winding of the LLC isolation voltage conversion module 002 can serve as a current equalizer, and can be configured to equalize the working currents of the two LED strings. The diodes connected in series between the two output ends and the LED strings can serve as rectifiers due to the unidirectional conductivity. The ground diodes connected with the two output ends of the secondary winding can server as the voltage stabilizers.

However, in the power supply circuit shown in FIG. 5, the output voltage range of the LLC isolation voltage conversion module 002 is limited. When it is necessary to change the magnitude of current, the output range of the LLC isolation voltage conversion module 002 is greatly restricted. Additionally, the display apparatus may have more than two LED strings. According to the power supply circuit shown in FIG. 5, for each additional two LED strings, one secondary winding needs to be added to the LLC isolation voltage conversion module 002 to supply power to the new LED strings. A large number of secondary windings make transformer design relatively difficult, and the complex circuit also costs more.

Figure 6:
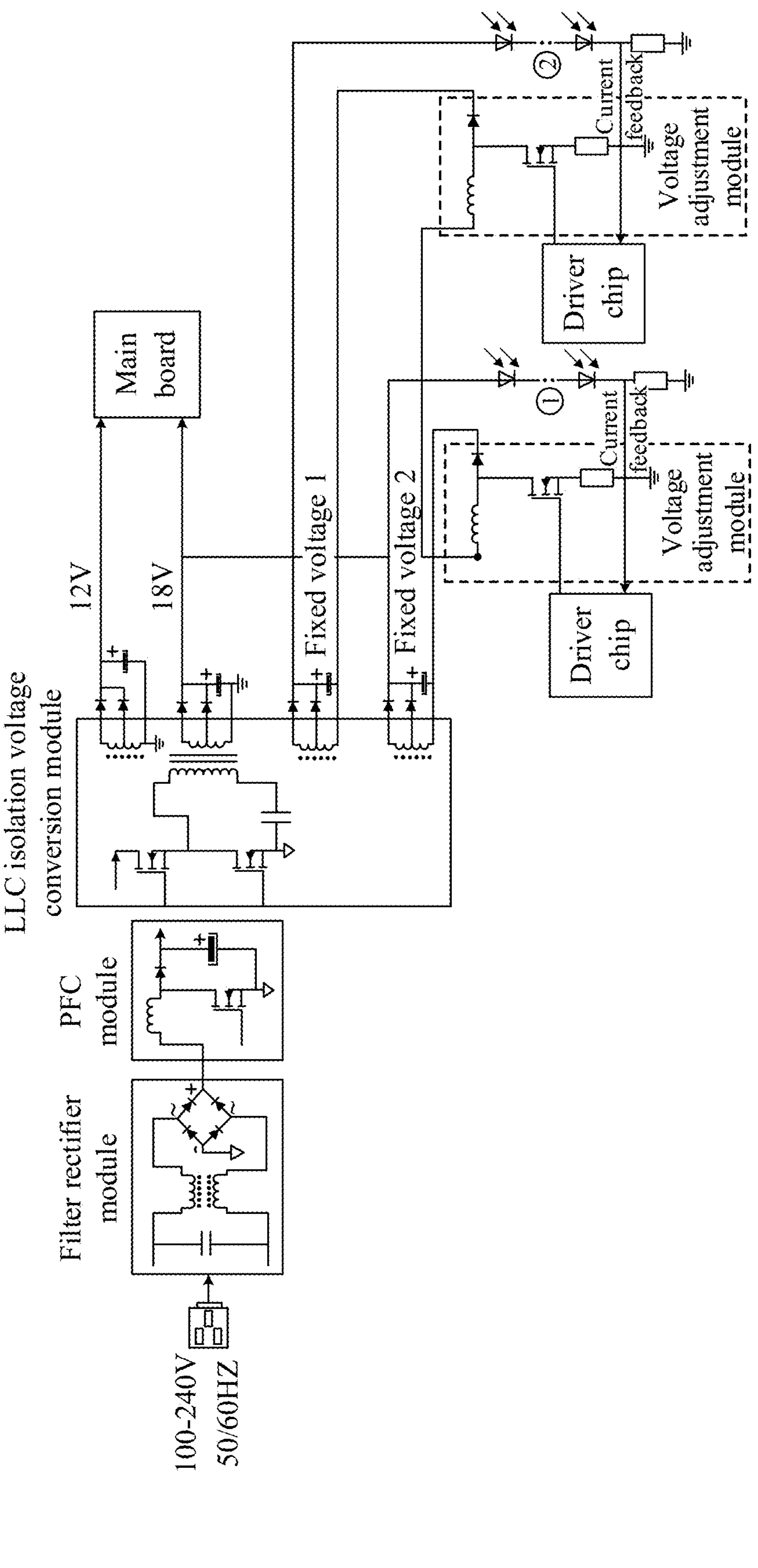
FIG. 6 is another schematic structural diagram of a circuit for supplying power to a main board and a LED string.

In some embodiments, FIG. 6 is another schematic structural diagram of a circuit for the main board and LED strings. The alternating current (100V-240V, 50-60 Hz) of the mains supply obtained by the power supply circuit is supplied to the main board, the multiple LED strings and other loads (not shown in FIG. 6) of the display apparatus via the filter-and-rectifier module (rectifier bridge), PFC module and LLC isolation voltage conversion module in turn. The LLC isolation voltage conversion module includes four secondary windings. The first secondary winding provides a first voltage (e.g., 12V) to the main board, and the second secondary winding provides a second voltage (e.g., 18V) to the main board. The second and third secondary windings together supply power to the second LED string, and the second and fourth secondary windings together supply power to the first LED string.

In some embodiments, the voltage of 18V output from the second secondary winding is adjusted by a voltage adjustment module, exemplified by a boost circuit, to generate a "variable voltage" that connects with one end of the third secondary winding. The variable voltage and the fixed voltage generated by the third secondary winding are superimposed to supply power to the second LED string.

Likewise, the voltage of 18V output from the second secondary winding is adjusted by a voltage adjustment module, exemplified by a boost circuit, to generate a "variable voltage" that connects with one end of the fourth secondary winding. The variable voltage and the fixed voltage generated by the fourth secondary winding are superimposed to supply power to the first LED string.

In the power supply circuit shown in FIG. 6, the method of combining the "variable voltage" with the "fixed voltage" to supply power is referred as "stepped power supply", which helps reduce the voltage withstand requirements for components such as switching transistors and capacitors in the voltage adjustment module, thereby reducing costs. However, for each additional LED string, one secondary winding and one voltage adjustment module need to be added to the LLC isolation voltage conversion module. A large number of secondary windings make transformer design relatively difficult, and the circuit structure becomes more complex, occupying more area on the PCB of the power supply circuit, ultimately increasing the cost of the power supply circuit.

Based on this, the display apparatus according to the disclosure shares one secondary coil and voltage conversion module for two LED strings. The secondary coil alternately outputs "fixed voltage" at both ends, superimposed with the "variable voltage" output from the voltage conversion module, to achieve "stepped power supply" for the two LED strings. This simplifies the power supply circuit and reduces thermal loss.

The following specific embodiments will be described in detail to explain how the content of the disclosure solves the above technical problems. These specific embodiments can be combined with each other. The embodiments of the disclosure will be described below with reference to the accompanying drawings.

Figure 7:
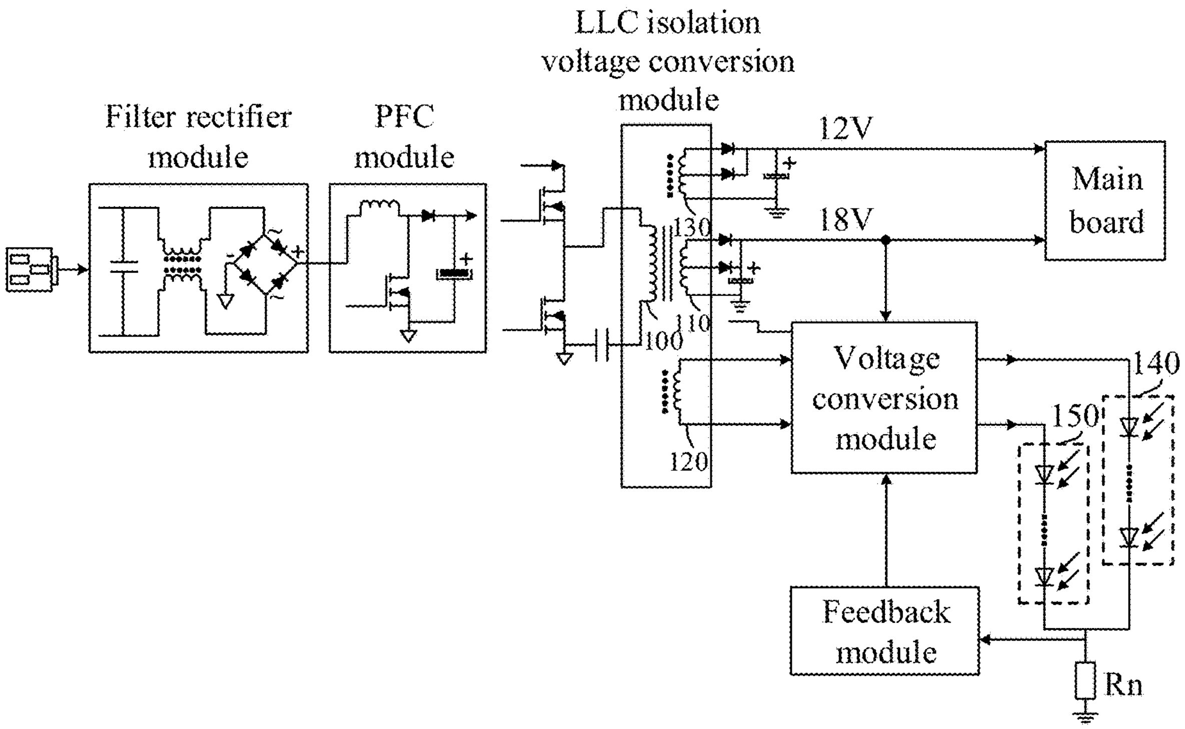
FIG. 7 is a schematic structural diagram of a circuit for a display apparatus with two light strings according to some embodiments.

FIG. 7 is a schematic structural diagram of a circuit of a display apparatus with two LED strings according to some embodiment of the disclosure. As shown in FIG. 7, the circuit includes: a transformer, a voltage conversion module, a feedback module, and a light string group. The voltage conversion module corresponds one-to-one with the light string group. The light string group includes the first light string 140 and the second light string 150.

In FIG. 7, the transformer is, for example, an LLC isolation voltage conversion module. The primary coil 100 of the LLC isolation voltage conversion module is coupled with the first secondary coil 110 and the second secondary coil 120. The first secondary coil 110 can be configured to output a first voltage according to the power received from the primary coil 100. The second secondary coil 120 can be configured to alternately output the second voltage at both ends according to the power received from the primary coil 100. The second secondary coil 120 corresponds one-to-one with the light string group. The voltage conversion module can be configured to generate an additional voltage based on the first voltage and add it to the corresponding second voltage at both ends of the second secondary coil, outputting the superimposed third voltage.

The feedback module can be configured to generate a feedback signal based on an output current of the light string group and send the feedback signal to the voltage conversion module. The feedback signal can be configured to instruct the voltage conversion module to adjust the third voltage. The first light string 140 is connected with one corresponding end of the second secondary coil 120, and the second light string 150 is connected with the other corresponding end of the second secondary coil 120, both emitting light based on the third voltage.

In the power supply circuit shown in FIG. 7, the filtering and rectifying module (rectifier bridge) and PFC module process the mains AC power and then supply power to the main board, multiple LED strings, and other loads (not shown in FIG. 7) of the display apparatus via the LLC isolation voltage conversion module.

One end of the first secondary coil 110 is grounded. A center tap of the first secondary coil 110 and the other end of the first secondary coil 110 are each connected with a rectifier diode in series, outputting the first voltage. In FIG. 7, the first voltage is exemplified as a DC voltage of 18V. Since the first secondary coil 110 and the primary coil 100 induce AC, it needs to be converted from AC to DC by the rectifier circuit mentioned above.

In the embodiments, the AC can be induced by coupling the second secondary coil 120 with the primary coil 100. The second voltage can be alternately output at both ends of the second secondary coil, serving as a "fixed voltage." The voltage conversion module can adjust the first voltage output from the first secondary coil based on the feedback signal to generate an additional voltage, serving as a "variable voltage." The voltage conversion module adds the additional voltage to the second voltage, outputting a superimposed third voltage. In the embodiments, the two light strings can share the same power coil and voltage conversion module, simplifying the circuit. Further, the "fixed voltage" and "variable voltage" can be superimposed to achieve stepped power supply, reducing thermal loss.

The feedback module can use a current feedback method or a voltage feedback method. The feedback module can generate feedback signals based on the current of one light string or the current of multiple light strings. When the feedback is based on one single light string, the reference current value set in the feedback module is the value of working current required for one light string. When two light strings provide feedback together, the reference current value set in the feedback module is twice the value of working current required for one light string. This reference current value is compared with the actual current value. If the actual current value is higher than the reference current value, the feedback signal can be configured to instruct the voltage adjustment module to reduce the third voltage. If the actual current value equals the reference current value, the feedback signal can be configured to instruct the voltage adjustment module to maintain the third voltage. If the actual current value is lower than the reference current value, the feedback signal can be configured to instruct the voltage adjustment module to increase the third voltage.

In FIG. 7, the feedback is based on the two light strings. Specifically, the feedback module can generate a feedback signal based on the total current of the first light string 140 and the second light string 150 in the light string group and sends the feedback signal to the voltage conversion module to instruct the voltage conversion module to adjust the third voltage. The first light string 140 and the second light string 150 can be directly grounded or grounded through the grounding circuit Rn. The grounding circuit Rn can help release static electricity, to avoid static accumulation.

Figure 8:
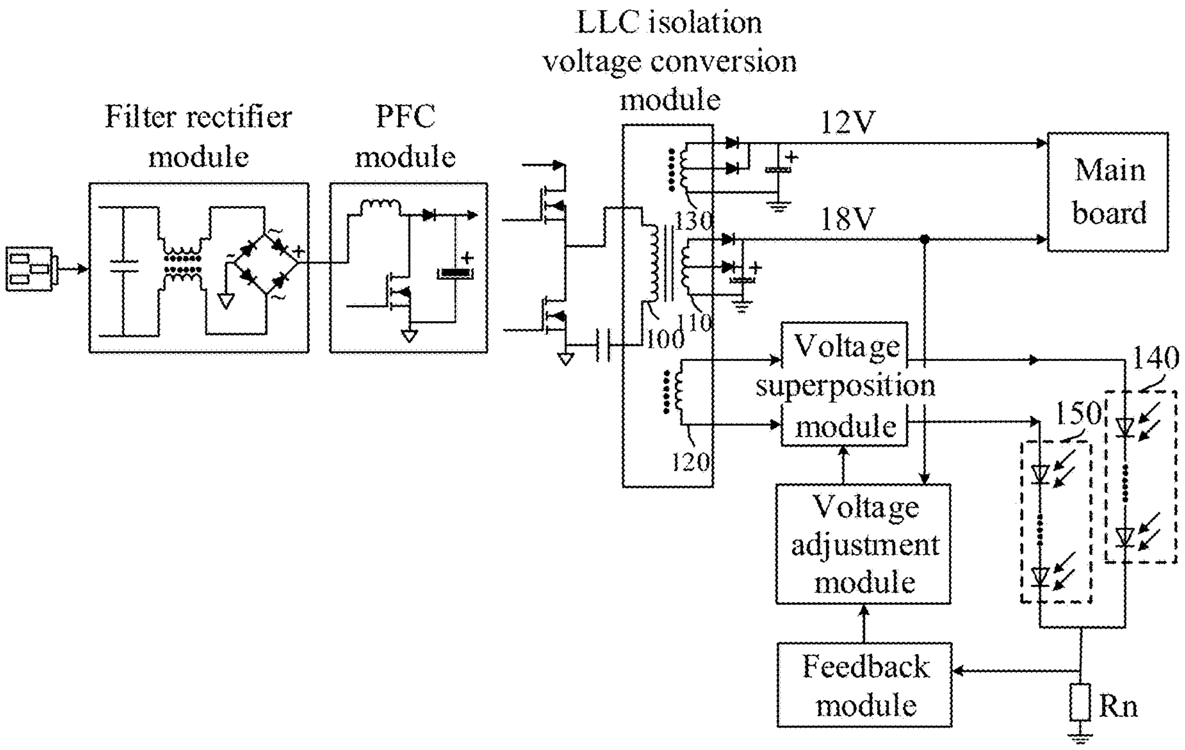
FIG. 8 is a schematic structural diagram of a circuit of a voltage conversion module according to some embodiments.

In some embodiments, FIG. 8 is a schematic structural diagram of a circuit of a voltage conversion module according to some embodiments of the disclosure. The voltage conversion module may include: a voltage adjustment module and a voltage superposition module. The voltage adjustment module can be connected with an output end of the first secondary coil and generate an additional voltage based on the first voltage. The voltage superposition module can receive the additional voltage and connects the additional voltage with both ends of the second secondary coil to add the additional voltage to the corresponding second voltage at both ends of the second secondary coil, outputting a superimposed third voltage. The feedback signal can instruct the voltage adjustment module to adjust the third voltage by adjusting the additional voltage.

The second voltage serves as a "fixed voltage." The voltage adjustment module can adjust the first voltage to output the additional voltage based on the feedback signal, which serves as a "variable voltage." The voltage superposition module can add the additional voltage to the second voltage, outputting the superimposed third voltage to power the light string group. Using the stepped power supply method can help reduce thermal loss.

In some embodiments, the voltage superposition module includes a first equalization capacitor C1, a first rectifier diode D1, a second rectifier diode D2, a third rectifier diode D3, and a fourth rectifier diode D4.

One end of the first equalization capacitor C1 is connected with one end of the second secondary coil. The other end of the first equalization capacitor C1 is connected with a positive electrode of the first rectifier diode D1 and a negative electrode of the second rectifier diode D2. A positive electrode of the second rectifier diode D2 is connected with the additional voltage. A negative electrode of the first rectifier diode D1 is connected with a positive electrode of the first light string 140. A negative electrode of the first light string 140 is grounded.

A positive electrode of the third rectifier diode D3 is connected with the other end of the second secondary coil 120 and a negative electrode of the fourth rectifier diode D4. A positive electrode of the fourth rectifier diode D4 is connected with the additional voltage. A negative electrode of the third rectifier diode D3 is connected with a positive electrode of the second light string 150. A negative electrode of the second light string 150 is grounded.

Figure 9:
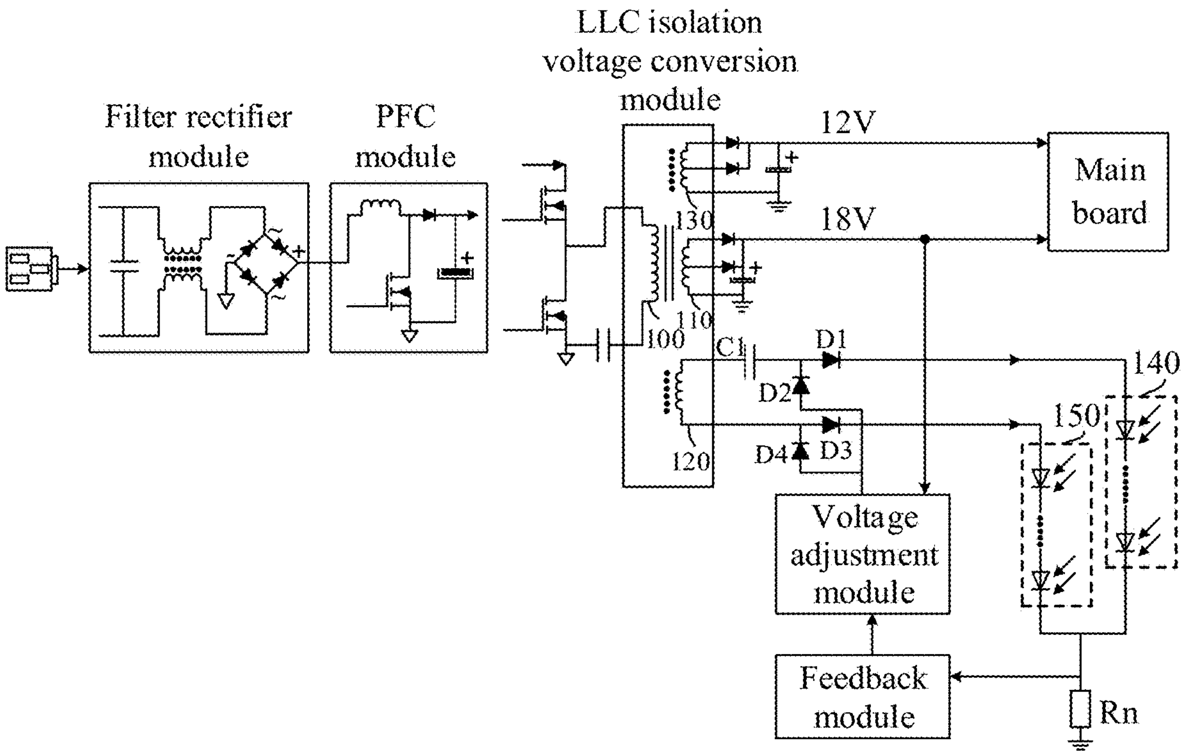
FIG. 9 is a schematic structural diagram of a circuit of a voltage superposition module according to some embodiments.

FIG. 9 is a schematic structural diagram of the circuit of a voltage superposition module according to some embodiments of the disclosure. While the primary coil 100 is turned on and off under the internal control of the LLC isolation voltage conversion module, the first equalization capacitor C1 undergoes charging and discharging processes.

Figure 10:
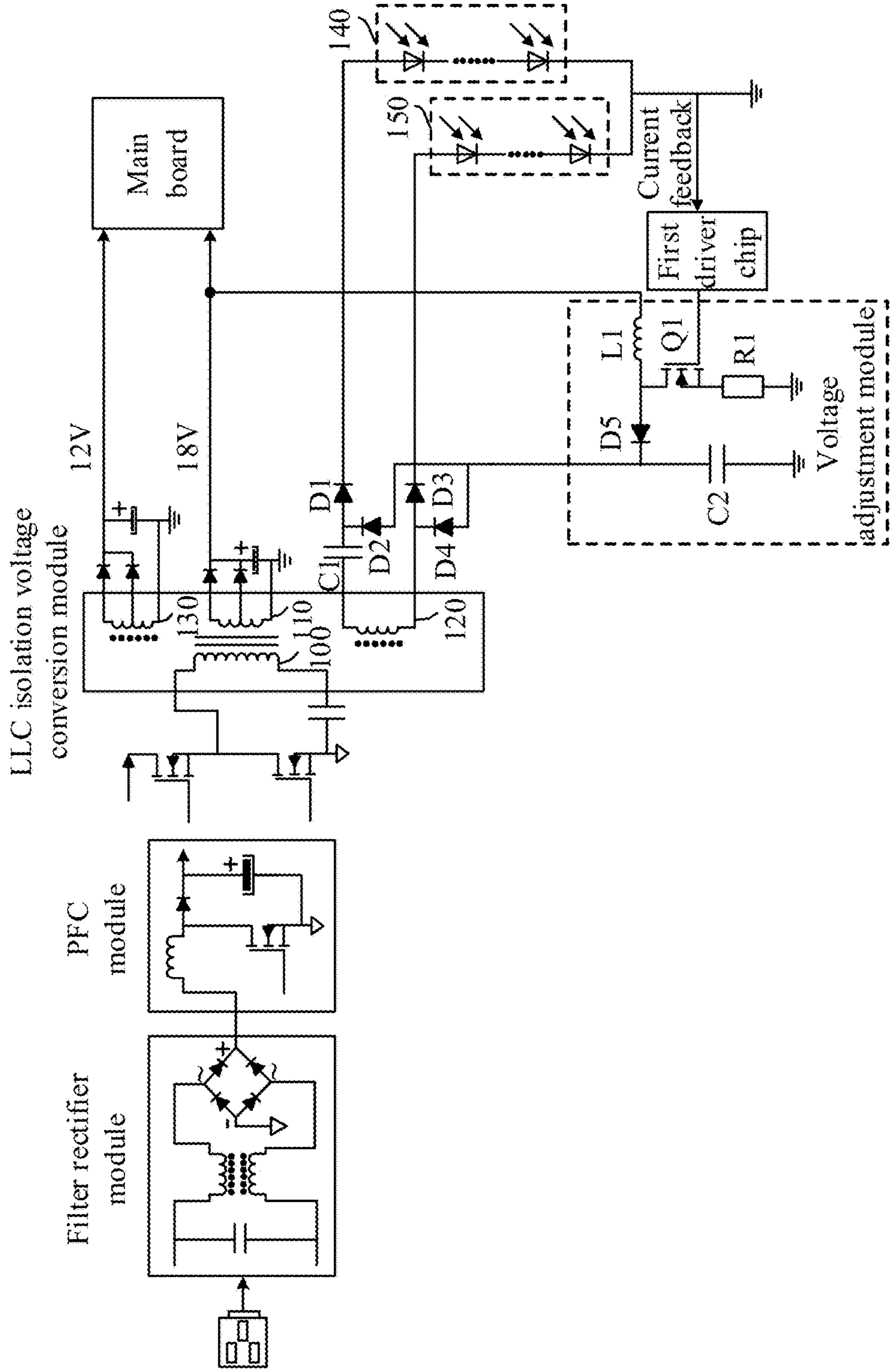
FIG. 10 is a schematic structural diagram of a circuit of a voltage adjustment module according to some embodiments.

While the first equalization capacitor C1 is being discharged, the current flows from the first end of the first equalization capacitor C1 (the left end of the first equalization capacitor C1 as shown in FIG. 10) to the second end (the right end of the first equalization capacitor C1 as shown in FIG. 10). The electric charge in the first equalization capacitor C1 is released through the loop of the first light string 140. In this case, the additional voltage output by the voltage adjustment module is input to the positive electrode of the first rectifier diode D1 via the second rectifier diode D2, causing current superposition at the positive electrode of the first rectifier diode D1, and then input to the first light string 140 from the negative electrode of the first rectifier diode D1.

While the first equalization capacitor C1 is being charged, the current flows from the second end to the first end of the first equalization capacitor C1, and the third rectifier diode D3 is turned on, releasing the charge in the first equalization capacitor C1 through the loop of the second light string 150. In this case, the additional voltage output by the voltage adjustment module is input to the positive electrode of the third rectifier diode D3 via the fourth rectifier diode D4, causing current superposition at the positive electrode of the third rectifier diode D3, and then input to the second light string 150 from the negative electrode of the third rectifier diode D3.

Since the total amount of charge during the charging and discharging processes of the equalization capacitor is equal, the charges flowing through the two light strings are equal, ensuring that the currents of the two light strings are equal, thereby achieving current equalization. If the currents of the two light strings are not equal, a voltage difference will be generated across the first equalization capacitor C1, making the loop voltage drops of the first light string 140 and the second light string 150 equal, thus balancing the impedance. After several cycles, the currents will reach an equal balance. Therefore, over a long period, the currents of the two LED light strings remain equal.

The loop of the first light string 140 includes the first rectifier diode D1, the first light string 140, the feedback module, the voltage adjustment module, the fourth rectifier diode D4, and the second secondary winding 120. The loop of the second light string 150 includes the second secondary winding 120, the third rectifier diode D3, the second light string 150, the feedback module, the voltage adjustment module, and the second rectifier diode D2.

In the embodiments, the two light strings share the same power supply coil (i.e., the second secondary coil 120) and the voltage adjustment module, simplifying the circuit. Meanwhile, two rectifier diodes are used for voltage superposition to achieve stepped power supply for each light string, which helps reduce thermal loss.

In some embodiments, the voltage adjustment module can be a boost circuit. Specifically, the voltage adjustment module can include: a first inductor L1, a first transistor Q1, a first diode D5, and a first capacitor C2. One end of the first inductor L1 is connected with the output end of the first secondary coil 110, the other end of the first inductor L1 is connected with one end of the first transistor Q1 and a positive electrode of the first diode D5. The other end of the first transistor Q1 is grounded. A negative electrode of the first diode D5 is used as the output end of the voltage adjustment module, outputting the additional voltage. One end of the first capacitor C2 is connected with a negative electrode of the first diode D5, the other end of the first capacitor C2 is grounded. A control electrode of the first transistor Q1 is connected with the feedback module, configured to adjust the switching frequency of the first transistor Q1 based on the feedback signal to adjust the additional voltage.

FIG. 10 is a schematic structural diagram of a circuit of a voltage adjustment module according to some embodiments of the disclosure. While the first transistor Q1 is turned on, the output end of the first secondary coil 110 continuously outputs the first voltage, charging the first inductor L1, causing the current of the first inductor L1 to linearly increase.

While the first transistor Q1 is turned off, the first inductor L1 can only discharge through the first diode D5, outputting the additional voltage from the negative electrode of the first diode D5 to the second rectifier diode D2 and the fourth rectifier diode D4, and simultaneously charging the first capacitor C2. The voltage across the capacitor rises and exceeds the input first voltage.

While the first transistor Q1 is turned on again, the first inductor L1 is charged again; due to the unidirectional conductivity of the first diode D5, the first capacitor C2 is discharged, outputting the additional voltage to the second rectifier diode D2 and the fourth rectifier diode D4.

By controlling the switching frequency of the first transistor Q1, or by selecting a first capacitor C2 with a larger capacitance, continuous output of the additional voltage can be achieved, and the additional voltage is higher than the input first voltage. The other end of the first transistor Q1 can be directly grounded or connected with a grounding resistor R1 to release static electricity and improve safety.

In some embodiments, FIG. 10 shows a current based feedback. The feedback module may include a first driver chip configured to collect the actual total current of the first light string 140 and the second light string 150 in real-time, generating feedback signals for the voltage adjustment module to perform timely and effective adjustments to prevent component damage due to excessive current from flowing through the LED components of the first light string 140 and the second light string 150.

In some embodiments, the voltage adjustment module can be a buck circuit. Specifically, the voltage adjustment module can include: a second transistor Q2, a third transistor Q3, a second inductor L2, a second capacitor C3, and a second driver chip. One end of the second transistor Q2 is connected with the output end of the first secondary coil 110, the other end of the second transistor Q2 is connected with one end of the third transistor Q3 and one end of the second inductor L2, the other end of the third transistor Q3 is grounded, and the other end of the second inductor L2 is used as the output end of the voltage adjustment module, outputting the additional voltage. One end of the second capacitor C3 is connected with the other end of the second inductor L2, the other end of the second capacitor C3 is grounded. Control electrodes of the second transistor Q2 and the third transistor Q3 are connected with the feedback module, configured to adjust the switching frequencies of the second transistor Q2 and the third transistor Q3 based on the feedback signal to adjust the additional voltage.

Figure 11:
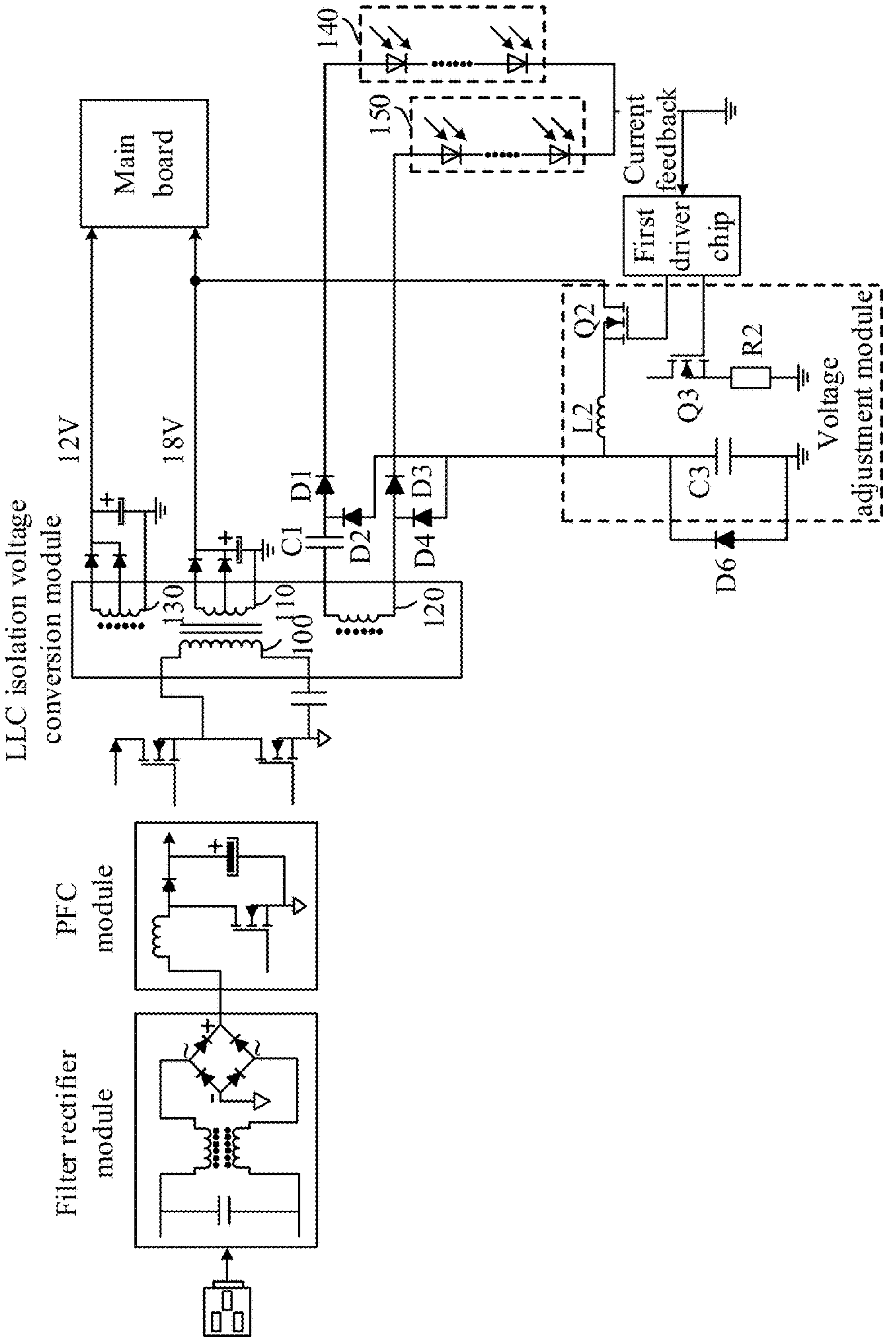
FIG. 11 is another schematic structural diagram of a circuit of a power adjustment module according to some embodiments.

FIG. 11 is another schematic structural diagram of a circuit of a voltage adjustment module according to some embodiments of the disclosure. The voltage adjustment module is a synchronous rectification buck circuit. The third transistor Q3, instead of the rectifier diode, is used, which helps improve voltage change efficiency.

While the second transistor Q2 is turned on and the third transistor Q3 is turned off, the output end of the first secondary coil 110 continuously outputs the first voltage, charging the second inductor L2, causing the current of the second inductor L2 to linearly increase, simultaneously outputting the additional voltage to the second rectifier diode D2 and the fourth rectifier diode D4, and charging the third capacitor C3. While the second transistor Q2 is turned off and the third transistor Q3 is turned on, the second inductor L2 continues to discharge through the third transistor Q3, the current of the second inductor L2 linearly decreases, simultaneously outputting the additional voltage to the second rectifier diode D2 and the fourth rectifier diode D4 through the third capacitor C3 and the second inductor L2 with gradually decreased current.

By controlling the switching frequencies of the second transistor Q2 and the third transistor Q3, continuous output of the additional voltage can be achieved, and the additional voltage is lower than the input first voltage. The other end of the third transistor Q3 can be directly grounded or connected with a grounding resistor R2 to release static electricity and improve safety.

In some embodiments, in the synchronous rectification buck circuit shown in FIG. 11, the voltage adjustment module further can include a second diode D6. A negative electrode of the second diode D6 is connected with one end of the third capacitor C3, and a positive electrode of the second diode D6 is connected with the other end of the third capacitor C3.

While the voltage adjustment module has no output, the second transistor Q2 is turned off, and the current of the light string group will flow back to the second secondary coil 120 through the body diode of the third transistor Q3, the second inductor L2, and the fourth equalization diode D4. When the current is too large, significant heat loss will occur in the body diode of the third transistor Q3. To reduce this loss, a new current loop is formed based on the second diode D6, allowing the current of the light string group to flow back to the second secondary coil 120 through the second diode D6 and the fourth equalization diode D4. The second diode D6 can be a Schottky diode or other low-power consumption diodes.

The aforementioned buck and boost topologies can be selected according to engineering needs. For example, the buck topology structure has the advantage of low cost but a narrow output voltage range, while the boost topology has the advantage of a wide output voltage range but relatively high cost.

In some embodiments, the display apparatus can further include a first switching circuit and a first grounding resistor R3. The first switching circuit is located between the light string group and the first grounding resistor R3. One end of the first switching circuit is connected with the negative electrodes of the first light string and the second light string, and the other end of the first switching circuit is connected with one end of the first grounding resistor R3 and the input end of the feedback module. The other end of the first grounding resistor R3 is grounded. The first switching circuit is controlled to turn on or off based on a duty cycle control signal.

Figure 12:
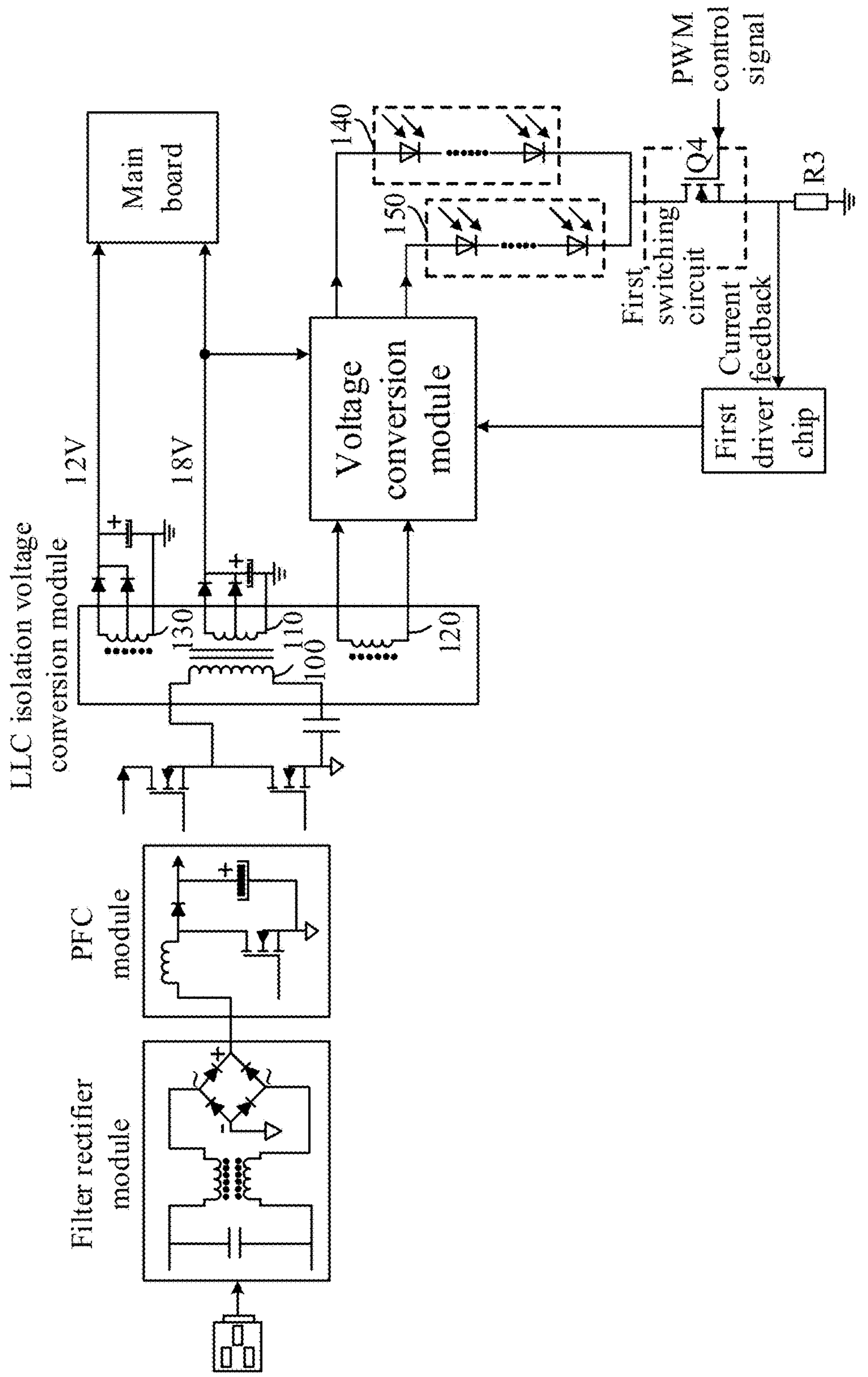
FIG. 12 is a schematic structural diagram of a first switching circuit according to some embodiments of the disclosure.

FIG. 12 is a schematic structural diagram of a circuit of a first switching circuit according to some embodiments of the disclosure. As shown in FIG. 12, for multi-output circuits, there may be issues with cross-regulation of the voltages of multiple secondary coils. Cross-regulation refers to the impact on the output voltage of one circuit when other circuits are loaded. For example, when the load on the output voltage of the third secondary coil 130 is heavy, the output voltages of the first secondary coil 110 and the second secondary coil 120 will be increased. As a result, when the voltage conversion module is not working, the second voltage output from the second secondary coil 120 exceeds the working voltage of the light string group, causing the light string group to light up. That is, the lighting and shutting down of the light string group are uncontrolled.

Therefore, a first switching circuit needs to be added to the loop of the light string group to ensure that the light string group remains off when not needed. For example, when the display apparatus is in standby mode, the display panel of the display apparatus is usually off, meaning the light string group should also be in the off state. The duty cycle control signal (i.e., the PWM control signal shown in FIG. 12) can be synchronized with the status control signal of the display apparatus, meaning that when the display apparatus is controlled to be in standby mode, the light string group is simultaneously controlled to a non-luminous state by the duty cycle control signal.

In some embodiments, the first switching circuit can include a fourth transistor Q4. One end of the fourth transistor Q4 is connected with the negative electrodes of the first light string 140 and the second light string 150, the other end of the fourth transistor Q4 is connected with one end of the first grounding resistor R3 and the input end of the feedback module. A gate of the fourth transistor Q4 is provided with the duty cycle control signal, and the fourth transistor Q4 can be turned on or off based on the duty cycle control signal. Referring to FIG. 12, when the PWM control signal is at a low level, the fourth transistor Q4 is off, so the light string group does not light up.

In some embodiments, the display apparatus can further include a second switching circuit and a second grounding resistor R4. The second switching circuit is located between the light string group and the second grounding resistor R4. One end of the second switching circuit is connected with the negative electrodes of the first light string 140 and the second light string 150, and the other end of the second switching circuit is connected with one end of the second grounding resistor R4. The other end of the second grounding resistor R4 is grounded. The second switching circuit can be configured to change the loop current for analog dimming.

Figure 13:
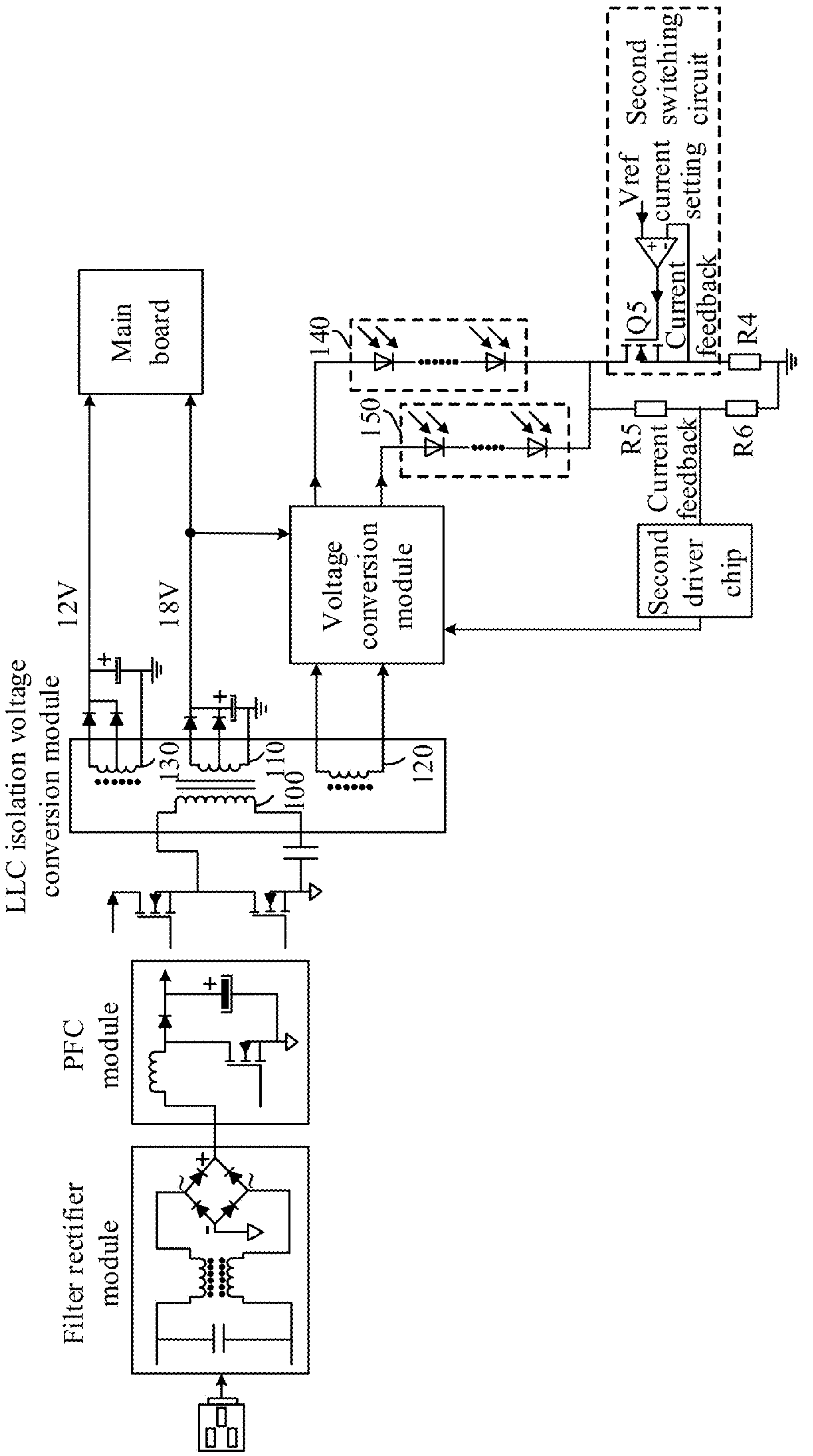
FIG. 13 is a schematic structural diagram of a second switching circuit according to some embodiments of the disclosure.

FIG. 13 is another schematic structural diagram of a circuit of a second switching circuit according to some embodiments of the disclosure. Analog dimming is achieved by changing the current in the loop of the light string group to change the brightness of the light string group. To meet the demand of analog dimming, if the current of the light string group is small, the required working voltage of the light string group is smaller, and the second voltage output from the second secondary coil 120 is more likely to exceed the required working voltage of the light string group. When the second voltage output by the second secondary coil 120 remains unchanged, the resistance in the loop can be adjusted through the second switching circuit to change the current in the loop. Compared with the method of adjusting the second voltage output from the second secondary coil 120 to achieve dimming, the circuit design is simpler.

In some embodiments, the second switching circuit can include a fifth transistor Q5 and a comparator. One end of the fifth transistor Q5 is connected with the negative electrodes of the first light string 140 and the second light string 150, the other end of the fifth transistor Q5 is connected with one end of the second grounding resistor R4 and an inverting input end of the comparator. A non-inverting input end of the comparator is provided with the required voltage of the light string group. An output end of the comparator is connected with a gate of the fifth transistor Q5. The resistance of the fifth transistor Q5 can be adjusted to change the loop current for analog dimming.

Referring to FIG. 13, the inverting input end of the comparator receives the actual total current of the first light string 140 and the second light string 150. Generally, the comparator can compare voltage signals, so the current feedback signal needs to be converted into a voltage feedback signal. The scheme for converting the current feedback signal into a voltage feedback signal can refer to related art. The non-inverting input end of the comparator is provided with the reference voltage, which is converted from the reference current. The scheme for converting the reference current signal into a reference voltage signal can refer to related art. When the voltage feedback signal exceeds the reference voltage, the fifth transistor Q5 can be set to operate in a linear state, absorbing the excess voltage on the fifth transistor Q5.

In FIG. 13, the feedback is based on voltage. One end of the first feedback resistor R5 is connected with the negative electrodes of the first light string 140 and the second light string 150, and the other end of the first feedback resistor R5 is connected with one end of the second feedback resistor R6. The other end of the second feedback resistor R6 is grounded. The second driver chip samples from the connection node of the first feedback resistor R5 and the second feedback resistor R6 and sends the voltage feedback signal to the voltage conversion module.

The second driver chip can be configured to collect the voltage signal at the connection node of the first feedback resistor R5 and the second feedback resistor R6 in real-time, generating feedback signals for the voltage conversion module to make timely and effective adjustments to the voltage, preventing excessive current from flowing through the LED components in the first light string 140 and the second light string 150, which could cause component damage.

Referring to FIGS. 7 to 13, the display apparatus according to embodiments of the disclosure can further include a main board. The transformer can further include a third secondary coil 130 coupled with the primary coil. The third secondary coil 130 can be configured to output a fourth voltage according to the power received by the primary coil. The first voltage output from the first secondary coil 110 and the fourth voltage output from the third secondary coil 130 both supply power to the main board. For example, the first voltage is 18V, and the fourth voltage is 12V.

In some embodiments, in the display apparatus, there are multiple second secondary coils 120, voltage conversion modules, and light string groups. The display apparatus can also include multiple current equalization inductors. Mutually coupled current equalization inductors can be provided between adjacent second secondary coils.

Figure 14:
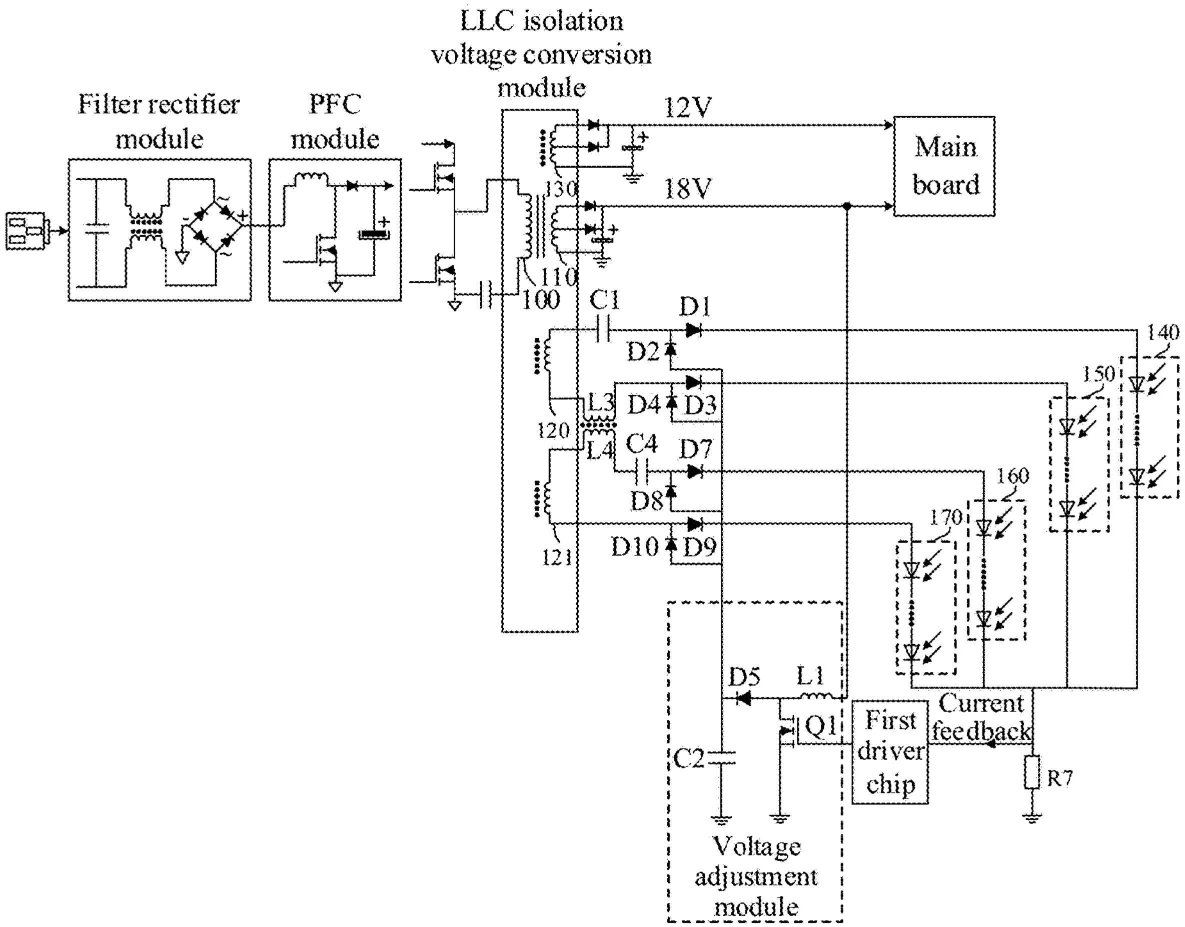
FIG. 14 is a schematic structural diagram of a circuit for a display apparatus with four light strings according to some embodiments.

Taking four light strings as an example, FIG. 14 is a schematic structural diagram of a circuit of a display apparatus with four light strings according to some embodiments of the disclosure, where the voltage adjustment module is, for example, a boost circuit. As shown in FIG. 14, there are two light string groups including four light strings, which are a first light string 140, a second light string 150, a third light string 160, and a fourth light string 170. Two second secondary coils 120 and 121 correspond to the two light string groups. Current equalization inductors which are a third inductor L3 and a fourth inductor L4 are mutually coupled between the two second secondary coils 120 and 121.

When the winding direction and the number of turns of the two second secondary coils 120 and 121 are the same, during the power supply process, the current directions in the power supply circuits of the second light string 150 and the third light string 160 are opposite, generating impedance. The third inductor L3 is connected in series in the power supply circuit of the second light string 150, and the fourth inductor L4 is connected in series in the power supply circuit of the third light string 160. The third inductor L3 and the fourth inductor L4 are mutually coupled to balance the generated impedance.

In this case, the feedback module uses the combined feedback from the four light strings, so the reference current value set in the feedback module is four times the value of required working current of one light string. Additionally, the newly added second secondary coil 121 powers the third light string 160 and the fourth light string 170, the principle of which will not be repeated here.

Figure 15:
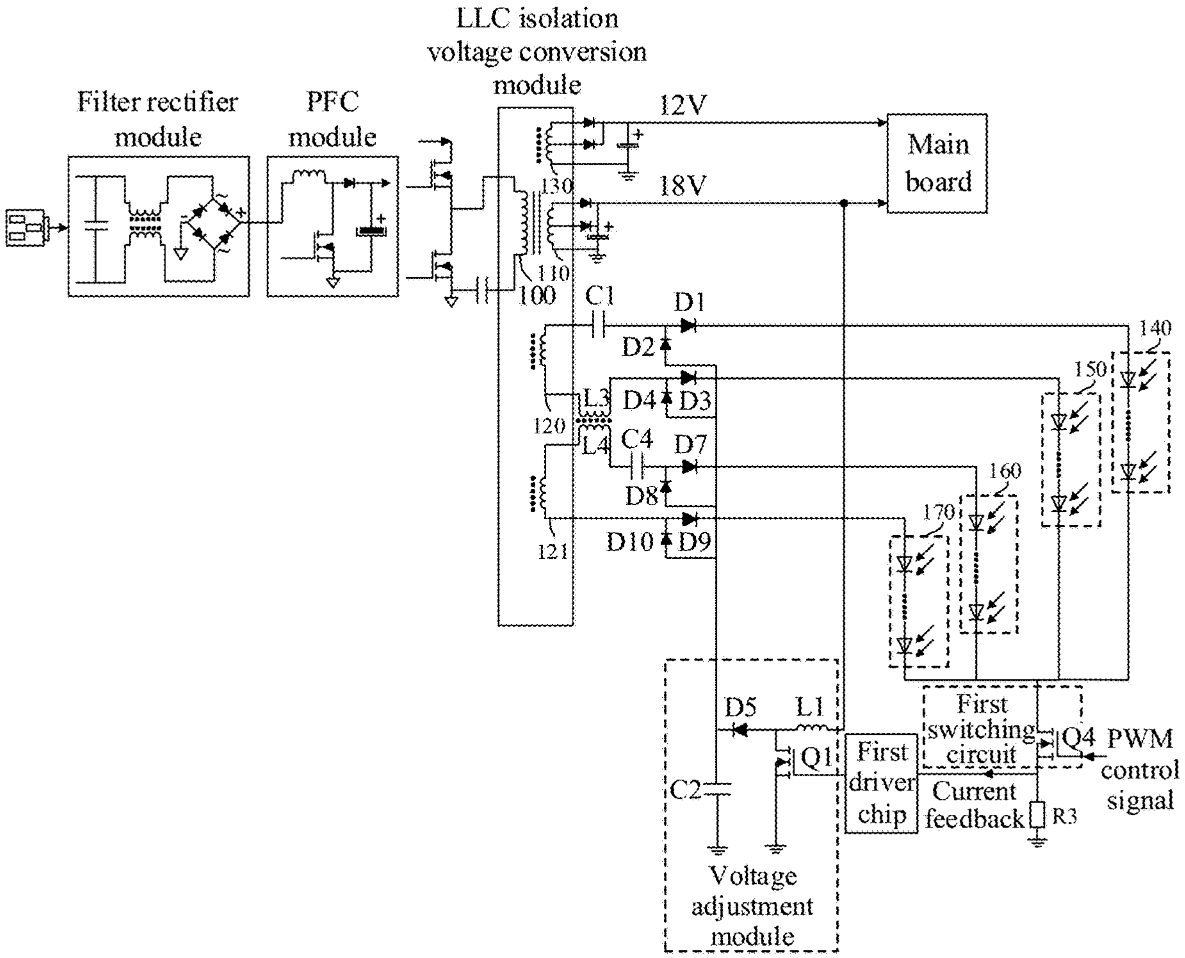
FIG. 15 is another schematic structural diagram of a circuit for a display apparatus with four light strings according to some embodiments.

FIG. 15 is a schematic structural diagram of a circuit of a display apparatus with four light strings according to some embodiments of the disclosure. In the power supply circuit of the display apparatus with four light strings, similar to that in FIG. 12, the first switching circuit is located between the four light strings (the first light string 140, the second light string 150, the third light string 160, and the fourth light string 170) and the grounding resistor R3. For multi-output circuits, there may be issues with cross-regulation of the voltages of multiple secondary coils. To prevent the second voltage output by the second secondary coils 120 or 121 from exceeding the working voltage of the light string group when the voltage conversion module is not working, causing the light string group to light up, a first switching circuit is added to the loop of the light string group to ensure that the light string group remains off when not needed. Specifically, the first switching circuit can include a fourth transistor Q4. When the PWM control signal is at a low level, the fourth transistor Q4 is turned off, so the light string group does not light up.

Figure 16:
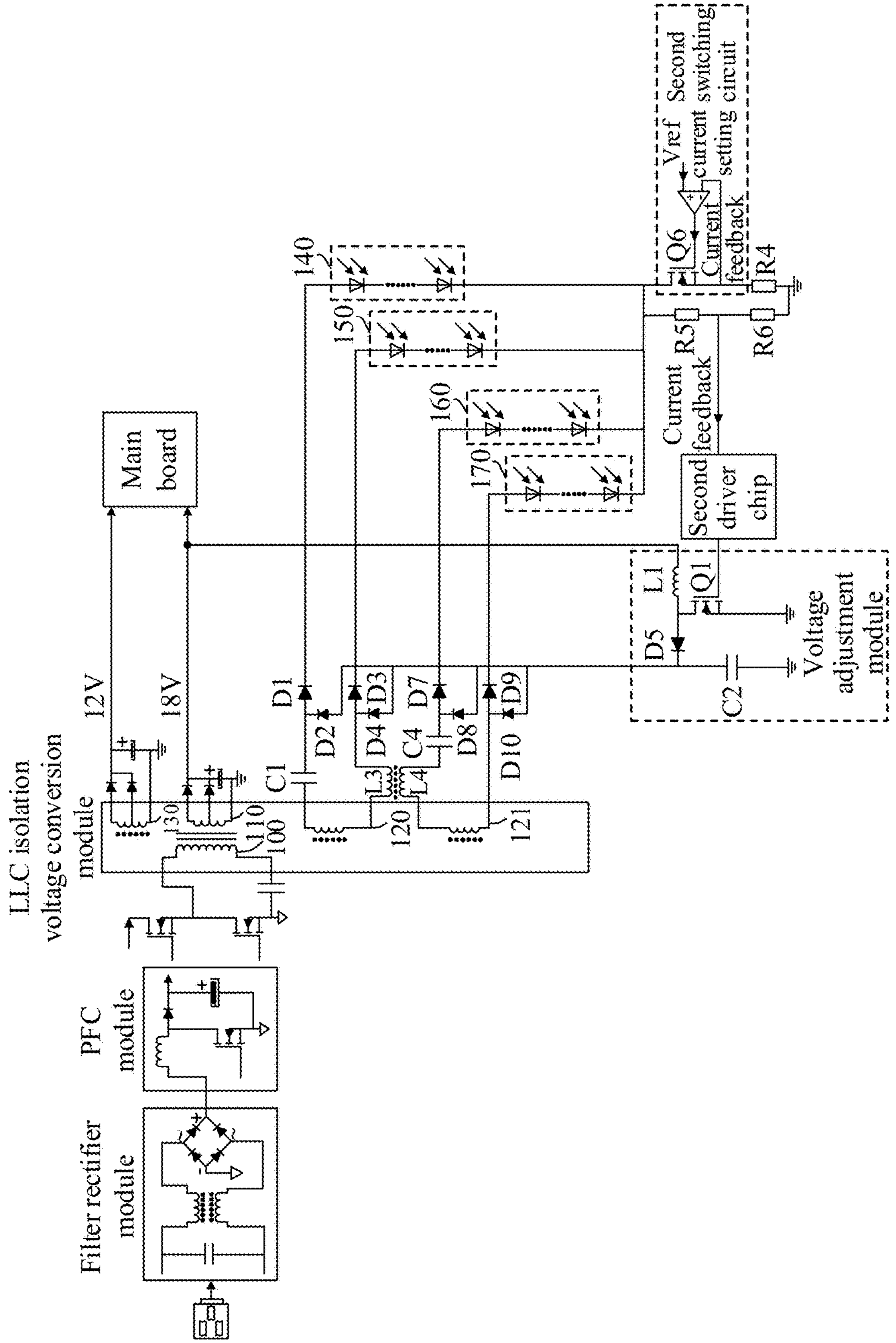
FIG. 16 is another schematic structural diagram of a circuit for a display apparatus with four light strings according to some embodiments.

FIG. 16 is another schematic structural diagram of a circuit of a display apparatus with four light strings according to some embodiments of the disclosure. In the power supply circuit of the display apparatus with four light strings, the second switching circuit is located between the light string group and the grounding resistor. Based on the second switching circuit, the resistance in the loop can be adjusted to change the current in the loop, thereby adjusting the brightness of the light string group. Specifically, when the actual voltage of the light string group exceeds the reference voltage, the transistor can be set to operate in a linear state to share the excess voltage, preventing excessive voltage division in the light string group that may cause circuit damage. Specifically, the second switching circuit can include a fifth transistor Q5 and a comparator. An inverting input end of the comparator can receive the actual total current of the first light string 140 and the second light string 150. Generally, the comparator can compare voltage signals, so the current feedback signal needs to be converted into a voltage feedback signal. The scheme for converting the current feedback signal into a voltage feedback signal can refer to related art. A non-inverting input end of the comparator is provided with the reference voltage, which is converted from the reference current. The scheme for converting the reference current signal into a reference voltage signal can refer to related art. When the voltage feedback signal exceeds the reference voltage, the fifth transistor Q5 can be set to operate in a linear state, absorbing the excess voltage.

Figure 17:
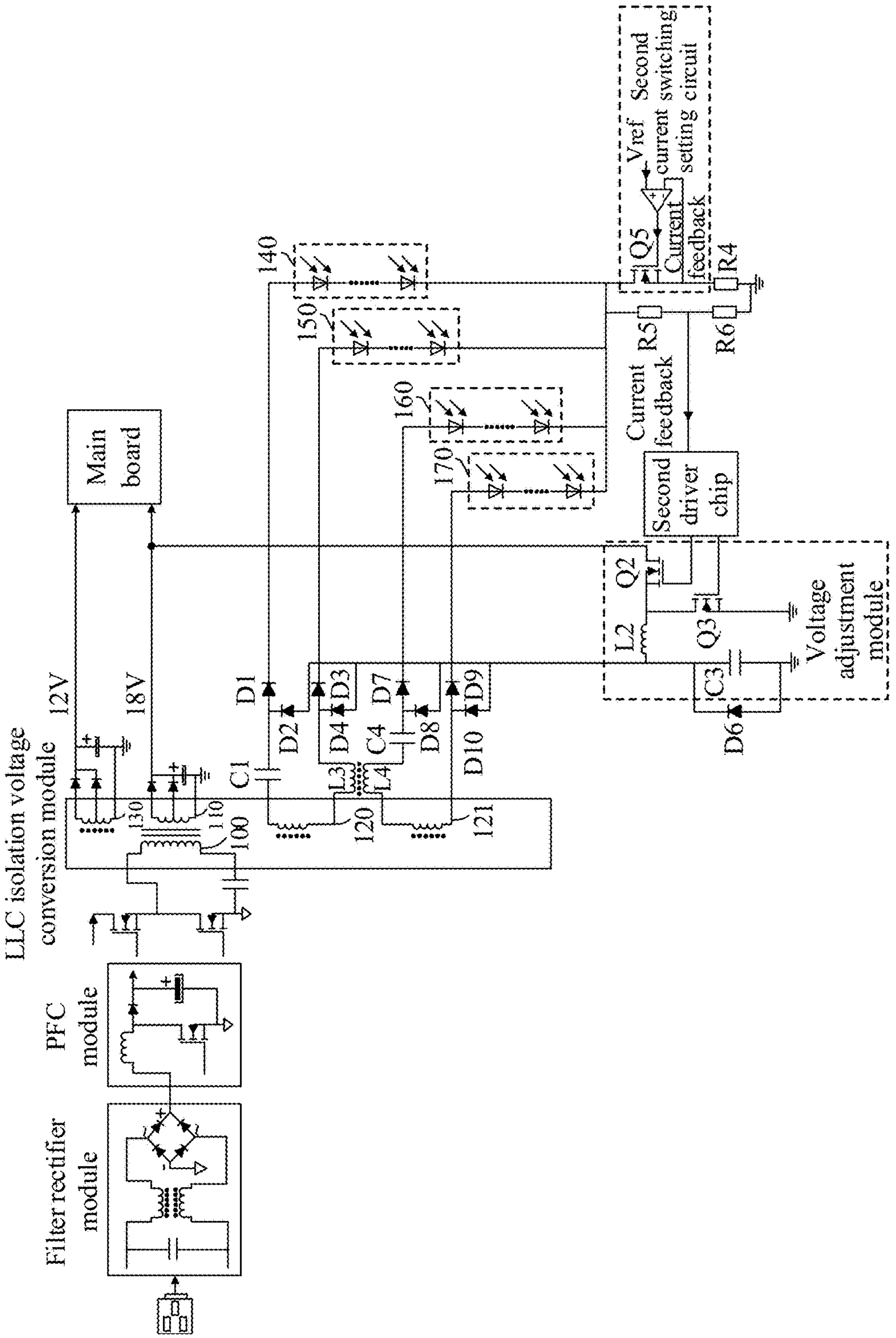
FIG. 17 is another schematic structural diagram of a circuit for a display apparatus with four light strings according to some embodiments.

FIG. 17 is another schematic structural diagram of the circuit of a display apparatus with four light strings according to some embodiments of the disclosure. In this case, the voltage adjustment circuit is exemplified by a buck circuit, adopting the synchronous rectification buck circuit shown in FIG. 11, with an additional second diode D6. While the voltage adjustment module has no output, the second transistor Q2 is turned off, and the current of the light string group flows back to the second secondary coil 120 through the body diode of the third transistor Q3, the second inductor L2, and the fourth equalization diode D4. When the current is too large, significant heat loss occurs on the body diode of the third transistor Q3. To reduce this loss, a new current loop is formed based on the second diode D6, so the current of the light string group flows back to the second secondary coil 120 through the second diode D6 and the fourth equalization diode D4. The second diode D6 can be a low-power diode such as a Schottky diode.

Embodiments of the disclosure further provide a display control method applied to a display apparatus. As shown in FIG. 7, the display apparatus can include a transformer, a voltage conversion module, a feedback module, and a light string group. First and second secondary coils of the transformer are coupled with the primary coil of the transformer. The first secondary coil can output a first voltage based on a power received from the primary coil. The second secondary coil can output a second voltage alternately from both ends based on the power received from the primary coil. The second secondary coils correspond one-to-one with the light string groups. The voltage conversion module can generate an additional voltage based on the first voltage and add the additional voltage onto the corresponding second voltage at both ends of the second secondary coil to output a superimposed third voltage.

The display control method according to embodiments of the disclosure can include: receiving a feedback signal, which is generated by the feedback module based on an output current of the light string group; adjusting a third voltage by adjusting an additional voltage based on the feedback signal; where the third voltage is a working voltage of the light string group. In the embodiments, the additional voltage is generated by adjusting a first voltage output from the primary coil based on the real-time feedback signal of the output current of each LED light string. The additional voltage is transmitted to each LED light string after being superimposed with the second voltage output from the second secondary coil, allowing each LED light string to operate at a rated current and preventing excessive current from damaging the LED components in the LED light strings. The additional voltage is a "variable voltage," and the second voltage is a "fixed voltage." The combination of these two voltages achieves stepped power supply, which helps reduce heat loss. Additionally, the two light strings share the same power supply coil (i.e., the second secondary coil) and voltage conversion module, simplifying the circuit.

The display apparatus according to the embodiments of the disclosure can include a transformer, a voltage conversion module, a feedback module, and a light string group. The voltage conversion module corresponds one-to-one with the light string group, and the light string group can include a first light string and a second light string. The first and second secondary coils of the transformer are coupled with the primary coil of the transformer. The first secondary coil can output the first voltage based on the power received from the primary coil. The second secondary coil can output the second voltage alternately from both ends based on the power received from the primary coil. The second secondary coils correspond one-to-one with the light string group. The voltage conversion module can generate an additional voltage based on the first voltage and add the additional voltage onto the corresponding second voltage at both ends of the second secondary coil to output the superimposed third voltage. The feedback module can generates a feedback signal based on the output current of the light string group and sends it to the voltage conversion module. The feedback signal can be used to instruct the voltage conversion module to adjust the third voltage. The first light string is connected with one corresponding end of the second secondary coil, and the second light string is connected with the other corresponding end of the second secondary coil to emit light based on the third voltage, for emitting light based on the third voltage In the embodiments, the two light strings share the same power supply coil and voltage conversion module, simplifying the circuit; meanwhile, the voltage superposition can achieve stepped power supply, which helps reduce heat loss.

In order to utilize the DC voltage output from an external adapter to meet the power supply demand of the loads in the display apparatus, the disclosure further provides the following embodiments.

Figure 18:
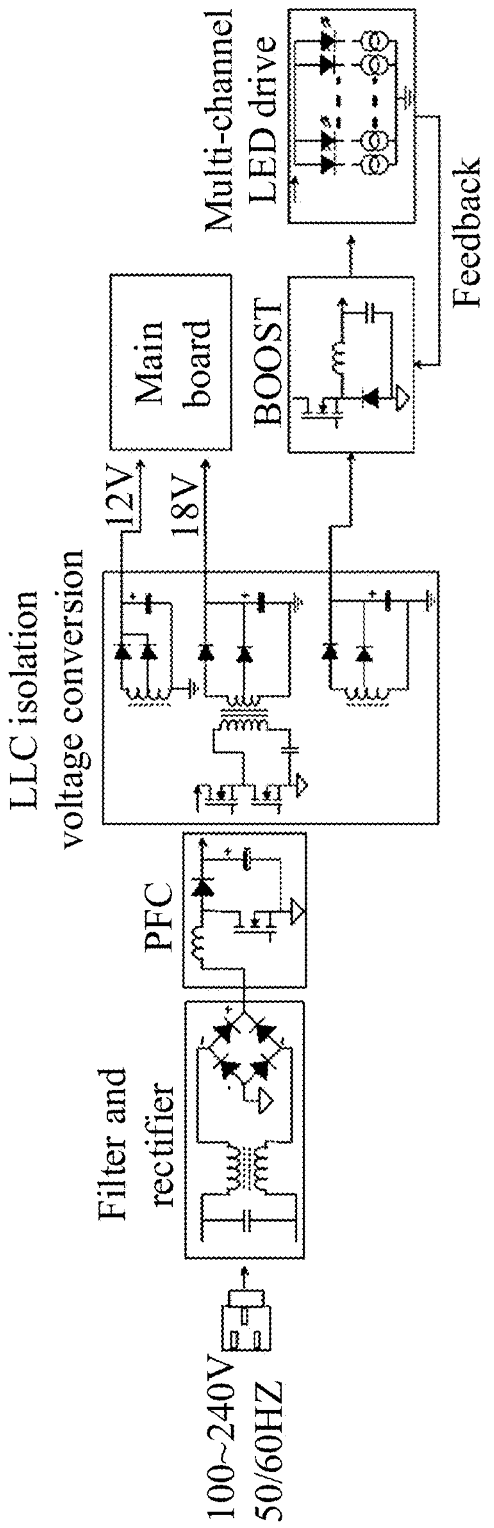
FIG. 18 is a schematic structural diagram of a power supply circuit for supplying power for a main board and a LED string.

Taking the TV as an example as the display apparatus, FIG. 18 is a schematic structural diagram of a power supply circuit for supplying power to the main board and the LED string. The alternating current (100V-240V, 50-60 Hz) of the mains supply obtained by the power supply circuit supplies power to the main board, multiple LED strings and other load (not shown in FIG. 18) of the display apparatus through the filter-and-rectifier module (rectifier bridge), the PFC module and the LLC isolation voltage conversion module in turn. The first secondary winding in the LLC isolation voltage conversion module provides a fifth voltage (such as 12V) to the main board, the second secondary winding provides a sixth voltage (such as 18V) to the main board, and the third secondary winding supplies voltages simultaneously to the multiple LED strings.

The multiple LED strings are configured to light up the display panel of the TV. The LED components in the multiple LED strings need to work within a certain voltage drop range to work at the rated current of the LED components. For example, the multiple LED strings are 16 LED strings. When each LED string includes 9 LED components, under the condition of 120 mA, the required working voltage range of multiple LED strings is 51.3V-58.5V, and the total current is 1.92 A.

Because the voltage range required by the multiple LED strings is related to the working environment of the multiple LED strings, the hardware characteristics and the life span of the LED components, and other factors, it needs to be adjusted in real time. Therefore, in the LLC isolation voltage conversion module, the secondary winding that supplies power to multiple LED strings is additionally connected with a voltage adjustment module (such as a buck circuit or a boost circuit, and the boost circuit is taken as an example in FIG. 18). According to the real-time current feedback results for the multiple LED strings, the voltage directly output from the third secondary winding can be adjusted, so that the driver module for multiple LED strings controls the multiple LED strings to work at the rated current according to the received adjusted voltage to prevent damage to the components due to over-large current flow through the LED components in the multiple LED strings.

However, in the power supply circuit shown in FIG. 18, the challenge of the voltage adjustment module set for the multiple LED strings in the power supply circuit is relatively large, for example, when the required voltage range of the multiple LED strings is 51.3V-58.5V, the voltage adjustment module needs to adjust, for example stepping up or stepping down, the voltage greater than 50V, resulting in a relatively large withstand voltage value for the switching transistors, capacitors and other components in the voltage adjustment module, which in turn occupies a larger area of the PCB board of the power supply circuit, ultimately increasing the cost of the power supply circuit.

Figure 19:
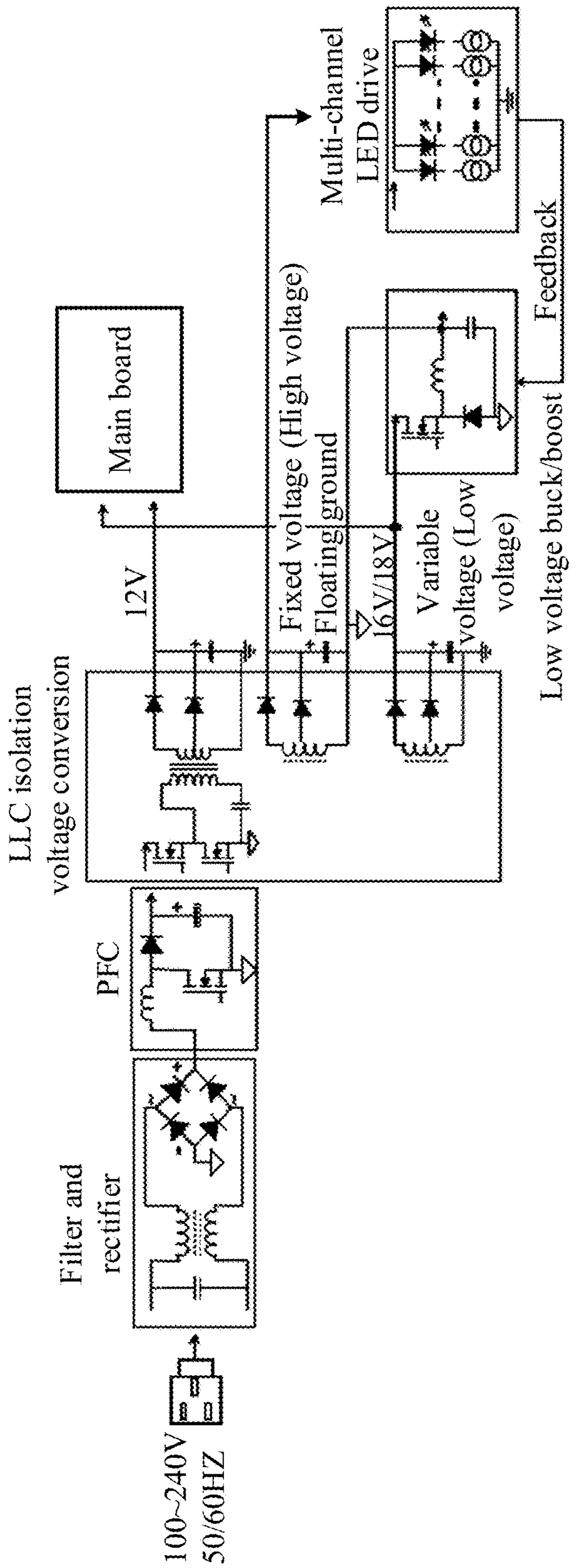
FIG. 19 is another schematic structural diagram of a power supply circuit for supplying power for a main board and a LED string.

FIG. 19 is another schematic structural diagram of a power supply circuit for supplying power to the main board and the LED string. The difference from the power supply circuit shown in FIG. 18 is that "stepped power supply" is adopted in FIG. 19, and two different secondary windings of the LLC isolation voltage conversion module supply power to the LED strings. Specifically, the power supply circuit can include three power supply branches. The first power supply branch can include a first secondary winding in the LLC isolation voltage conversion module, and can be configured to output a fifth voltage (for example, 12V) to the main board. The second power supply branch can include a second secondary winding in the LLC isolation voltage conversion module and can be configured to output a sixth voltage as a fixed voltage. The third power supply branch can include a third secondary winding in the LLC isolation voltage conversion module and can be configured to output a seventh voltage (such as 16V or 18V). The voltage adjustment module (low voltage buck/boost) can convert the seventh voltage into the eighth voltage, and provide a sum of the seventh voltage and the eighth voltage to the LED string. In the process of supplying power to the LED string, due to the flexible setting of two different voltages output from the second secondary winding and the third secondary winding respectively, the voltage adjustment module only needs to adjust the smaller voltage output from the secondary winding, thereby reducing the requirements for withstand voltage of components such as switch transistors and capacitors in the voltage adjustment module, thereby reducing the area of the PCB board of the power supply circuit, and finally reducing the cost of the power supply circuit.

Figure 20:
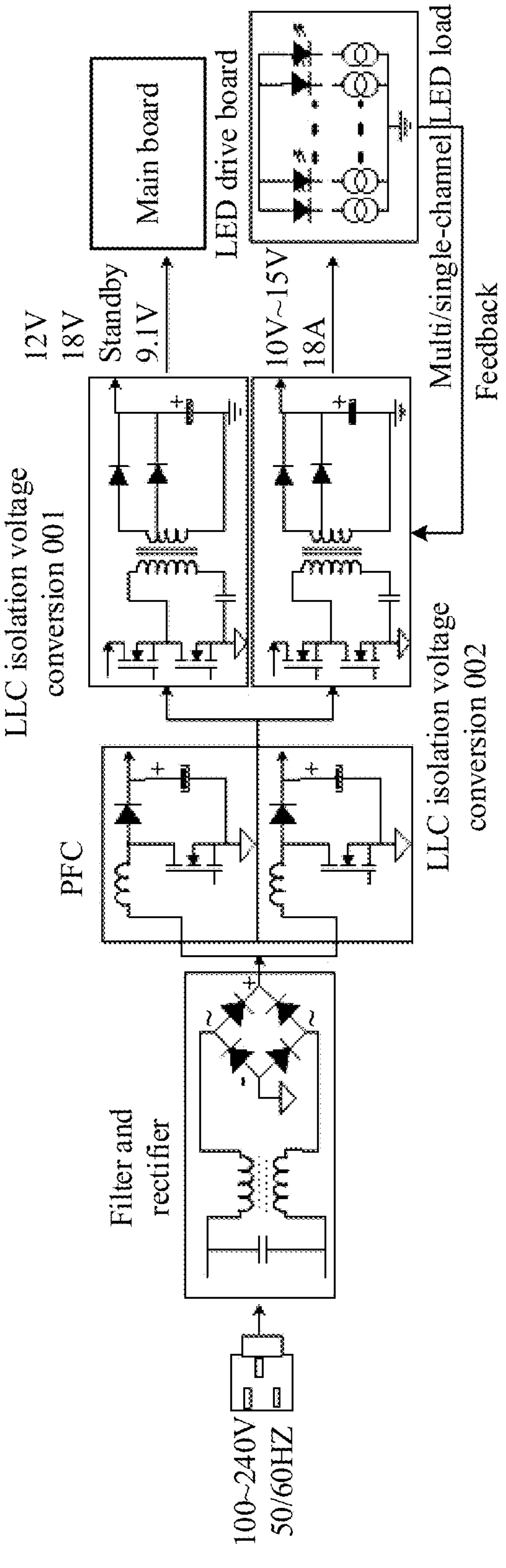
FIG. 20 is another schematic structural diagram of a power supply circuit for supplying power for a main board and a LED string.

FIG. 20 shows another schematic structural diagram of a power supply circuit for supplying power to the main board and the LED string. The AC (100V-240V, 50-60 Hz) obtained by the power supply circuit from the mains supply can be output to two PFC modules through the filtering and rectifier module (i.e., a rectifier bridge). Each PFC module is connected with one LLC isolation voltage conversion module. One of the LLC isolation voltage conversion modules 001 and 002 can supply power, such as a voltage of 12V, a voltage of 18V or a voltage of 9.1V in standby mode, to the main board. Different voltages can be supplied to the main board by adjusting the switching frequency or duty cycle of the transistor in the LLC isolation voltage conversion module. The other LLC isolation voltage conversion module can provide the voltage of 10V-15V and a constant current of 18 A to multi-channel or single-channel LED load, and adjust the output voltage of the LLC module based on a feedback circuit.

With the development of electronic technology, the integration level of electronic apparatuses including display apparatuses such as televisions is getting higher and higher, which further proposes higher and higher requirements on the power supply of the display apparatuses. In FIG. 18, FIG. 19 and FIG. 20, the power supply structure of the display apparatus is directly connected with the AC of the mains supply, and a special power supply circuit is configured in the power board of the display apparatus to transform the AC and convert AC to DC, and at least includes the following modules: a rectifier bridge, a Power Factor Correction (PFC) module, and a resonant conversion circuit (LLC) voltage conversion module. The LLC isolation voltage conversion module can be configured to generate multiple DC voltages to meet the power supply requirements of the loads in the display apparatus. Since the power supply architecture includes at least one filter-and-rectifier module, at least one PFC module, and at least one LLC isolation voltage conversion module, and the LLC isolation voltage conversion module includes at least one secondary winding, the circuit structure of the power supply is relatively complicated, and accordingly, the complicated circuit is not conducive to increasing the degree of integration.

Figure 21:
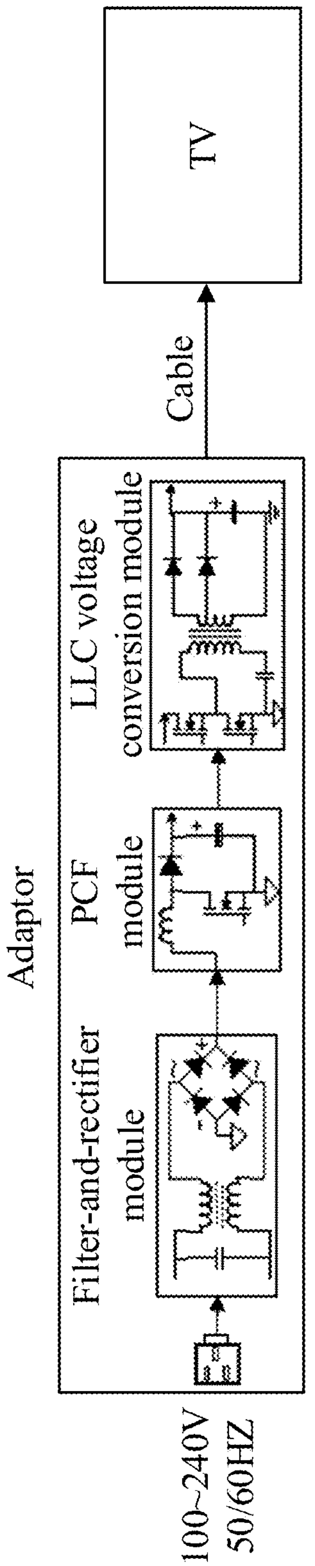
FIG. 21 is a schematic diagram of an external adapter in a power supply mode.

With the rise of power adapters and the promotion of gallium nitride devices, the power supply of display apparatuses has gradually developed into an external device, that is, the external power adapters are configured to complete the transformation of AC power, AC-DC conversion, etc., and output a fixed DC voltage. FIG. 21 is a schematic diagram of an external adapter in the power supply mode provided by embodiments of the disclosure, providing power supply to a display apparatus such as a TV. It can be seen that the display apparatus (the TV shown in FIG. 21) is provided with a single fixed DC input voltage provided by the power adapter through a cable.

In the above-mentioned power supply architecture for display apparatus shown in FIG. 18, FIG. 19 and FIG. 20, multiple secondary windings of the LLC isolation voltage conversion module are configured to output multiple voltages to supply power for the loads of the display apparatus, which is not applicable to the external power adaptor in the power supply mode shown in FIG. 21. How to use the single fixed DC input voltage provided by the external adapter to supply power to the load of the display apparatus is an issue to be solved.

Based on the above issue, the display apparatus provided by the disclosure are provided with a power supply interface connected with an external adapter to receive a DC input voltage to adapt to the power supply mode of the external adapter. The DC input voltage is configured to generate an additional voltage, and the additional voltage and the DC input voltage are superimposed to realize stepped power supply, which is beneficial to reduce heat loss. The energy storage element is configured to realize continuous power supply for the backlight control module. The power supply voltage of the backlight control module is adjusted in time through real-time feedback, so that the light-emitting diodes work stably.

The content of the disclosure and how the content of the disclosure solves the above technical problems will be described in detail below with specific embodiments. Embodiments of the disclosure will be described below in conjunction with the accompanying drawings.

Figure 22:
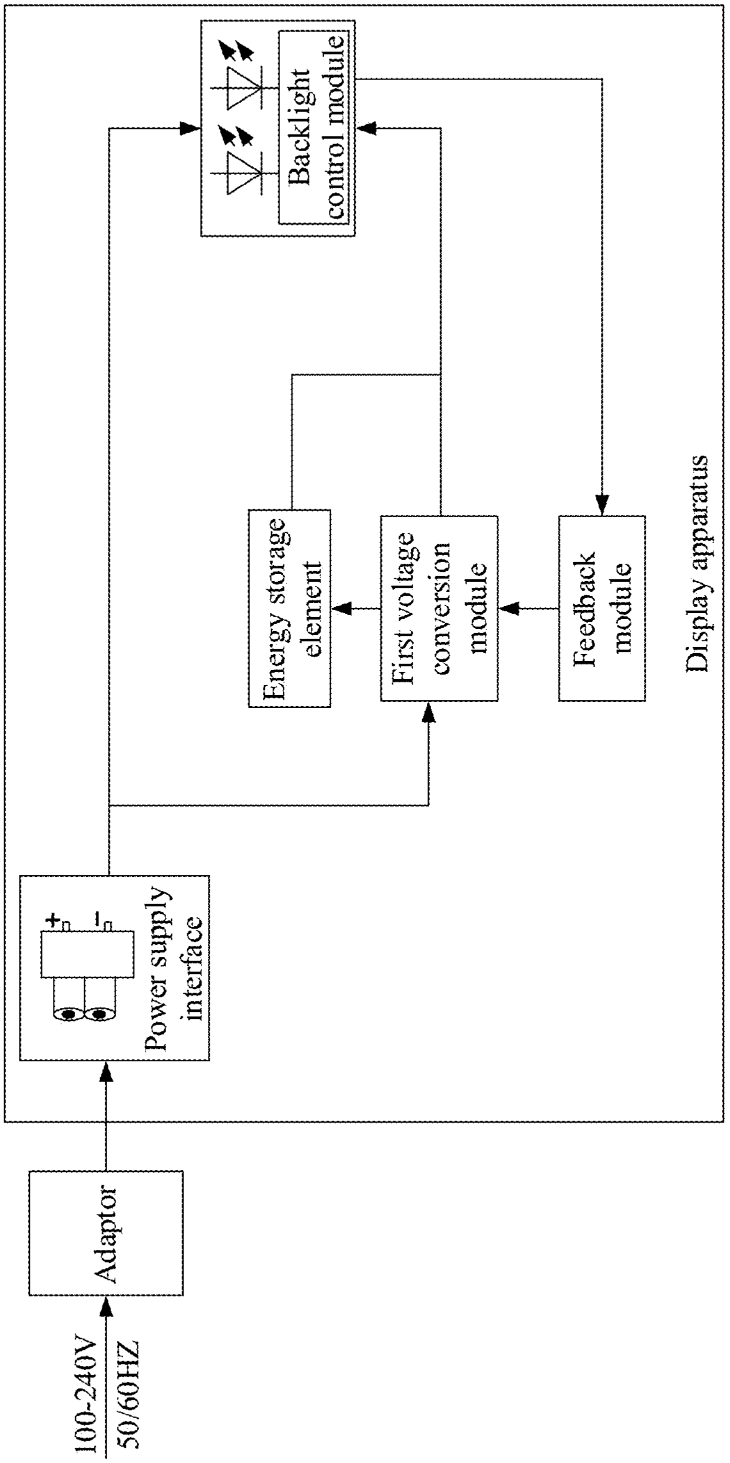
FIG. 22 is a schematic structural diagram of a power supply circuit of a display apparatus.

FIG. 22 is a schematic structural diagram of a power supply circuit of a display apparatus provided by embodiments of the disclosure, including: a backlight control module, a power supply interface, a first voltage conversion module, an energy storage element, and a feedback module.

The backlight control module can be configured to control the light-emitting diodes to emit light. The light-emitting diodes can be configured to light up the panel of the display apparatus. The power supply interface can be configured to receive the DC input voltage provided by the external adapter. The first voltage conversion module can be configured to generate the fifth voltage according to the DC input voltage. The energy storage element is connected with the first voltage conversion module and configured to store energy of the fifth voltage. The energy storage element and the first voltage conversion module alternately output the fifth voltage.

A negative electrode of the backlight control module is provided with the fifth voltage, and the fifth voltage serves as a negative reference voltage of the backlight control module. A positive electrode of the backlight control module is provided with the DC input voltage. The feedback module can be configured to send a feedback signal generated by the backlight control module to the first voltage conversion module. The feedback signal can be configured to instruct the first voltage conversion module to adjust the fifth voltage to adjust the required voltage of the backlight control module.

The voltage between both sides of the backlight control module is a sum of the absolute values of the DC input voltage and the fifth voltage. The DC input voltage corresponds to a "fixed voltage", and the fifth voltage corresponds to a "variable voltage". The above-mentioned circuit structure using the fixed voltage and the variable voltage to supply power to the backlight control module is "stepped power supply", which can reduce the requirements such as the withstand voltage value of the electrical components in the first voltage conversion module, so as to reduce costs and improve efficiency, and meanwhile reduce heat loss on electrical components.

As shown in FIG. 22, the external adapter receives AC power (100V-240V, 50-60 Hz) from the mains supply, and the internal circuit of the external adapter can be shown in FIG. 21, including at least a filter-and-rectifier module, a PFC module, and an LLC isolation voltage conversion module. This external adapter outputs a fixed DC voltage. The display apparatus is provided with a power supply interface connected with the external adapter for receiving a DC input voltage, so as to adapt to the power supply mode of the external adapter shown in FIG. 21. Compared with FIG. 18 to FIG. 20, there is no need to arrange the filter-and-rectifier module, the PFC module, and the LLC isolation voltage conversion module on the power board of the display apparatus, which is beneficial to simplify the circuit.

In some embodiments, the energy storage element shown in FIG. 22 may be a single energy storage capacitor or other energy storage circuits. The energy storage element cooperates with the first voltage conversion module to alternately output the fifth voltage, continuously provide a negative reference voltage for the backlight control module, and make the light-emitting diodes emit light stably.

Figure 23:
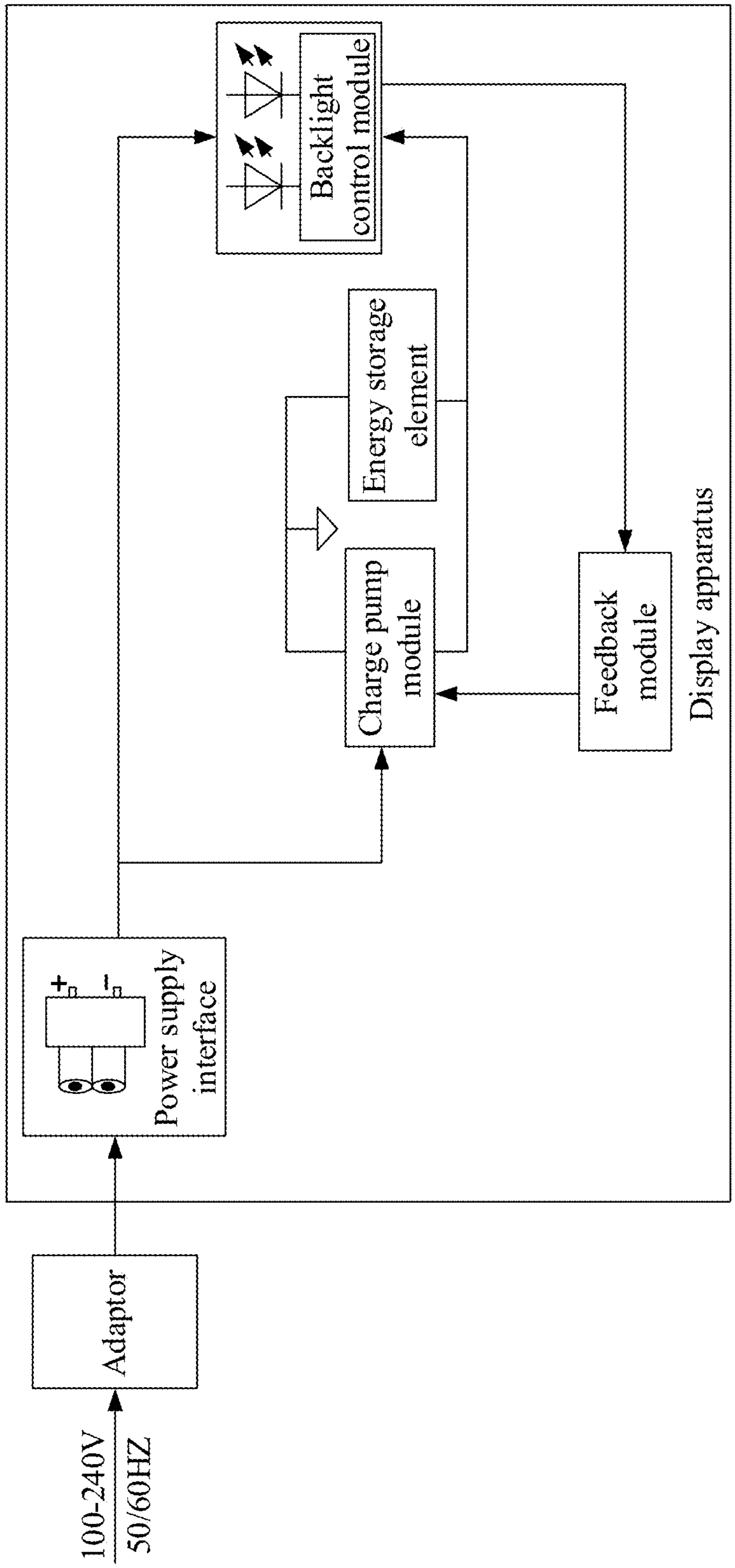
FIG. 23 is another schematic structural diagram of a power supply circuit of a display apparatus.

In some embodiments, the first voltage conversion module shown in FIG. 22 may be in the form of a charge pump. FIG. 23 is another schematic structural diagram of a power supply circuit of a display apparatus provided by embodiments of the disclosure. As shown in FIG. 23, the first voltage conversion module includes: a charge pump module. The charge pump module can be configured to generate a fifth voltage in a charging state and provide the fifth voltage to the negative electrode of the backlight control module in a discharging state. A first end of the energy storage element is connected with a positive output end of the charge pump module, and grounded. A second end of the energy storage element is connected with a negative output end of the charge pump module. The energy storage element can be configured to store the fifth voltage while the charge pump module is being discharged and provide the fifth voltage to the negative electrode of the backlight control module while the charge pump module is charged. The feedback signal can be configured to instruct the charge pump module to adjust the fifth voltage to adjust the required voltage of the backlight control module.

The first voltage conversion module in the form of a charge pump in the embodiment is a non-inductive DC-DC power converter, that is, there is no inductive element in the voltage converter in the form of a charge pump, so the voltage conversion does not involve high-speed conversion of a magnetic field, which is a high-speed conversion of electromagnetism and magnetoelectricity, the problem of electromagnetic interference can be almost ignored. The principle of voltage conversion in the form of a charge pump is to utilize high-speed charging and discharging of internal capacitive elements, so it has the advantage of low electromagnetic interference. In addition to low electromagnetic interference, it also has the advantages of larger output voltage adjustment range, high efficiency, small size, low quiescent current, low minimum operating voltage, and low noise, etc. In addition, the integration of capacitors is easier and cheaper than the integration of inductors, so the first voltage conversion module in the form of a charge pump is easier to achieve high integration, and the cost for the overall application circuit is not high.

In some embodiments, the energy storage element shown in FIG. 23 may be a single energy storage capacitor or other energy storage circuits. The energy storage element cooperates with the charge pump module to alternately output the fifth voltage to continuously supply power to the backlight control module so that the light emitting diodes emit light stably.

The principle of coordinating power supply by the first voltage conversion module and the energy storage element will be described below in combination with the specific circuit structure schematic diagram of the charge pump module and the energy storage element.

Figure 24:
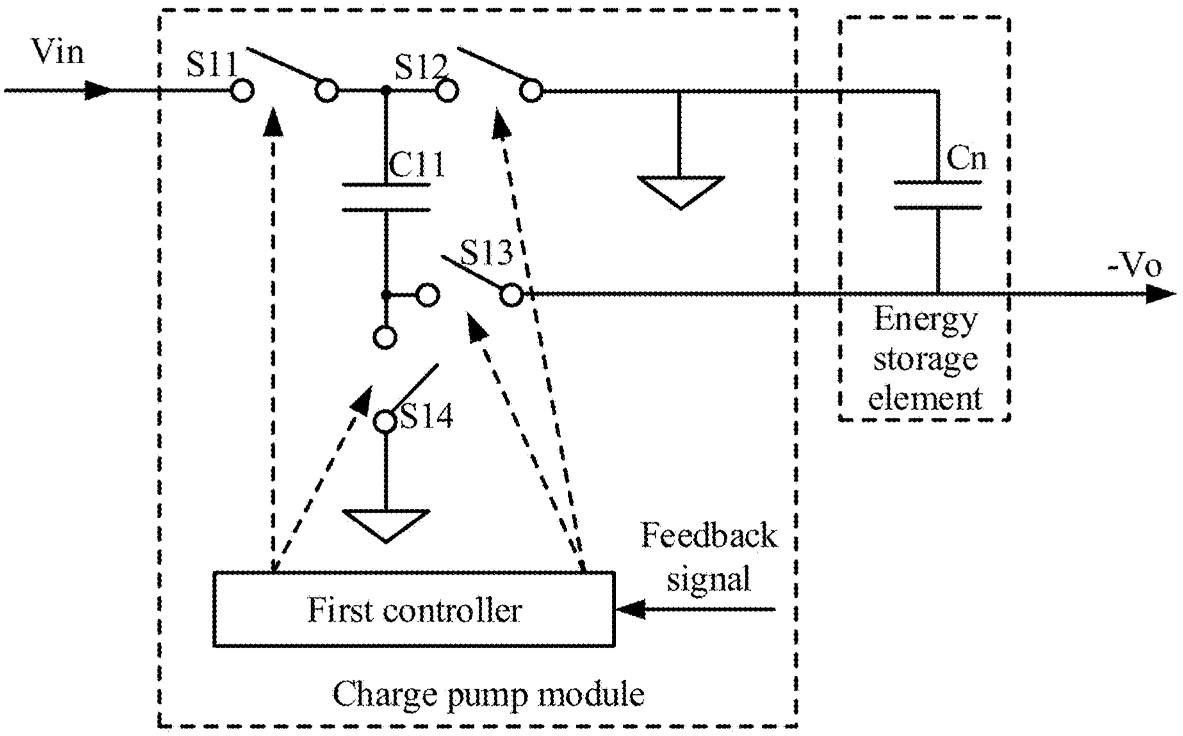
FIG. 24 is a schematic structural diagram of a power supply circuit with a charge pump module.

In some embodiments, FIG. 24 is a schematic structural diagram of a power supply circuit with a charge pump module provided in embodiments of the disclosure. The energy storage element Cn is a single energy storage capacitor as an example. The charge pump module can include: a first controller, a first energy storage capacitor C11, a first switch S11, a second switch S12, a third switch S13 and a fourth switch S14.

A first end of the first switch S11 is provided with a DC input voltage Vin, a second end of the first switch S11 is connected with a first end of the second switch S12. A second end of the second switch S12 serves as a positive output end of the charge pump module, and is connected with a first end of the energy storage element Cn and grounded. A first end of the first energy storage capacitor C11 is connected with the second end of the first switch S11 and the first end of the second switch S12. A second end of the first energy storage capacitor C11 is connected with a first end of the third switch S13 and a first end of the fourth switch S14. A second end of the fourth switch S14 is grounded. A second end of the third switch S13 serves as a negative output end of the charge pump module, is connected with a second end of the energy storage element Cn, and can be configured to output the fifth voltage-Vo.

The first controller is connected with control ends of the first switch S11, the second switch S12, the third switch S13 and the fourth switch S14, and can be configured to control the switching frequencies of the first switch S11, the second switch S12, the third switch S13 and the fourth switch S14 according to the feedback signal, to adjust the fifth voltage-Vo. The switching states of the first switch S11 and the second switch S12 are different. The first switch S11 and the fourth switch S14 are turned off or turned on simultaneously. The second switch S12 and the third switch S13 are turned off or turned on simultaneously.

Based on the power supply circuit shown in FIG. 24, the principle of cooperation between the charge pump module and the energy storage element to provide a negative reference voltage for the negative electrode of the backlight control module is as follows.

Step (1): The first controller controls the first switch S11 and the fourth switch S14 to be turned off simultaneously, and the second switch S12 and the third switch S13 to be turned on simultaneously. In this case, the DC input voltage Vin charges the first energy storage capacitor C11 through the turned-on first switch S11. The charging time of the first energy storage capacitor C11 is controlled by controlling the turn-off time of the second switch S12 and the third switch S13, and the turn-on time of the first switch S11 and the fourth switch S14, so as to control the energy storage voltage of the first energy storage capacitor C11. Assuming that the energy storage voltage of the first energy storage capacitor C11 after charging is Vo, in this case, since the second end of the first energy storage capacitor C11 is grounded, the voltage of the first end of the first energy storage capacitor C11 is Vo.

Step (2): The first controller controls the first switch S11 and the fourth switch S14 to be turned off simultaneously, and the second switch S12 and the third switch S13 to be turned on simultaneously. In this case, the first end of the first energy storage capacitor C11 is grounded, so the voltage at the second end of the first energy storage capacitor C11 is −Vo (i.e., the fifth voltage), which can be configured to provide a negative reference voltage to the negative electrode of the backlight control module. Meanwhile, the first energy storage capacitor C11 charges the energy storage element Cn, so that the energy storage voltage of the energy storage element Cn is Vo after charging. Since the first end of the energy storage element Cn is also grounded, the voltage at the second end of the energy storage element Cn is −Vo (i.e., the fifth voltage).

Step (3): The first controller controls the first switch S11 and the fourth switch S14 to be turned on simultaneously, and the second switch S12 and the third switch S13 to be turned off simultaneously. Repeat the charging process for the first energy storage capacitor C11 in Step (1). In this case, the first end of the energy storage element Cn is grounded, and the second end of the energy storage element Cn provides a negative reference voltage, i.e., the fifth voltage-Vo, to the negative electrode of the backlight control module.

The above-mentioned power supply circuit shown in FIG. 24 can generate the fifth voltage-Vo based on the DC input voltage Vin, and provide the fifth voltage-Vo to the negative electrode of the backlight control module as the negative reference voltage of the backlight control module. Combined with the DC input voltage Vin inputted by the positive electrode of the backlight control module, the voltage across the backlight control module is equal to the sum of absolute values of the DC input voltage Vin and the fifth voltage Vo, that is, the required voltage Vled of the backlight control module is equal to (Vin+Vo).

For the power supply circuit shown in FIG. 24, only the magnitude of the fifth voltage-Vo needs to be controlled to control the variation of the required voltage Vled of the backlight control module. The first controller can control the switching frequencies or duty cycles of the first switch S11, the second switch S12, the third switch S13, and the fourth switch S14, based on the feedback signal, to control the amount of charge transfer, so as to meet the requirements of controlling the voltage Vled of the backlight control module.

The DC input voltage Vin is relatively stable, serving as a "fixed voltage". The fifth voltage-Vo serves as a "variable voltage". Since the DC input voltage Vin is relatively stable, the voltage variation range of the output fifth voltage −Vo depends on the required variation range of the required voltage Vled of the backlight control module. The above-mentioned circuit structure using fixed voltage and variable voltage to supply power to the backlight control module is "stepped power supply", which can reduce the requirements such as the withstand voltage value of the electrical components in the first voltage conversion module, so as to reduce costs, improve efficiency, and reduce heat loss on electrical components.

Figure 25:
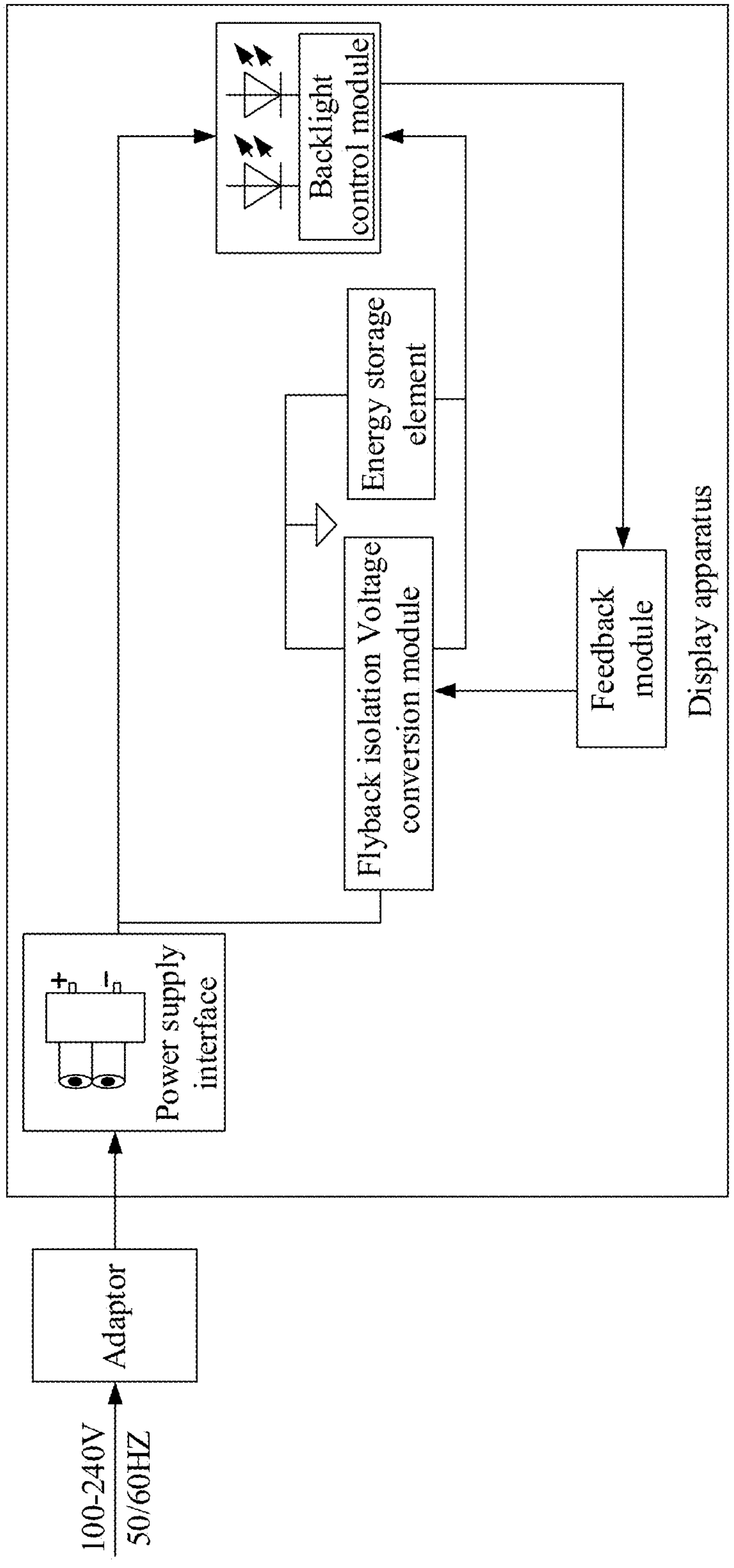
FIG. 25 is another schematic structural diagram of a power supply circuit of a display apparatus.

In some embodiments, the first voltage conversion module shown in FIG. 22 may be in the mode of flyback isolation. FIG. 25 is another schematic structural diagram of a power supply circuit of a display apparatus provided by embodiments of the disclosure. As shown in FIG. 25, the first voltage conversion module can include a flyback isolation voltage conversion module.

The flyback isolation voltage conversion module can be configured to generate the fifth voltage from the secondary winding while a conducting path is formed in the primary winding, and transfer the fifth voltage to the negative electrode of the backlight control module. The first end of the energy storage element is connected with a positive output end of the flyback isolation voltage conversion module and grounded, the second end of the energy storage element is connected with a negative output end of the flyback isolation voltage conversion module. The energy storage element can be configured to store the fifth voltage while a conducting path is formed in the primary winding, provide the fifth voltage to the negative electrode of the backlight control module. The feedback signal can be configured to instruct the flyback isolation voltage conversion module to adjust the fifth voltage to adjust the required voltage of the backlight control module.

Specifically, in the flyback isolation voltage conversion module adopted in the embodiment, the primary winding is electrically isolated from the secondary winding. "Flyback" specifically means that while the switching transistor is turned on, the secondary winding transformer acts as an inductor, and the electric energy is converted into magnetic energy. In this case, there is no current in the output circuit. On the contrary, while the switching transistor is turned off, the secondary winding transformer releases energy, the magnetic energy is converted into the electrical energy, there is current in the output circuit. In the flyback isolation voltage conversion module, the secondary winding transformer also acts as an energy storage inductor, which has the characteristics of fewer components, simple circuit, low cost, and small size. Meanwhile, electrical isolation improves the safety of use.

In some embodiments, the energy storage element shown in FIG. 25 may be a single energy storage capacitor or other energy storage circuits. The energy storage element cooperates with the flyback isolation voltage conversion module to alternately output the fifth voltage, continuously providing a negative reference voltage for the backlight control module, so that the light-emitting diodes can emit light stably.

In the following, the principle of coordinating power supply between the first voltage conversion module and the energy storage element will be described in combination with the specific circuit structure schematic diagram of the flyback isolation voltage conversion module and the energy storage element.

Figure 26:
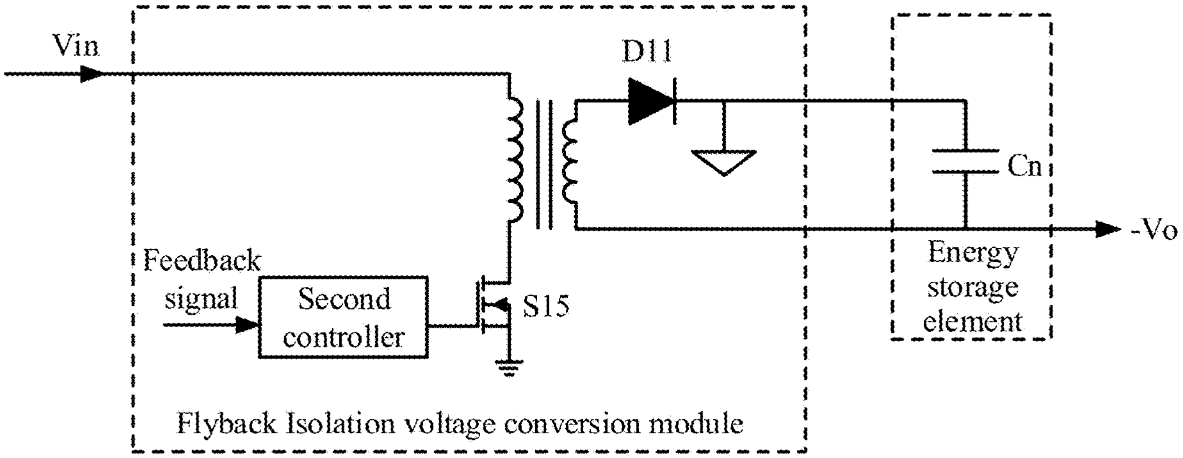
FIG. 26 is a schematic structural diagram of a power supply circuit of a flyback isolation voltage conversion module.

In some embodiments, FIG. 26 is a schematic structural diagram of a power supply circuit with a flyback isolation voltage conversion module provided in embodiments of the disclosure. The flyback isolation voltage conversion module can include: a primary winding, a secondary winding, a first diode D11, a second controller and a fifth switch S15.

A first end of the primary winding is provided with the DC input voltage Vin, a second end of the primary winding is connected with a first end of the fifth switch S15. A second end of the fifth switch S15 is grounded. The secondary winding is coupled to the primary winding, and a first end of the secondary winding is connected with a positive electrode of the first diode D11. A negative electrode of the first diode D11 serves as the positive output end of the flyback isolation voltage conversion module, and is connected with the first end of the energy storage element Cn, and grounded. A second end of the secondary winding serves as the negative output end of the flyback isolation voltage conversion module, and is connected with the second end of the energy storage element Cn to output the fifth voltage −Vo.

The second controller is connected with a control end of the fifth switch S15, and can be configured to adjust the fifth voltage −Vo by controlling the switching frequency of the fifth switch S15 according to the feedback signal.

Based on the power supply circuit shown in FIG. 26, the principle of the cooperation between the flyback isolation voltage conversion module and the energy storage element to provide a negative reference voltage for the negative electrode of the backlight control module is as follows.

Step (1): The second controller controls the fifth switch S15 to be turned on, the current of the primary winding increases linearly, and the energy stored in the inductor increases; the first diode D11 is not turned on. The energy storage voltage of the primary winding can be controlled by controlling the switching frequency of the fifth switch S15.

Step (2): The second controller controls the fifth switch S15 to be turned off, the current of the primary winding is cut off, and the first diode D11 is turned on. The first end of the secondary winding is grounded through the first diode D11, and the second end of the secondary winding can output a fifth voltage −Vo by setting the turns ratio of the primary winding and the secondary winding, to provide a negative reference voltage to the negative electrode of the backlight control module. Meanwhile, the secondary winding charges the energy storage element Cn, so that the energy storage voltage of the energy storage element Cn is Vo after charging. Since the first end of the energy storage element Cn is grounded, the voltage at the second end of the energy storage element Cn is −Vo (i.e., the fifth voltage).

Step (3): The second controller controls the fifth switch S15 to be turned on, and step (1) of the energy storage process of the primary winding is repeated. In this case, the first end of the energy storage element Cn is grounded, and the second end of the energy storage element Cn provides a negative reference voltage, i.e., the fifth voltage −Vo, to the negative electrode of the backlight control module.

The above-mentioned power supply circuit shown in FIG. 26 generates the fifth voltage −Vo based on the DC input voltage Vin, and provides the fifth voltage −Vo to the negative electrode of the backlight control module as the negative reference voltage of the backlight control module. Combined with the DC input voltage Vin inputted by the positive electrode of the backlight control module, the voltage across the backlight control module is equal to the sum of the absolute values of the DC input voltage Vin and the fifth voltage, that is, the required voltage Vled of the backlight control module is equal to (Vin+Vo).

For the power supply circuit shown in FIG. 26, it is only necessary to control the magnitude of the fifth voltage −Vo to control the variation of the required voltage Vled of the backlight control module. Based on the feedback signal, the second controller controls the amount of charge transfer by controlling the switching frequency or duty cycle of the fifth switch S15, so as to achieve the purpose of controlling the required voltage Vled of the backlight control module.

The DC input voltage Vin is relatively stable, which serves as a "fixed voltage". The fifth voltage-Vo serves as a "variable voltage". Since the DC input voltage Vin is relatively stable, the voltage variation range of the output fifth voltage −Vo depends on the required variation range of the required voltage Vled of the backlight control module. The above-mentioned circuit structure using the fixed voltage and the variable voltage to supply power to the backlight control module is "stepped power supply", which can reduce the requirements such as the withstand voltage value of the electrical components in the first voltage conversion module, so as to reduce costs, improve efficiency, and reduce heat loss on electrical components.

Figure 27:
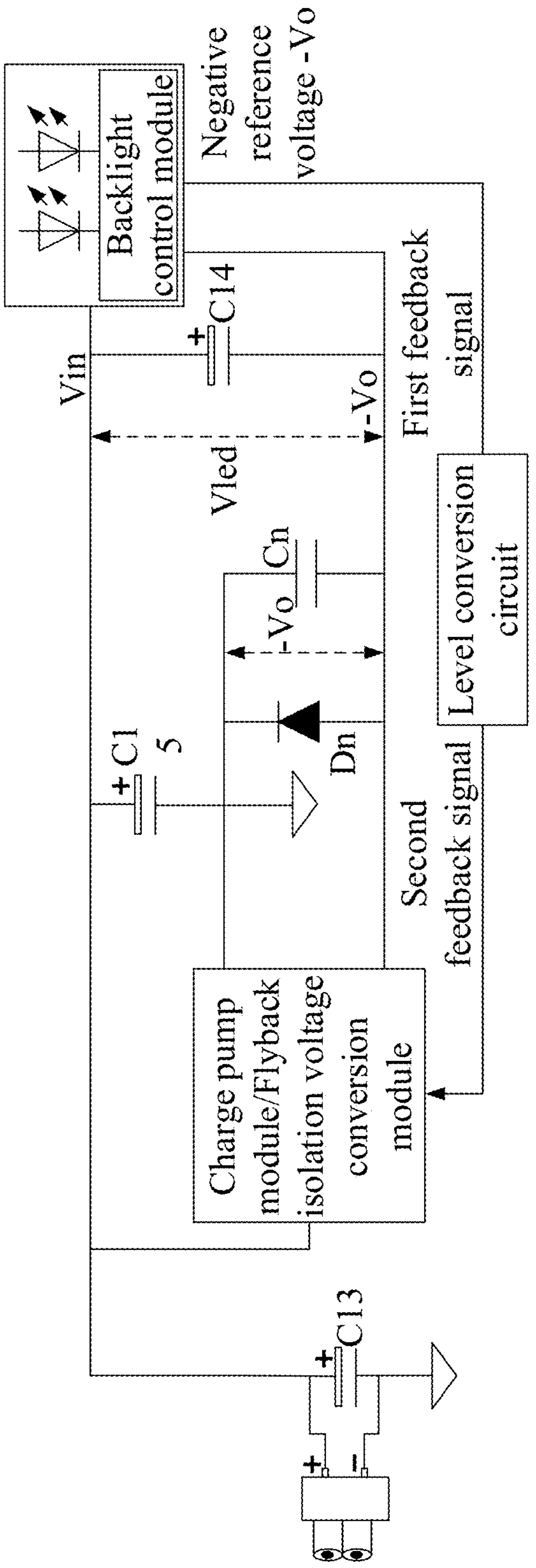
FIG. 27 is a schematic structural diagram of a level conversion circuit.

FIG. 27 is a schematic structural diagram of a level conversion circuit provided by embodiments of the disclosure. In some embodiments, the feedback module can include a level conversion circuit. The level conversion circuit can be configured to receive the first feedback signal output from the backlight control module, convert the first feedback signal into a second feedback signal, and output the second feedback signal to the first voltage conversion module. The reference voltages of the first feedback signal and the second feedback signal are different.

Since the reference voltage of the backlight control module is −Vo and the reference voltage of the first voltage conversion module is 0, the first feedback signal generated by the backlight control module cannot be directly sent to the first voltage conversion module. Based on this, the level conversion circuit converts the first feedback signal whose reference low level is −Vo into the second feedback signal whose reference voltage is 0. For the level conversion circuit, a reference may be made to the related art.

In some embodiments, the display apparatus can further include a first filter module. The first filter module is connected with the power supply interface and the first voltage conversion module, and can be configured to filter the DC input voltage. The first filter module may be a filter circuit including one or more grounded capacitors, or a filter circuit including capacitors and inductors. As shown in FIG. 27, the first filter module takes the first filter capacitor C13 as an example, and the first filter capacitor C13 is connected in parallel between the DC input voltage of the power supply interface and the ground. The first filter capacitor C13 can be configured to filter the clutter and AC components of the power supply, smooth the pulsating DC voltage, and store electrical energy. The capacitance of the first filter capacitor C13 is related to the load current and the purity of the power supply, and a larger-capacity filter capacitor is usually selected.

In some embodiments, the first filter capacitor C13 may be an electrolytic capacitor as shown in FIG. 27. The electrolytic capacitor is a kind of capacitor. The metal foil is the positive electrode (aluminum or tantalum), and the oxide film (aluminum oxide or tantalum pentoxide) close to the metal is the dielectric. The cathode is made of conductive material, electrolyte (the electrolyte can be liquid or solid) and other materials together, because the electrolyte is the main part of the cathode. The capacitance per unit volume of the electrolytic capacitor is very large. Since the preparation materials are common industrial materials and the preparation process is also performed by a common industrial process, the electrolytic capacitors can be mass-produced, so the cost is relatively low. It should be noted that the positive and negative of electrolytic capacitors cannot be connected incorrectly.

In some embodiments, the first filter capacitor C13 can also be other types of capacitors, such as ceramic tape capacitors, film capacitors, mica capacitors, and the like. In the actual circuit, it can be selected according to the capacitance requirement.

In some embodiments, the display apparatus further includes a second filter module. The second filter module is disposed between the positive electrode and the negative electrode of the backlight control module. The second filter module may be a filter circuit including one or more grounded capacitors, or a filter circuit including capacitors and inductors. As shown in FIG. 27, the second filter module takes the second filter capacitor C14 as an example to stabilize the voltage across the backlight control module.

In the display apparatus according to some embodiments, a third filter module is further provided to filter the clutter in the DC input voltage Vin input to the positive electrode of the backlight control module. As shown in FIG. 27, the third filter module takes the third filter capacitor C15 as an example, one end of the third filter capacitor C15 is provided with the DC input voltage Vin, and the other end of the third filter capacitor C15 is grounded.

In some embodiments, the display apparatus can further include a second diode Dn. A positive electrode of the second diode Dn is connected with the second end of the energy storage element Cn, and the negative electrode of the second diode Dn is connected with the first end of the energy storage element Cn. Using the second diode Dn to make the backlight control module and the negative electrode of the power supply interface form a current loop, can prevent the current from flowing through the first voltage conversion module when the first voltage conversion module is not working, causing system malfunction or other abnormal conditions, and protect the function of the first voltage conversion module.

Figure 28:
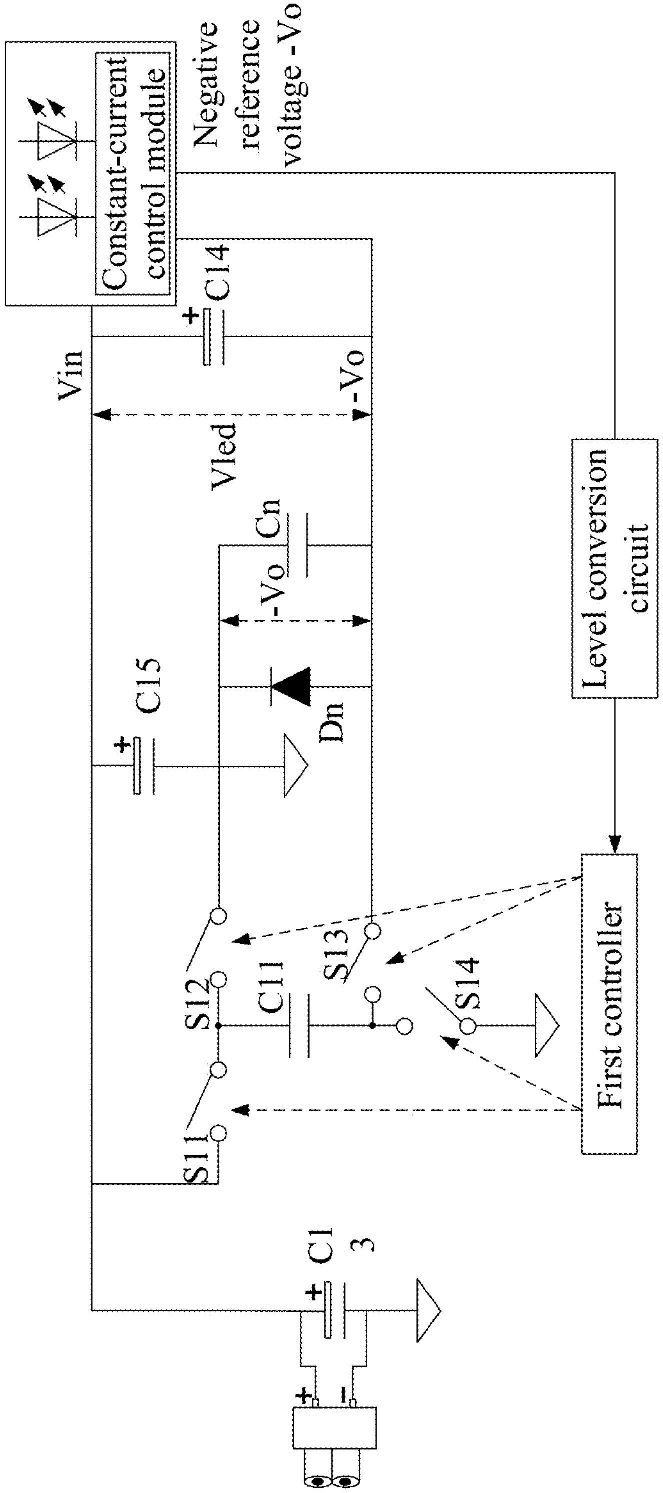
FIG. 28 is a schematic structural diagram of a level conversion circuit based on a power supply circuit with a charge pump module.
Figure 29:
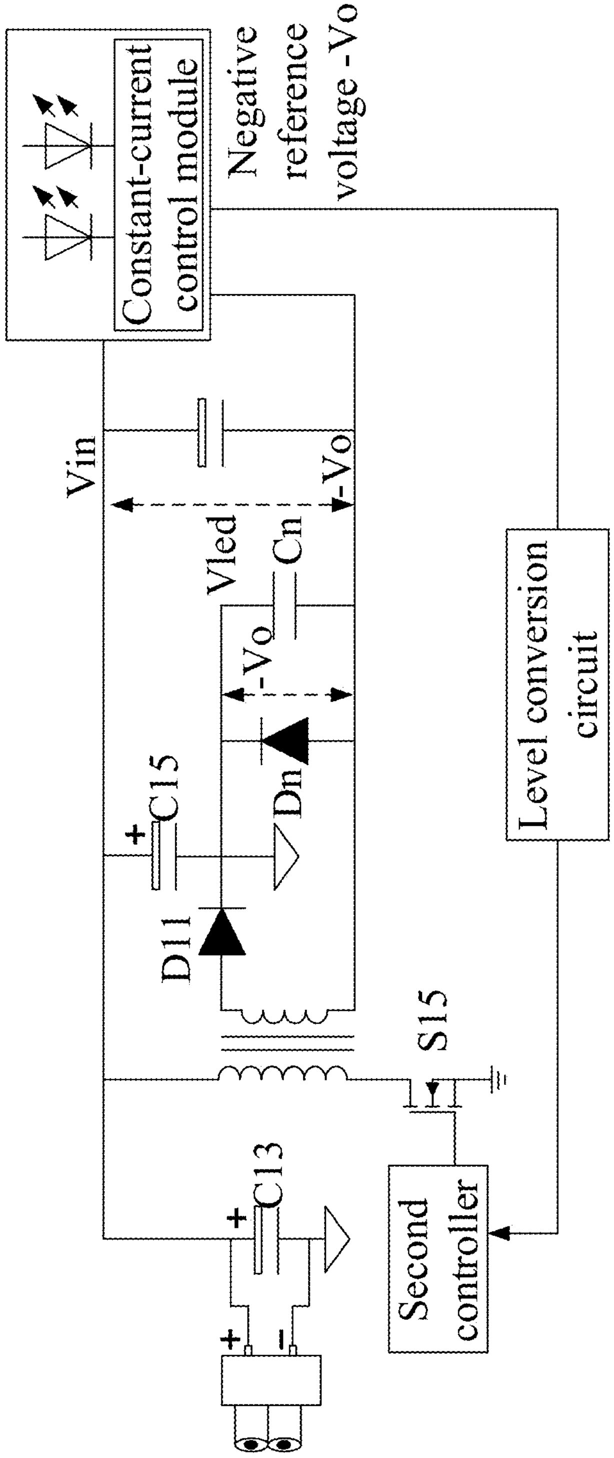
FIG. 29 is a schematic structural diagram of a level conversion circuit based on a power supply circuit of a flyback isolation voltage conversion module.

In some embodiments, FIG. 28 is a schematic structural diagram of a level conversion circuit based on a power supply circuit with a charge pump module provided in embodiments of the disclosure. The structure shown in FIG. 24 is taken as an example for the charge pump module, and the power supply principle will not be repeated here. In some embodiments, FIG. 29 is a schematic structural diagram of a level conversion circuit based on a power supply circuit of flyback isolation voltage conversion module provided in embodiments of the disclosure. The flyback isolation voltage conversion module is shown in FIG. 26 as an example. The principle of power supply will not be repeated.

Figure 30:
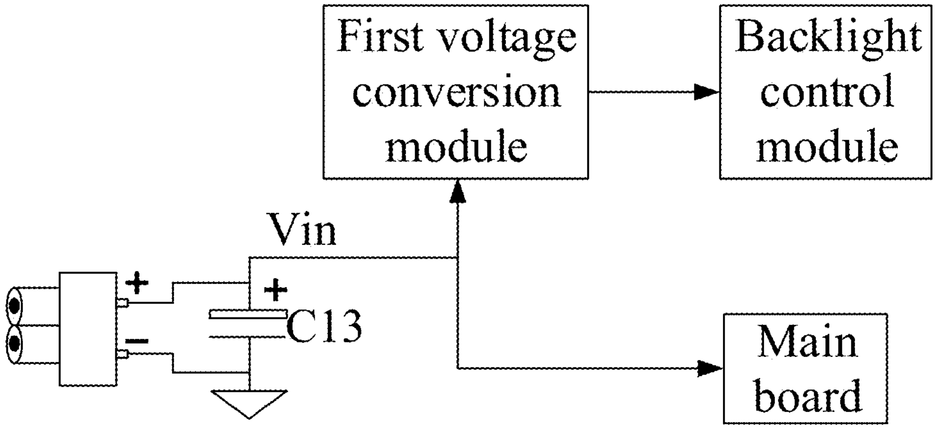
FIG. 30 is a schematic structural diagram of a circuit for supplying power to a main board.

In some embodiments, the display apparatus provided in the embodiment can further include a main board. The main board is connected with the power supply interface. The DC input voltage is used for supplying power to the main board. FIG. 30 is a schematic structural diagram of a circuit for supplying power to a main board provided by embodiments of the disclosure. When the DC input voltage is equal to the required voltage of the main board, the main board can be directly powered by the DC input voltage.

Figure 31:
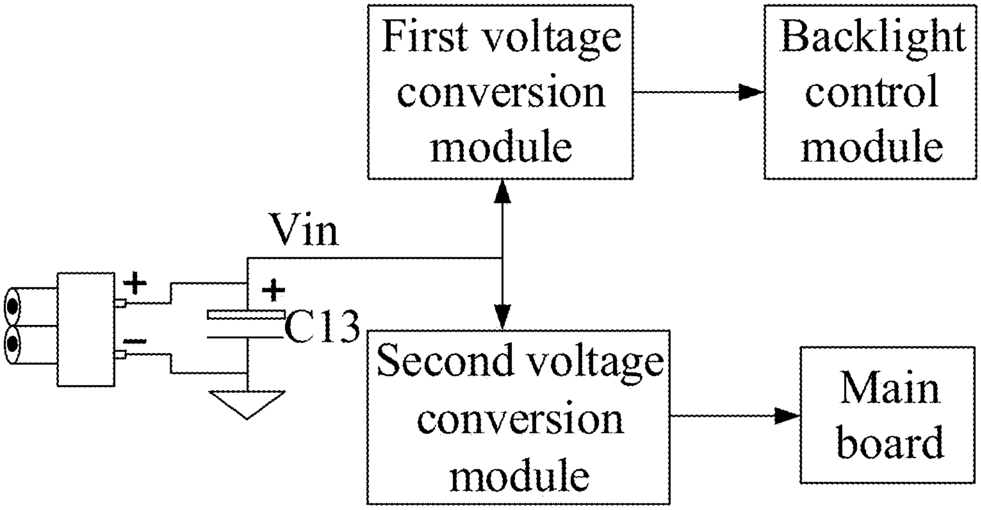
FIG. 31 is another schematic structural diagram of a circuit for supplying power to a main board.

In some embodiments, the display apparatus can further include a second voltage conversion module. The second voltage conversion module is connected with the power supply interface and the main board, and can be configured to output a sixth voltage according to the DC input voltage. The sixth voltage is the required voltage of the main board. FIG. 31 is another schematic structural diagram of a circuit for supplying power to a main board provided by embodiments of the disclosure. When the DC input voltage does not meet the required voltage of the main board, the second voltage conversion module can be configured to perform DC-DC voltage conversion on the DC input voltage. When the power of the TV is high, in order to reduce the loss on the cable, the current can be reduced by increasing the voltage, so the DC input voltage will be higher than the required voltage of the main board. In some embodiments, since the main board generally requires a fixed voltage, the second voltage conversion module may use a buck circuit for stepping down voltage, a boost-buck circuit for stepping up/down voltage, or the like.

An embodiment of the disclosure further provides a display control method, which is applied to the aforementioned display apparatus. The display control method includes: receiving a feedback signal, where the feedback signal is generated by the backlight control module and sent via the feedback module; based on the feedback signal, adjusting the fifth voltage to adjust the required voltage of the backlight control module. In the embodiment, according to the real-time current feedback signal output from the backlight control module, the fifth voltage generated by the first voltage conversion module can be adjusted, and then the required voltage of the backlight control module can be adjusted, so that the backlight control module can work at the rated current to prevent over-large current from flowing through the LED components in the LED string, causing damage to the LED components.

The display apparatus according to embodiments of the disclosure can include: a backlight control module, a power supply interface, a first voltage conversion module, an energy storage element, and a feedback module. The backlight control module can be configured to control light emitting diodes to emit light, where the light emitting diodes can be configured to light up the screen of the display apparatus. The power supply interface can be configured to receive DC input voltage provided by an external adapter. The first voltage conversion module can be configured to generate a fifth voltage according to the DC input voltage. The energy storage element is connected with the first voltage conversion module and can be configured to store energy of the fifth voltage. The energy storage element and the first voltage conversion module output alternately the fifth voltage. A negative electrode of the backlight control module is provided with the fifth voltage. The fifth voltage serves as a negative reference voltage of the backlight control module. A positive electrode of the backlight control module is provided with the DC input voltage. A sum of the absolute values of the DC input voltage and the fifth voltage is equal to the required voltage of the backlight control module. The feedback module can be configured to send a feedback signal generated by the backlight control module to the first voltage conversion module, where the feedback signal can be configured to instruct the first voltage conversion module to adjust the fifth voltage to adjust the required voltage of the backlight control module.

In the display apparatus according to the embodiments of the disclosure, a power supply interface connected with an external adapter is provided to receive the DC input voltage to adapt to the power supply mode of the external adapter. The fifth voltage generated by using the DC input voltage serves as the negative reference voltage of the backlight control module. The fifth voltage and the DC input voltage connected with the positive electrode of the backlight control module form a stepped power supply, which is beneficial to reduce heat loss. The energy storage element can be configured to continuously supply power to the backlight control module. The power supply voltage of the backlight control module can be adjusted in time through real-time feedback, so that the light-emitting diodes work stably.

In order to use the DC voltage output from the external adapter to meet the power supply requirements of the load in the display apparatus, the disclosure further provides the following embodiments.

In the display apparatus according to the embodiments of the disclosure, a power supply interface connected with an external adapter is provided to receive the DC input voltage to adapt to the power supply mode of the external adapter. An additional voltage can be generated by using the DC input voltage. The additional voltage and the DC input voltage can be superposed to form a stepped power supply, which is beneficial to reduce heat loss. The energy storage element can be configured to continuously supply power to the backlight control module. The power supply voltage of the backlight control module can be adjusted in time through real-time feedback, so that the light-emitting diodes work stably.

The content of the disclosure and how the content of the disclosure solves the above technical problems will be described in detail below with specific embodiments. Embodiments of the disclosure will be described below in conjunction with the accompanying drawings.

Figure 32:
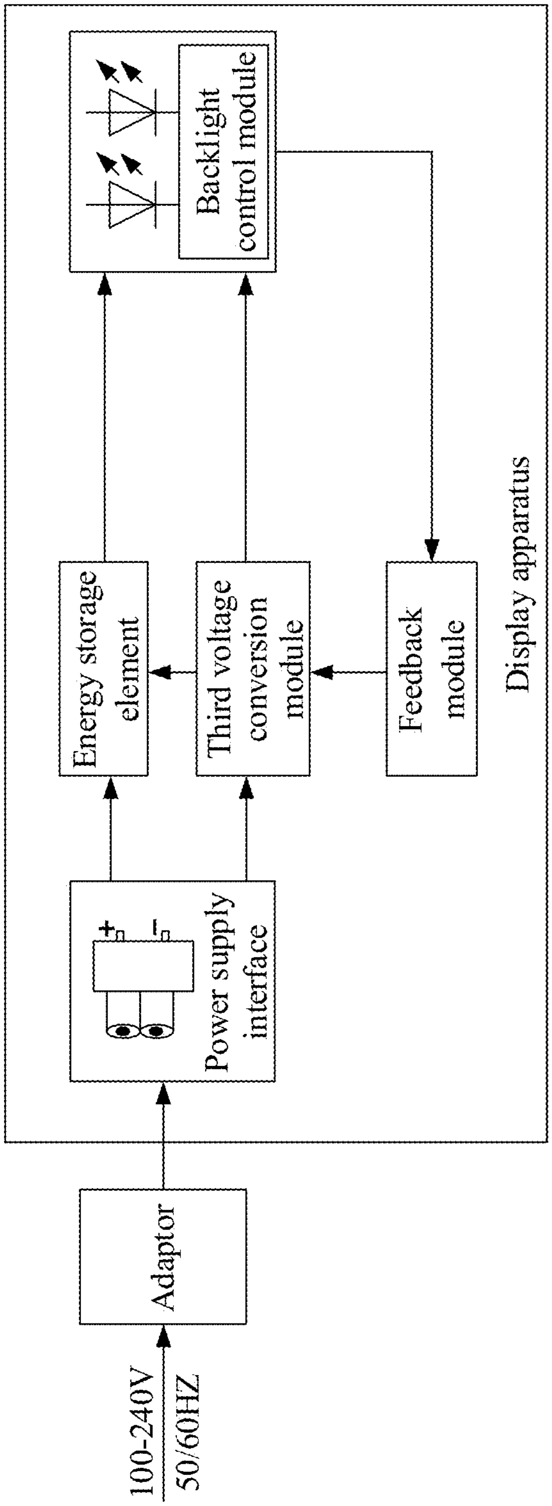
FIG. 32 is a schematic structural diagram of a power supply circuit of a display apparatus.

FIG. 32 is another schematic structural diagram of a power supply circuit of display apparatus provided by embodiments of the disclosure, and the power supply circuit includes: a backlight control module, a power supply interface, a third voltage conversion module, an energy storage element, and a feedback module.

The backlight control module can be configured to control light-emitting diodes (LEDs) to emit light to light up a panel of the display apparatus. The power supply interface can be configured to receive a DC input voltage provided by the external adapter. The third voltage conversion module can be configured to generate an additional voltage according to the DC input voltage, and superimpose the additional voltage with the DC input voltage to output a superimposed ninth voltage, which is the required voltage of the backlight control module. A first end of the energy storage element is connected with the third voltage conversion module, and a second end of the energy storage element is provided with the DC input voltage to store the additional voltage. The energy storage element and the third voltage conversion module alternately output the ninth voltage. The feedback module can be configured to send a feedback signal generated by the backlight control module to the third voltage conversion module. The feedback signal can be configured to instruct the third voltage conversion module to adjust the ninth voltage.

As shown in FIG. 32, the external adapter receives AC power (100V-240V, 50-60 Hz) from the mains supply, and an internal circuit of the external adapter can be shown in FIG. 21, including at least a filter-and-rectifier module, a PFC module, and an LLC isolation voltage conversion module. This external adapter can output a fixed DC voltage. The display apparatus is provided with a power supply interface connected with the external adapter for receiving a DC input voltage, so as to adapt to the power supply mode of the external adapter shown in FIG. 21. Compared with FIG. 18 to FIG. 20, there is no need to arrange the filter-and-rectifier module, the PFC module, and the LLC isolation voltage conversion module on the power board of the display apparatus, which is beneficial to simplify the circuit.

In some embodiments, the energy storage element shown in FIG. 32 may be a single energy storage capacitor or other energy storage circuits. The energy storage element cooperates with the third voltage conversion module to alternately output the ninth voltage to continuously supply power to the backlight control module, so that the light-emitting diodes can emit light stably.

Figure 33:
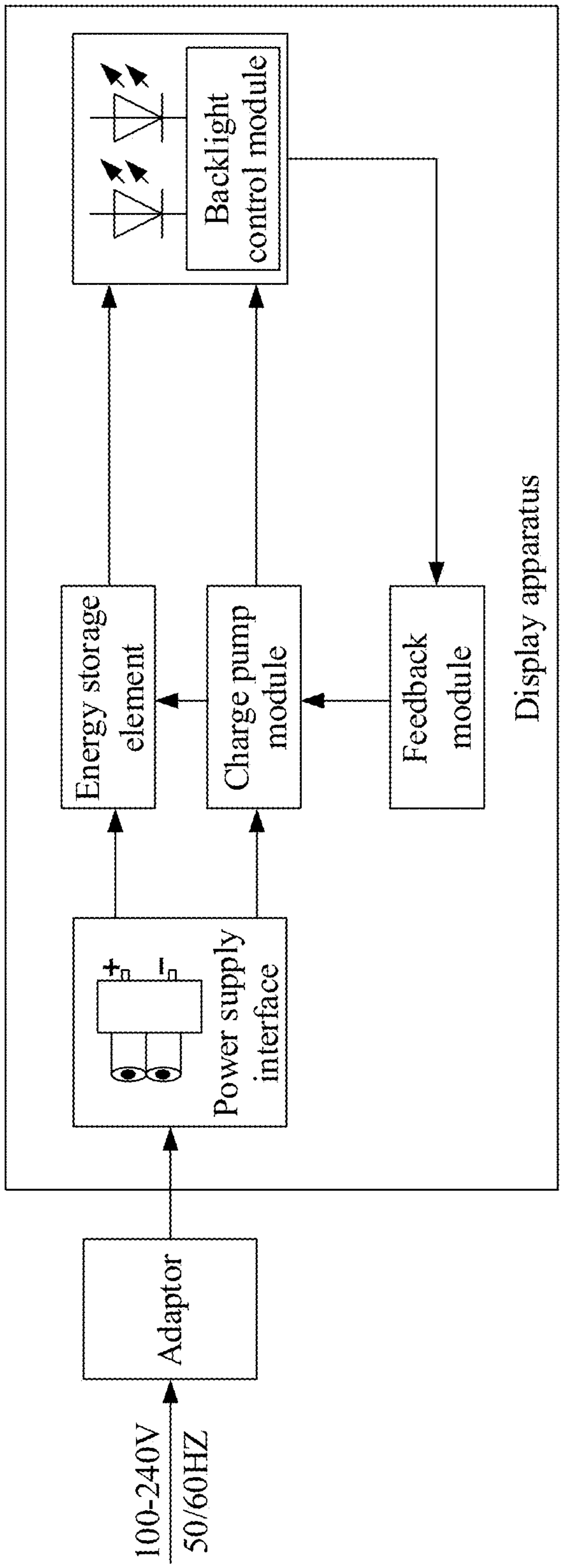
FIG. 33 is another schematic structural diagram of a power supply circuit of a display apparatus.

In some embodiments, the third voltage conversion module shown in FIG. 32 may be in the form of a charge pump. FIG. 33 is another schematic structural diagram of a power supply circuit of display apparatus provided by embodiments of the disclosure. As shown in FIG. 33, the third voltage conversion module can includes: a charge pump module configured to, in a charging state, generate an additional voltage; and in a discharging state, superimpose the additional voltage and a DC input voltage to generate a ninth voltage and output the ninth voltage to the backlight control module. A first end of the energy storage element is connected with an output end of the charge pump module. The energy storage element can be configured to store the additional voltage while the charge pump module is discharged, and while the charge pump module is charged, superimpose the additional voltage to the DC input voltage, and output the superimposed ninth voltage to the backlight control module. The feedback signal can be configured to instruct the charge pump module to adjust the ninth voltage by adjusting the additional voltage.

Specifically, the third voltage conversion module in the form of a charge pump in the embodiment is a non-inductive DC-DC power converter, that is, there is no inductive element in the voltage conversion module in the form of a charge pump, so the principle of voltage conversion does not involve high-speed conversion of a magnetic field, that is, the high-speed conversion of electricity-magnetism and magneto-electricity, the problem of electromagnetic interference can be almost ignored. The principle of voltage conversion in the form of a charge pump is to utilize high-speed charging and discharging of internal capacitive elements, so it has the advantage of low electromagnetic interference. In addition to low electromagnetic interference, it also has the advantages of larger output voltage adjustment range, high efficiency, small size, low quiescent current, low minimum operating voltage, and low noise. In addition, the integration of capacitors is easier and cheaper than the integration of inductors, so the third voltage conversion module in the form of a charge pump is easier to achieve high integration, and the cost for the overall application circuit is not high.

In some embodiments, the energy storage element shown in FIG. 33 may be a single energy storage capacitor or other energy storage circuits. The energy storage element cooperates with the charge pump module to alternately output the ninth voltage to continuously supply power to the backlight control module so that the light-emitting diodes can emit light stably.

In the following, the principle of coordinating power supply between the third voltage conversion module and the energy storage element will be described in combination with the specific circuit structure schematic diagram of the charge pump module and the energy storage element.

Figure 34:
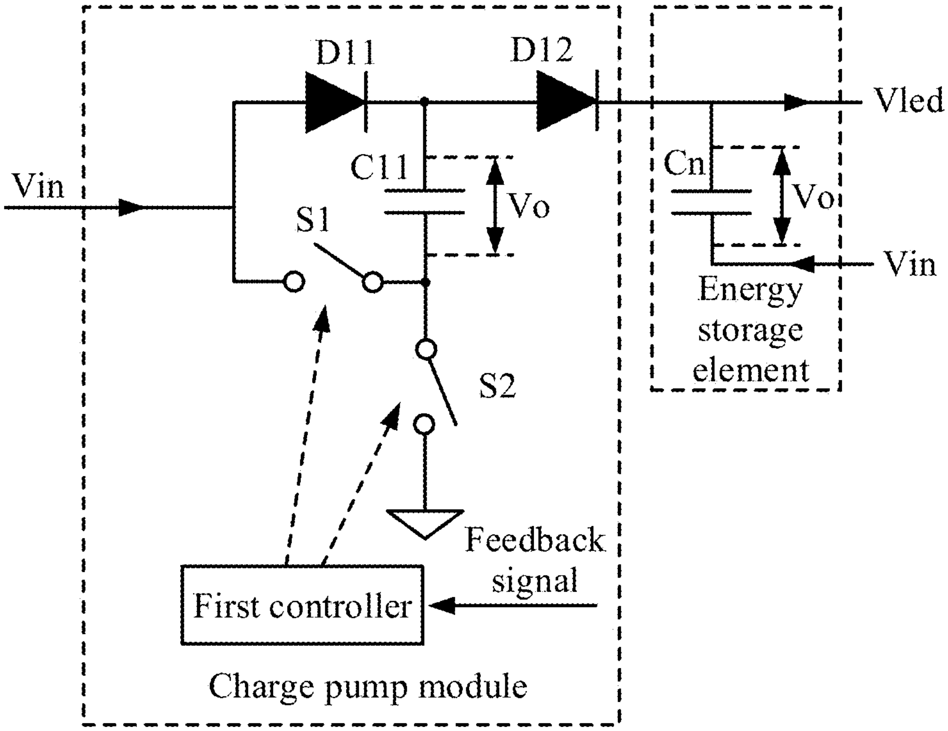
FIG. 34 is a schematic structural diagram of a power supply circuit with a charge pump module.

In some embodiments, FIG. 34 is a schematic structural diagram of a power supply circuit with a charge pump module provided in embodiments of the disclosure. The charge pump module can include: a first controller, a first storage capacitor C11, a first diode D11, a second diode D12, a first switch S1 and a second switch S2.

A positive electrode of the first diode D11 is provided with a DC input voltage Vin, and a negative electrode of the first diode D11 is connected with a positive electrode of the second diode D12. A negative electrode of the second diode D12 serves as an output end of the charge pump module, and outputs a ninth voltage Vled. A first end of the first switch S1 is connected with a positive electrode of the first diode D11, a second end of the first switch S1 is connected with a first end of the second switch S2, and a second end of the second switch S2 is grounded. A first end of the first energy storage capacitor C11 is connected with the negative electrode of the first diode D11, and a second end of the first energy storage capacitor C11 is connected with the second end of the first switch S1.

The first controller is connected with control ends of the first switch S1 and the second switch S2, and can be configured to control the switching frequencies of the first switch S1 and the second switch S2 according to a feedback signal, so as to adjust the additional voltage. The switching states of the first switch S1 and the second switch S2 are different.

As shown in FIG. 34, the energy storage element takes a single energy storage capacitor as an example. A second end of the energy storage element Cn is provided with the DC input voltage Vin, that is, the DC input voltage Vin is applied to the second end of the energy storage element. A physical connection can be established between the second end of the energy storage element Cn and the power supply interface, so as to apply the DC input voltage Vin to the second end of the energy storage element.

Based on the power supply circuit shown in FIG. 34, the principle of the cooperation between the third voltage conversion module and the energy storage element for power supply is as follows.

Step (1): The first controller controls the first switch S1 to be turned off, and the second switch S2 to be turned on. In this case, the DC input voltage Vin charges the first energy storage capacitor C11 via the first diode D11, so that the first end of the first energy storage capacitor C11 is at a positive voltage. By controlling the turn-off time of the first switch S1 and the turn-on time of the second switch S2, the charging time of the first energy storage capacitor C11 is controlled, thereby controlling the energy storage voltage of the first energy storage capacitor C11. Assuming that the energy storage voltage of the first energy storage capacitor C1 after charging is Vo (i.e., additional voltage), since the second end of the first energy storage capacitor is grounded, the voltage of the first end of the first energy storage capacitor is Vo.

Step (2): The first controller controls the first switch S1 to be turned on and the second switch S2 to be turned off. In this case, the DC input voltage Vin is connected with the second end of the first energy storage capacitor C11 through the first switch S1, and the first energy storage capacitor C11 is regarded as a battery whose upper end (i.e. the first end) is positive and low end (i.e. the second end) is negative, then the DC input voltage Vin is provided to the lower end of the first energy storage capacitor C11, which can serve as two connected power supplies in series, that is, voltage superposition is performed. Therefore, the first energy storage capacitor C11 outputs the superimposed ninth voltage Vled through the negative electrode of the second diode D12. Here, Vled is equal to (Vin+Vo). In this case, for the energy storage element Cn, its first end is provided with the voltage Vled, and its second end is provided with the voltage Vin. Therefore, the energy storage element Cn is charged, and the energy storage voltage difference of the energy storage element Cn is Vo (i.e., additional voltage).

Step (3): The first controller controls the first switch S1 to be turned off, the second switch S2 to be turned on, and the charging process of the first energy storage capacitor C11 in step (1) is repeated. Meanwhile, if the energy storage element Cn is regarded as a battery whose upper end (i.e., the first end) is positive and low end (i.e., the second end) is negative, then the DC input voltage Vin is provided to the second end of the energy storage element Cn, which can serve as two connected power supplies in serious, that is, the voltage superposition is performed. Therefore, the superimposed ninth voltage Vled is output through the first end of the energy storage element Cn. Since the voltage of the positive electrode of the second diode D12 is Vin and the voltage of the negative electrode is Vled, the conducting path is not established.

For the power supply circuit shown in FIG. 34, it is only necessary to control the magnitude of the additional voltage Vo to control the variation of the ninth voltage Vled. Based on the feedback signal, the first controller controls the amount of charge transfer by controlling the switching frequency or duty cycle of the first switch S1 and the second switch S2, so as to achieve the purpose of controlling the ninth voltage Vled. The DC input voltage Vin is relatively stable, which serves as a "fixed voltage". The additional voltage Vo serves as a "variable voltage". Since the DC input voltage Vin is relatively stable, the variation range of the output voltage of the additional voltage Vo depends on the required variation range of the ninth voltage Vled. The above-mentioned circuit structure using a "fixed voltage" superimposed with a "variable voltage" allows a "stepped power supply", which can achieve the purpose of reducing costs and improving efficiency.

In some embodiments, the power supply circuit shown in FIG. 34 is compared to a conventional DC-DC conversion scheme. The conventional DC-DC conversion scheme uses a DC-DC circuit module to convert the DC input voltage into a required voltage. Specifically, the DC-DC circuit module may be a boost circuit, a buck circuit, a boost-buck circuit and other circuits which can step up or step voltage.

For LED components with a specification of 12V, the working voltage range is often around 11.4-12.6V. For a light string with 4 LED components, the variation range of the power supply voltage is: 45.6-50.4V. Assuming that the input voltage is 42V, the voltage of Vled needs to be 50V, and the total output power is 100 W.

The traditional DC-DC conversion scheme takes a boost circuit as an example, assuming that the efficiency of the boost circuit is 95%, the input power is 100 W/0.95=105.2 W, and the heat loss is 5.2 W.

Based on the power supply circuit shown in FIG. 34, assuming that the additional voltage Vo is 8V, the input is 42V, and the output current is 2 A. Assuming that the efficiency of the charge pump module is 90%, the output power is 16 W, and the input power is 16 W/0.9=17.8 W, so the heat loss is 1.8 W. The overall conversion efficiency is: 100 W/(42V×2 A+17.8 W)=98.2%. The efficiency is increased by 98.2%-95%=3.2%. Meanwhile, because the conversion power of the converter is greatly reduced, the cost is also reduced.

Figure 35:
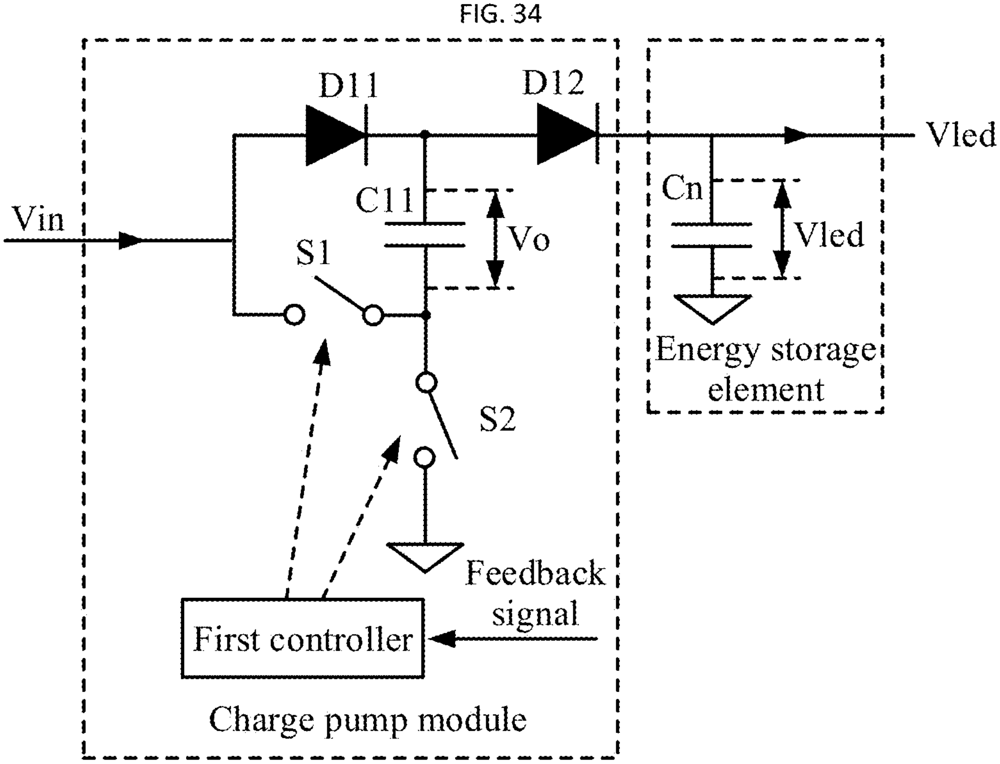
FIG. 35 is another schematic structural diagram of a power supply circuit with a charge pump module.

In some embodiments, in the power supply circuit shown in FIG. 34, the second end of the energy storage element Cn can be grounded. FIG. 35 is a schematic structural diagram of another power supply circuit of charge pump module provided by embodiments of the disclosure, which is different from FIG. 34 in that: the second end of the energy storage element Cn is grounded. Therefore, the difference between FIG. 35 and FIG. 34 in the power supply principle is that the energy storage voltage differences of the energy storage element Cn are different.

Based on the power supply circuit shown in FIG. 35, the principle of the cooperation between the third voltage conversion module and the energy storage element for power supply is as follows.

Step (1): The first controller controls the first switch S1 to be turned off, and the second switch S2 to be tuned on. In this case, the DC input voltage Vin charges the first energy storage capacitor C11 via the first diode D11, so that the first end of the first energy storage capacitor C11 is at a positive voltage. By controlling the turn-off time of the first switch S1 and the turn-on time of the second switch S2, the charging time of the first energy storage capacitor C11 is controlled, thereby controlling the energy storage voltage of the first energy storage capacitor C11. Assuming that the energy storage voltage of the first energy storage capacitor C11 after charging is Vo (i.e., additional voltage), since the second end of the first energy storage capacitor C11 is grounded, the voltage of the first end of the first energy storage capacitor C11 is Vo.

Step (2): The first controller controls the first switch S1 to be turned on and the second switch S2 to be turned off. In this case, the DC input voltage Vin is provided to the second end of the first energy storage capacitor C11 through the first switch S1. The first energy storage capacitor C11 is regarded as a battery whose upper end (i.e. the first end) is positive and low end (i.e. the second end) is negative, then the DC input voltage Vin is provided to the lower end of the first energy storage capacitor C11, which can serve as two power supplies connected in series, that is, the voltage superposition is performed. Therefore, the first energy storage capacitor C11 outputs the superimposed ninth voltage Vled through the negative electrode of the second diode D12. Here, Vled is equal to (Vin+Vo). In this case, for the energy storage element Cn, its first end is provided with the voltage Vled, and its second end is provided with the voltage 0, therefore, the energy storage element Cn is charged, and the energy storage voltage difference of Cn is Vled.

Step (3): The first controller controls the first switch S1 to be turned off and the second switch S2 to be turned on, and the charging process of the first energy storage capacitor C11 in step (1) is repeated. In this case, the energy storage element Cn acts as a power supply outputting Vled to the backlight control module. Since the voltage of positive electrode of the second diode D12 is Vin and the voltage of negative electrode is Vled, a conducting path is not established.

Comparing FIG. 34 with FIG. 35, the power supply circuit shown in FIG. 34 has lower energy storage requirements for the energy storage element Cn than the power supply circuit shown in FIG. 11. Requirements on energy storage are low, and costs are low accordingly.

Figure 36:
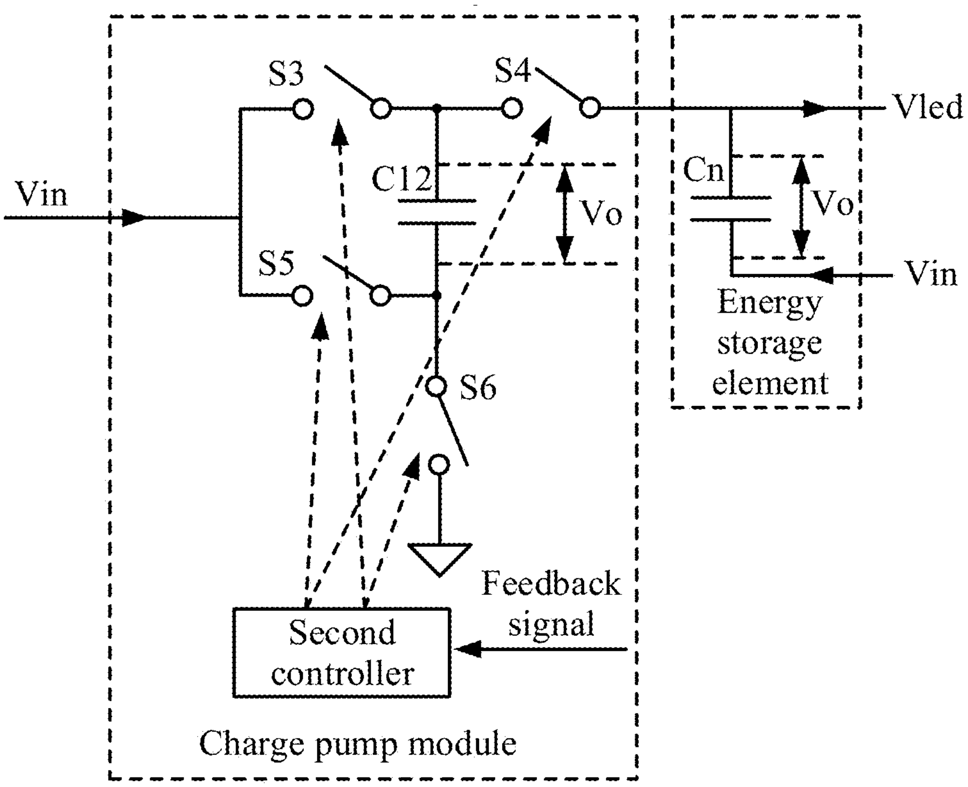
FIG. 36 is another schematic structural diagram of a power supply circuit with a charge pump module.

In some embodiments, in the power supply circuits shown in FIG. 34 and FIG. 35, the first diode D11 and the second diode D12 can be replaced with switching elements. FIG. 36 is another schematic structural diagram of a power supply circuit of charge pump module provided by embodiments of the disclosure. The charge pump module includes: a second controller, a second energy storage capacitor C12, a third switch S3, a fourth switch S4, a fifth switch S5 and a sixth switch S6.

A first end of the third switch S3 is provided with the DC input voltage Vin, a second end of the third switch S3 is connected with a first end of the fourth switch S4. A second end of the fourth switch S4 serves as an output end of the charge pump module, and outputs the ninth voltage Vled. A first end of the fifth switch S5 is connected with the first end of the third switch S3, a second end of the fifth switch S5 is connected with a first end of the sixth switch S6. A second end of the sixth switch S6 is grounded. A first end of the second energy storage capacitor C12 is connected with the second end of the third switch S3, and a second end of the second energy storage capacitor C12 is connected with the second end of the fifth switch S5.

The second controller is connected with control ends of the third switch S3, the fourth switch S4, the fifth switch S5 and the sixth switch S6, and can be configured to adjust the additional voltage according to the feedback signal by controlling the switching frequency of the third switch S3, the fourth switch S4, the fifth switch S5 and the sixth switch S6. The switching states of the third switch S3 and the fourth switch S4 are different, and the third switch S3 and the sixth switch S6 are turned off or on simultaneously. The switch S4 and the fifth switch S5 are turned off or turned on simultaneously.

Based on the power supply circuit shown in FIG. 36, the principle of the cooperation between the third voltage conversion module and the energy storage element for power supply is as follows.

Step (1): The second controller controls the fourth switch S4 and the fifth switch S5 to be turned off simultaneously, and the third switch S3 and the sixth switch S6 to be turned on simultaneously. In this case, the DC input voltage Vin charges the second energy storage capacitor C12 through the turn-on third switch S3, so that the first end of the second energy storage capacitor C12 is at a positive voltage. By controlling the turn-off time of the fourth switch S4 and the fifth switch S5, and the turn-on time of the third switch S3 and the sixth switch S6, the charging time of the second energy storage capacitor C12 can be controlled, and then the storage energy voltage of the second energy storage capacitor C12 can be controlled. Assuming that the energy storage voltage of the second energy storage capacitor C12 after charging is Vo (i.e., additional voltage), since the second end of the second energy storage capacitor C12 is grounded, the voltage at the first end of the second energy storage capacitor C12 is Vo.

Step (2): The second controller controls the fourth switch S4 and the fifth switch S5 to be turned on simultaneously, and the third switch S3 and the sixth switch S6 to be turned off. In this case, the DC input voltage Vin is provided to the second end of the second energy storage capacitor C12 through the fifth switch S5. The second energy storage capacitor C12 is regarded as a battery whose upper end (i.e., the first end) is positive and low end (i.e., the second end) is negative, then the DC input voltage Vin is provided to the lower end of the energy capacitor C12, which can serve as two power supplies connected in series, that is, the voltage is superimposed. Therefore, the second energy storage capacitor C12 outputs the superimposed ninth voltage Vled through the fourth switch S4. Here, Vled is equal to (Vin+Vo). In this case, for the energy storage element Cn, its first end is provided with the voltage Vled, and its second end is provided with the voltage Vin. Therefore, the energy storage element Cn is charged, and the energy storage voltage difference of Cn is Vo.

Step (3): The second controller controls the fourth switch S4 and the fifth switch S5 to be turned off simultaneously, the third switch S3 and the sixth switch S6 to be turned on simultaneously, and step (1) to charge the second energy storage capacitor C12 is repeated. Meanwhile, if the energy storage element Cn is regarded as a battery whose upper end (i.e., the first end) is positive and low end (i.e., the second end) is negative, then the DC input voltage Vin is provided to the second end of the energy storage element Cn, which can serve as two power supplies connected in series, that is, the voltage superposition is performed. Therefore, the superimposed ninth voltage (Vin+Vo), i.e., Vled, is output through the first end of the energy storage element Cn.

For the circuit shown in FIG. 36, the change of the ninth voltage Vled can be controlled only by controlling the magnitude of the additional voltage Vo. Based on the feedback signal, the second controller controls the switching frequency or duty cycle of the third switch S3, the fourth switch S4, the fifth switch S5, and the sixth switch S6 to control the amount of charge transfer, so as to control the ninth voltage Vled. The DC input voltage Vin is relatively stable, which serves as a "fixed voltage"; the additional voltage Vo serves as a "variable voltage". Since the DC input voltage Vin is relatively stable, the variation range of the output voltage of the additional voltage Vo depends on the required variation range of the ninth voltage Vled. The above-mentioned circuit structure using a "fixed voltage" superimposed with a "variable voltage" allows a "stepwise power supply", which can achieve the purpose of reducing costs and improving efficiency.

Figure 37:
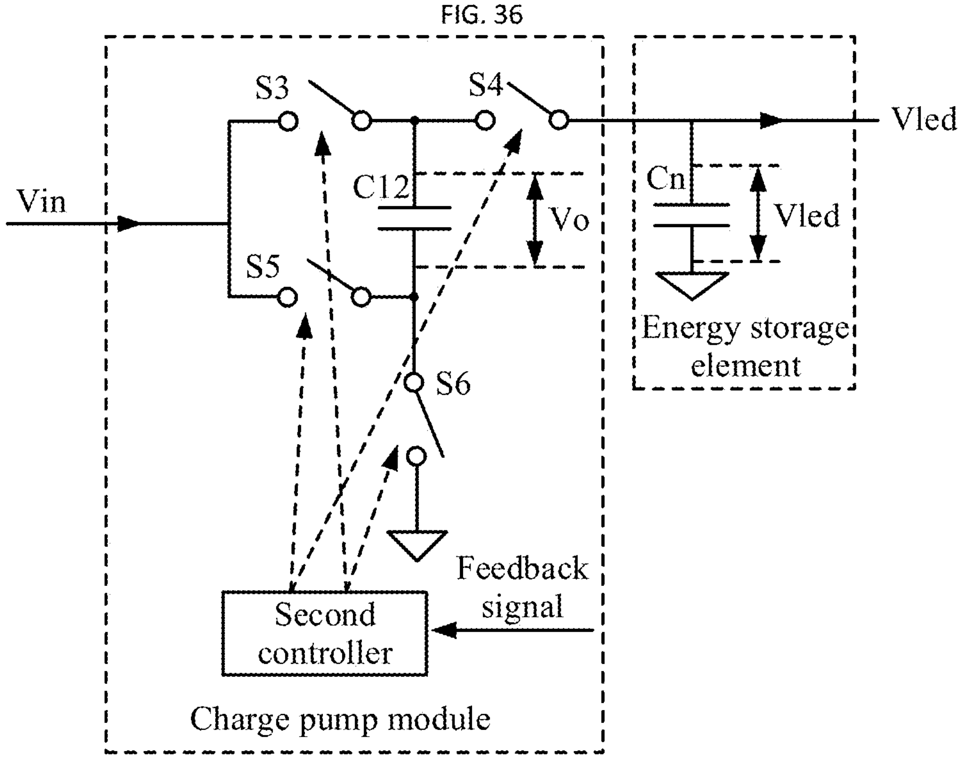
FIG. 37 is another schematic structural diagram of a power supply circuit with a charge pump module.

In some embodiments, in the power supply circuit shown in FIG. 36, the second end of the energy storage element Cn can also be grounded. FIG. 37 is a schematic structural diagram of another power supply circuit of charge pump module provided by embodiments of the disclosure, which is different from FIG. 36 in that: the second end of the energy storage element Cn is grounded. Therefore, the difference between the power supply principles in FIG. 37 and FIG. 36 is that the energy storage voltage differences of the energy storage element Cn are different.

Based on the power supply circuit shown in FIG. 37, the principle of the cooperation between the third voltage conversion module and the energy storage element for power supply is as follows.

Step (1): The second controller controls the fourth switch S4 and the fifth switch S5 to be turned off simultaneously, and the third switch S3 and the sixth switch S6 to be turned on simultaneously. In this case, the DC input voltage Vin charges the second energy storage capacitor C12 through the turn-on third switch S3, so that the first end of the second energy storage capacitor C12 is at a positive voltage. By controlling the turn-off time of the fourth switch S4 and the fifth switch S5, and the turn-on time of the third switch S3 and the sixth switch S6, the charging time of the second energy storage capacitor C12 can be controlled, and then the storage energy voltage of the second energy storage capacitor C12 can be controlled. Assuming that the energy storage voltage of the second energy storage capacitor C12 after charging is Vo (i.e., additional voltage), since the second end of the second energy storage capacitor C12 is grounded, the voltage of the first end of the second energy storage capacitor C12 is Vo.

Step (2): The second controller controls the fourth switch S4 and the fifth switch S5 to be turned on simultaneously, and the third switch S3 and the sixth switch S6 to be turned off simultaneously. In this case, the DC input voltage Vin is provided to the second end of the second energy storage capacitor C12 through the fifth switch S5, and the second energy storage capacitor C12 is regarded as a battery whose upper end (i.e., the first end) is positive and low end (i.e., the second end) is negative, then the DC input voltage Vin is provided to the lower end of the second energy storage capacitor C12, which can serve as two power supplies connected in series, that is, the voltage is superimposed. Therefore, the second energy storage capacitor C12 outputs the superimposed ninth voltage Vled through the fourth switch S4. Here, Vled is equal to (Vin+Vo). In this case, for the energy storage element Cn, its first end is provided with the voltage Vled, and its second end is provided with the voltage 0, therefore, the energy storage element Cn is charged, and the energy storage voltage difference of Cn is Vled.

Step (3): The second controller controls the fourth switch S4 and the fifth switch S5 to be turned off simultaneously, the third switch S3 and the sixth switch S6 to be turned on simultaneously, and the charging process of the second energy storage capacitor C12 in step (1) is repeated. In this case, the energy storage element Cn acts as a power output Vled to supply power to the backlight control module.

Comparing FIG. 37 with FIG. 36, the power supply circuit shown in FIG. 36 has lower energy storage requirements for the energy storage element Cn than the power supply circuit shown in FIG. 37. Requirements on energy storage are low, and costs are low accordingly.

Figure 38:
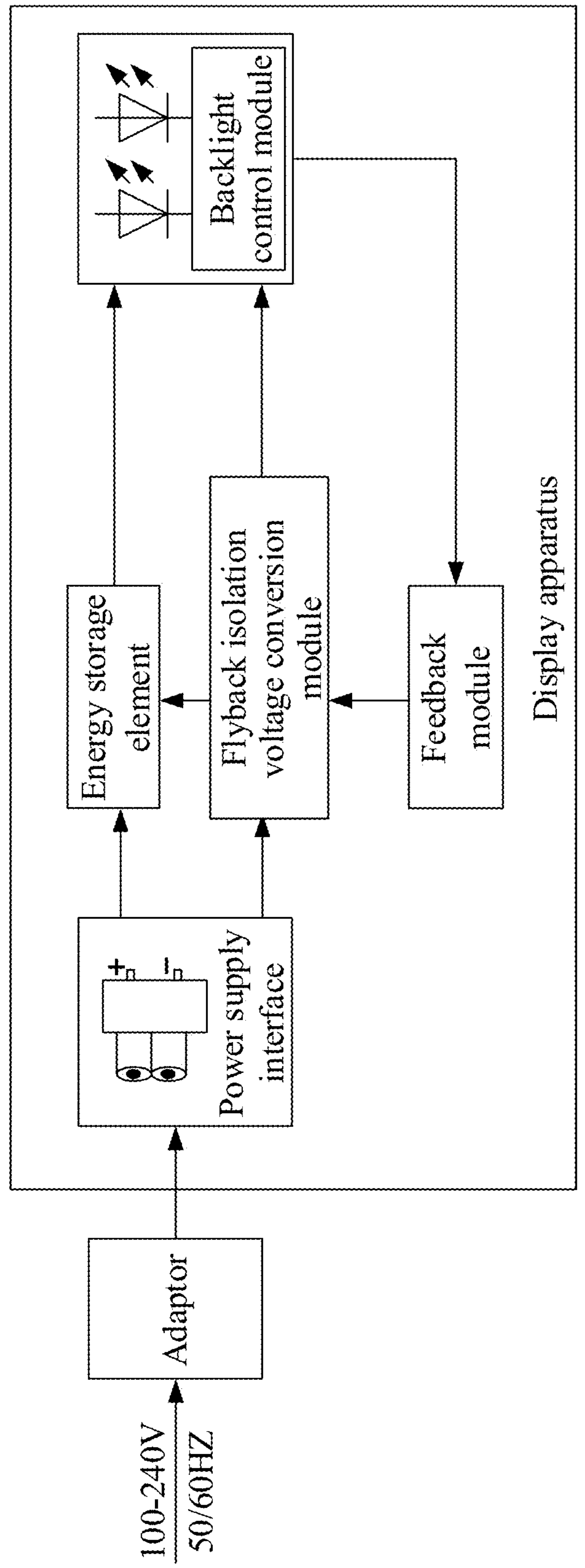
FIG. 38 is another schematic structural diagram of a power supply circuit of a display apparatus.

In some embodiments, the third voltage conversion module shown in FIG. 32 may be in the mode of flyback isolation. FIG. 38 is another schematic structural diagram of a power supply circuit of the display apparatus provided by embodiments of the disclosure. As shown in FIG. 38, the third voltage conversion module includes: a flyback isolation voltage conversion module. The flyback isolation voltage conversion module can be configured to superimpose an additional voltage generated by the secondary winding on a DC input voltage when the primary winding is cut off, and output the superimposed ninth voltage to the backlight control module. The first end of the energy storage module is connected with an output end of the flyback isolation voltage conversion module. The energy storage element can be configured to store the additional voltage while the primary winding is cut off, and superimpose the additional voltage to the DC input voltage and output the superimposed ninth voltage to the backlight control module while a conducting path is formed in the primary winding. The feedback signal can be configured to instruct the flyback isolation voltage conversion module to adjust the ninth voltage by adjusting the additional voltage.

Specifically, in the voltage conversion module in the mode of flyback isolation used in the embodiment, the primary winding and the secondary winding are electrically isolated, so that voltage superposition can be better completed. "Flyback" specifically means that when the switching transistor is turned on, the secondary winding transformer acts as an inductor, and the electric energy is converted into magnetic energy. In this case, there is no current in the output circuit. On the contrary, when the switching transistor is turned off, the secondary winding transformer releases energy, the magnetic energy is converted into the electric energy, there is current in the output circuit. In the flyback isolation voltage conversion module, the secondary winding transformer also acts as an energy storage inductor, which has the characteristics of fewer components, simple circuit, low cost, and small size. Meanwhile, the electrical isolation improves the safety of use.

In some embodiments, the energy storage element shown in FIG. 38 may be a single energy storage capacitor or other energy storage circuits. The energy storage element cooperates with the flyback isolation voltage conversion module to alternately output the ninth voltage to continuously supply power to the backlight control module so that the light-emitting diodes can emit light stably.

The power supply principle of the third voltage conversion module and the energy storage element will be described below in combination with the specific circuit structure schematic diagram of the flyback isolation voltage conversion module and the energy storage element.

Figure 39:
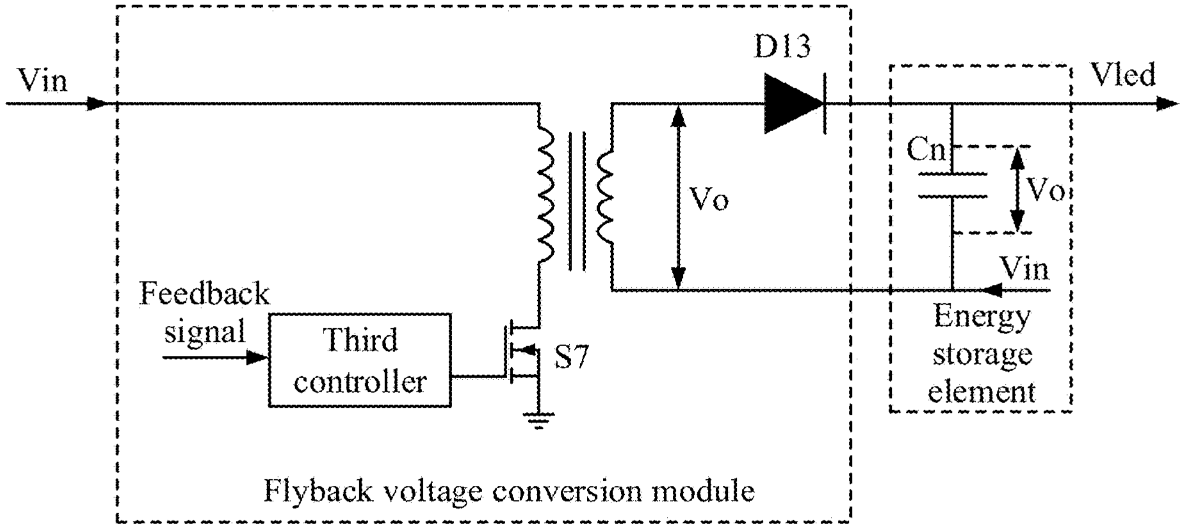
FIG. 39 is a schematic structural diagram of a power supply circuit of a flyback isolation voltage conversion module.

In some embodiments, FIG. 39 is a schematic structural diagram of a power supply circuit with a flyback isolation voltage conversion module provided in embodiments of the disclosure. The flyback isolation voltage conversion module includes: a primary winding, a secondary winding, a third diode D13, a third controller, and a seventh switch S7.

A first end of the primary winding is provided with the DC input voltage Vin, a second end of the primary winding is connected with a first end of the seventh switch S7. A second end of the seventh switch S7 is grounded. The secondary winding is coupled to the primary winding, and a first end of the secondary winding is connected with a positive electrode of the third diode D13, and a second end of the secondary winding is provided with the DC input voltage Vin. A negative of the third diode D13 serves as an output end of the flyback isolation voltage conversion module, and can be configured to output the ninth voltage Vled.

The third controller is connected with a control end of the seventh switch S7, and can be configured to control the switching frequency of the seventh switch S7 according to a feedback signal to control the a conducting path of the primary winding to be established or not, so as to adjust the additional voltage.

The second end of the secondary winding is provided with the DC input voltage Vin, that is, the DC input voltage Vin is applied to the second end of the secondary winding. In some embodiments, a physical connection may be established between the second end of the secondary winding and the first end of the primary winding, so as to apply the DC input voltage Vin to the second end of the secondary winding. In some embodiments, a physical connection can be established between the second end of the secondary winding and the power supply interface, so as to apply the DC input voltage Vin to the second end of the secondary winding, which is more conducive to achieving electrical isolation.

Based on the power supply circuit shown in FIG. 39, the principle of the cooperation between the third voltage conversion module and the energy storage element for power supply is as follows.

Step (1): The third controller controls the seventh switch S7 to be turned on, a conducting path is formed in the primary winding, the current in the primary winding increases linearly, and the energy stored in the inductor increases; the third diode D13 is not turned on, and the secondary winding is cut off. The energy storage voltage of the primary winding can be controlled by controlling the switching frequency of the seventh switch S7.

Step (2): The third controller controls the seventh switch S7 to be turned off, the primary winding is cut off, and the current of the primary winding is cut off; the third diode D13 is turned on, and a conducting path is formed in the secondary winding. By setting the turns ratio of the primary winding and the secondary winding, the secondary winding can generate an additional voltage Vo. Meanwhile, since the second end of the secondary winding is provided with the DC input voltage Vin, after voltage superposition, the first end of the secondary winding output the superimposed ninth voltage Vled. Vled=Vin+Vo. In this case, for the energy storage element Cn, its first end is provided with the voltage Vled, and its second end is provided with the voltage Vin. Therefore, the energy storage element Cn is charged, and the energy storage voltage difference of the energy storage element Cn is Vo.

Step (3): The third controller controls the seventh switch S7 to be turned on, and step (1) of the energy storage process of the primary winding is repeated. Meanwhile, if the energy storage element Cn is regarded as a battery whose upper end (i.e., the first end) is positive and lower end (i.e., the second end) is negative, then the DC input voltage Vin is connected with the second end of the energy storage element Cn, which can serve as two power supplies connected in series, that is, the voltage superposition is performed. Therefore, the superimposed ninth voltage Vled is output through the first end of the energy storage element Cn.

For the power supply circuit shown in FIG. 39, the change of the ninth voltage Vled can be controlled only by controlling the magnitude of the additional voltage Vo. Based on the feedback signal, the third controller controls the switching frequency or duty cycle of the seventh switch S7 to control the amount of charge transfer, so as to achieve the purpose of controlling the ninth voltage Vled. The DC input voltage Vin is relatively stable, which serves as a "fixed voltage"; the additional voltage Vo serves as a "variable voltage". Since the DC input voltage Vin is relatively stable, the voltage variation range of the output additional voltage Vo depends on the required variation range of the ninth voltage Vled. The above-mentioned circuit structure using a "fixed voltage" superimposed with a "variable voltage" allows a "stepped power supply", which can achieve the purpose of reducing costs and improving efficiency.

Figure 40:
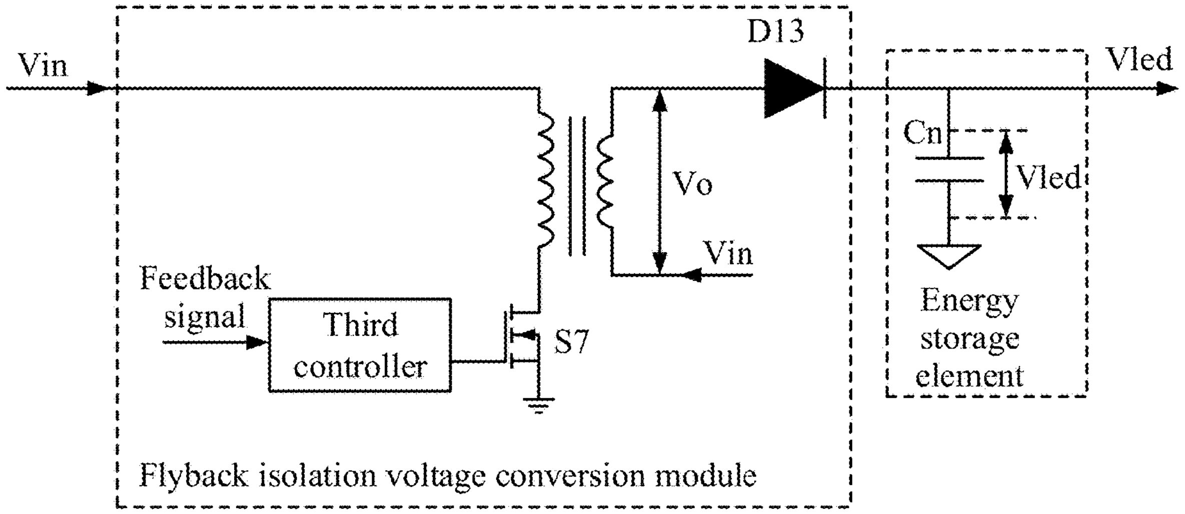
FIG. 40 is another schematic structural diagram of a power supply circuit of a flyback isolation voltage conversion module.

In some embodiments, in the power supply circuit shown in FIG. 39, the second end of the energy storage element Cn can be grounded. FIG. 40 is another schematic structural diagram of a power supply circuit of flyback isolation voltage conversion module provided in embodiments of the disclosure, which is different from FIG. 39 in that: the second end of the energy storage element Cn is grounded. Therefore, the difference between FIG. 40 and FIG. 39 in the power supply principle is that the energy storage voltage differences of the energy storage element Cn are different.

Based on the power supply circuit shown in FIG. 40, the principle of the cooperation between the third voltage conversion module and the energy storage element for power supply is as follows.

Step (1): The third controller controls the seventh switch S7 to be turned on, a conducting path is formed in the primary winding, the current in the primary winding increases linearly, and the energy stored in the inductor increases; the third diode D13 is not turned on, and the secondary winding is cut off. The energy storage voltage of the primary winding can be controlled by controlling the switching frequency of the seventh switch S7.

Step (2): The third controller controls the seventh switch S7 to turn off, the primary winding is cut off, and the current of the primary winding is cut off; the third diode D13 is turned on, and a conducting path is formed in the secondary winding. By setting the turns ratio of the primary winding and the secondary winding, the secondary winding can generate an additional voltage Vo. Meanwhile, since the second end of the secondary winding is provided with the DC input voltage Vin, after voltage superposition, the first end of the secondary winding outputs the superimposed ninth voltage Vled. Here, Vled=Vin+Vo. In this case, for the energy storage element Cn, its first end is provided with the voltage Vled, and its second end is provided with the voltage 0, therefore, the energy storage element Cn is charged, and the energy storage voltage difference of Cn is Vled.

Step (3): The third controller controls the seventh switch S7 to be turned on, and step (1) of the energy storage process of the primary winding is repeated. In this case, the energy storage element Cn is regarded as a battery whose upper end (i.e., the first end) is positive and low end (i.e., the second end) is negative, and outputs Vled to supply power to the backlight control module.

Comparing FIG. 40 with FIG. 39, the power supply circuit shown in FIG. 39 has lower energy storage requirements for the energy storage element Cn than the power supply circuit shown in FIG. 39. Energy storage requirements are low and, accordingly, costs are low.

In some embodiments, the display apparatus provided in the embodiment can further include a first filter module. The first filter module is connected with the power supply interface and the third voltage conversion module, and can be configured to filter the DC input voltage. The first filter module may be a filter circuit including one or more grounded capacitors, or a filter circuit including capacitors and inductors.

Figure 41:
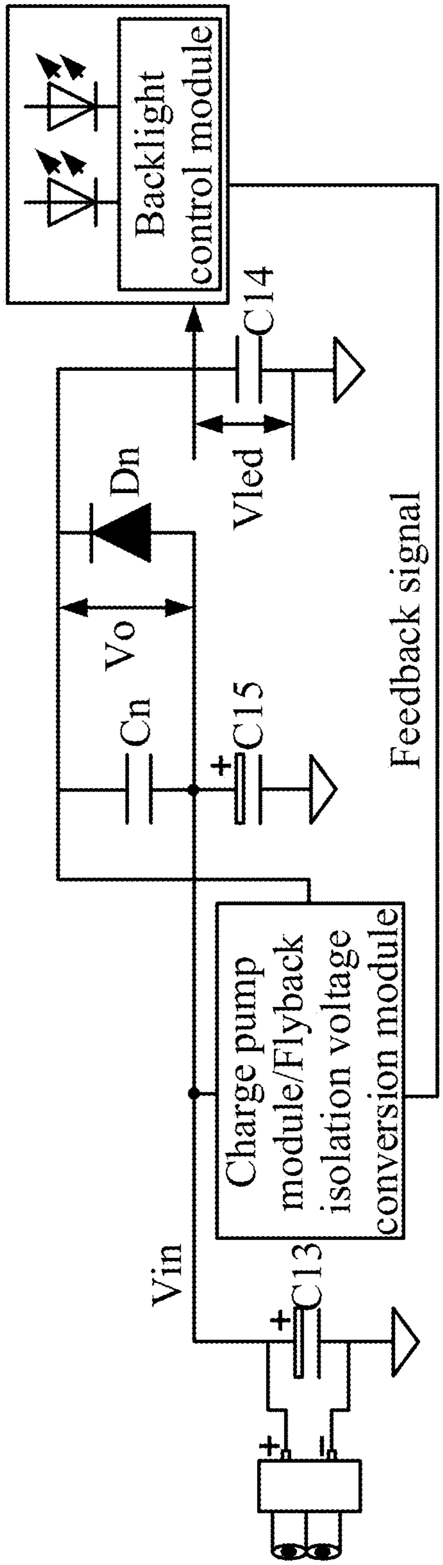
FIG. 41 is a schematic structural diagram of a filter module.

Exemplarily, FIG. 41 is a schematic structural diagram of a filter module provided in embodiments of the disclosure. The first filter module takes a grounded capacitor as an example. Specifically, a first filter capacitor C13 is connected in parallel between the DC input voltage of the power supply interface and the ground, and can be configured to filter the clutter and AC components of the power supply, smooth the pulsating DC voltage, and store electrical energy. The capacitance of the first filter capacitor C13 is related to the load current and the purity of the power supply. A larger-capacity filter capacitor is usually selected.

In some embodiments, the first filter capacitor C13 may be an electrolytic capacitor as shown in FIG. 41. The electrolytic capacitor is a kind of capacitor. The metal foil is the positive electrode (aluminum or tantalum), and the oxide film (aluminum oxide or tantalum pentoxide) close to the metal is the dielectric. The cathode is made of conductive material and electrolyte (the electrolyte can be liquid or solid) and other materials together. Because the electrolyte is the main part of the cathode, the capacitance per unit volume is very large. Since the preparation materials are common industrial materials and the preparation process is performed by common industrial devices, it can be mass-produced, so the cost is relatively low. It should be noted that the positive and negative of electrolytic capacitors cannot be connected incorrectly.

In some embodiments, the first filter capacitor C13 can be other types of capacitors, such as ceramic tape capacitors, film capacitors, mica capacitors, and the like. In the actual circuit, it can be selected according to the capacitance requirement.

In some embodiments, the display apparatus provided in the embodiment can further include a second filter module. The second filter module is connected with the output end of the third voltage conversion module, and can be configured to filter the ninth voltage. The second filter module may be a filter circuit including one or more grounded capacitors, or a filter circuit including capacitors and inductors. Exemplarily, as shown in FIG. 41, the filtering is performed by taking the grounded second filter capacitor C14 as an example.

As shown in FIG. 41, the second end of the energy storage element Cn is provided with the DC input voltage Vin. During the power supply process, the charge pump module or the flyback isolation voltage conversion module cooperates with the energy storage element Cn to alternately output the ninth voltage Vled. A filter module may be provided at the connection between the DC input voltage Vin and the second end of the energy storage element Cn, for filtering the clutter and the like in the DC input voltage Vin input to the energy storage element Cn.

In some embodiments, the display apparatus provided in the embodiment can further include a fourth diode Dn. A positive electrode of the fourth diode Dn is connected with the second end of the energy storage element Cn, and a negative electrode of the fourth diode Dn is connected with the first end of the energy storage element Cn. The fourth diode Dn can be configured to input the DC transfer voltage Vin to the backlight control module to form a current loop to prevent the current from flowing through the third voltage conversion module while the third voltage conversion module is not working, causing system malfunction or other abnormal conditions, and playing the role of protecting the third voltage conversion module.

Figure 42:
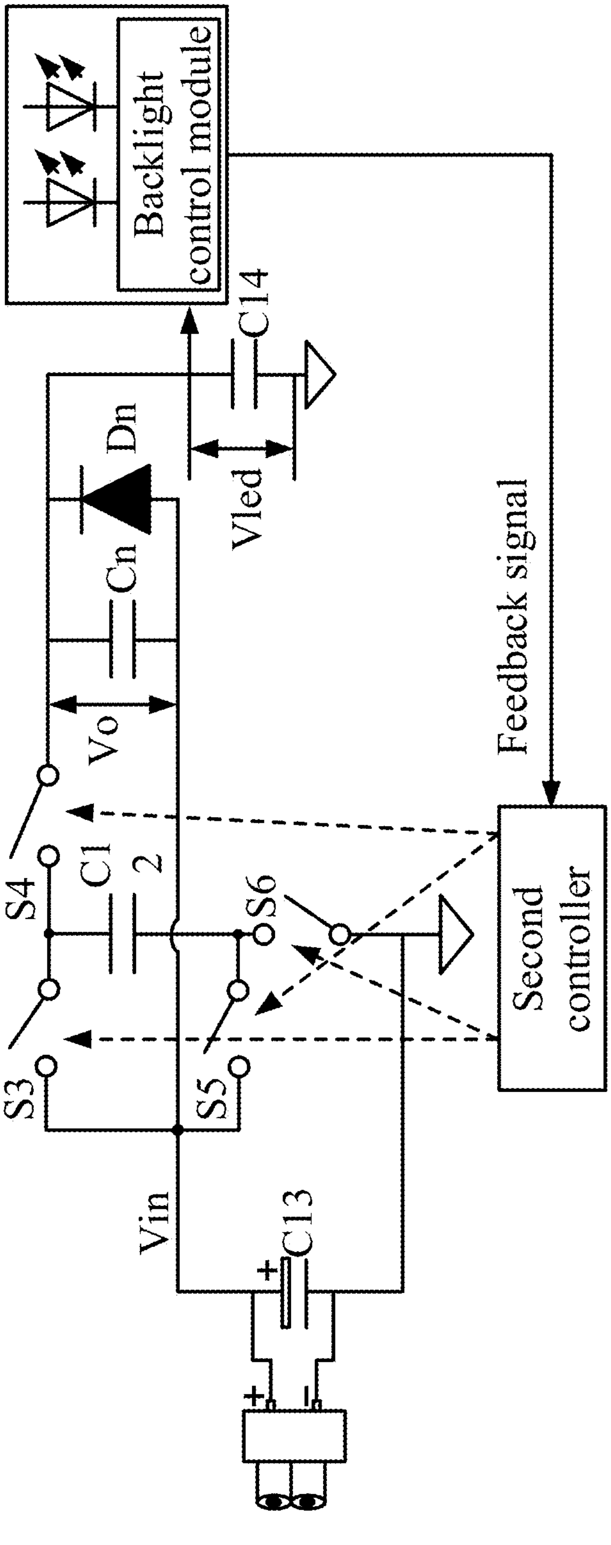
FIG. 42 is a schematic structural diagram of a filter module in a power supply circuit based on a charge pump module.
Figure 43:
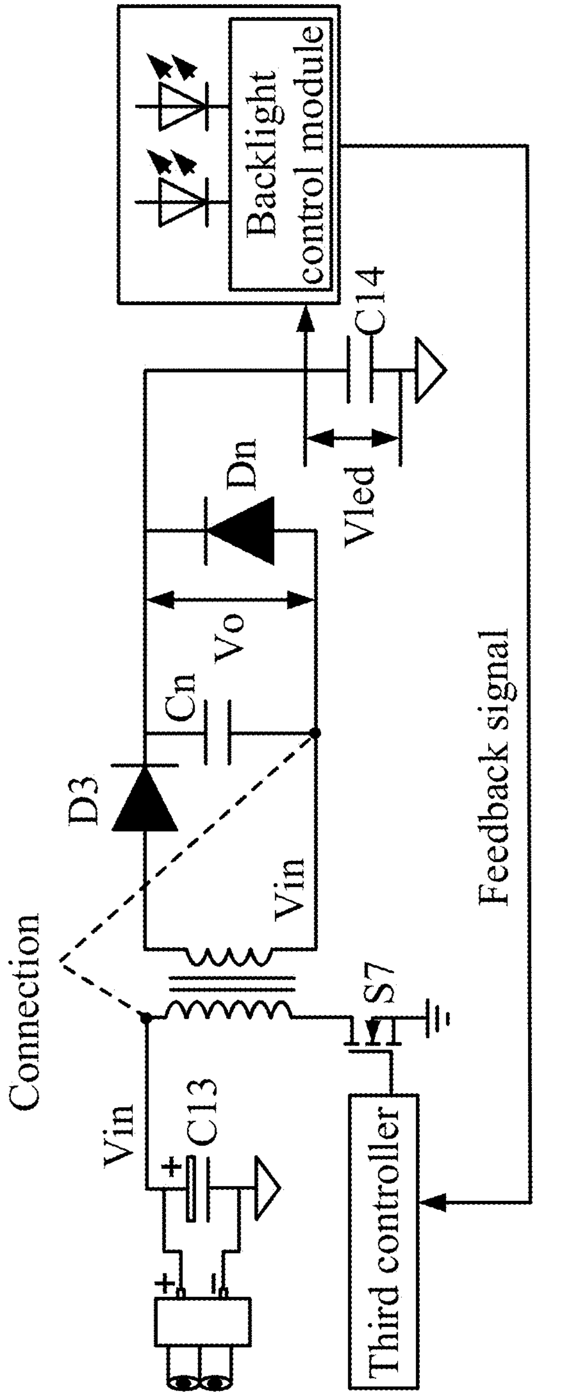
FIG. 43 is a schematic structural diagram of a filter module in a power supply circuit based on a flyback conversion module.

In some embodiments, FIG. 42 is a schematic structural diagram of a filter module in a power supply circuit based on a charge pump module provided in embodiments of the disclosure. FIG. 36 is taken as an example for the charge pump module, and the power supply principle will not be repeated here. In some embodiments, FIG. 43 is a schematic structural diagram of a filter module in a power supply circuit based on a flyback isolation voltage conversion module provided in embodiments of the disclosure. The flyback isolation voltage conversion module is shown in FIG. 39, as an example. By establishing a physical connection between the second end of the secondary winding and the first end of the primary winding, the DC input voltage Vin is applied to the second end of the secondary winding, and the power supply principle will not be repeated here.

Figure 44:
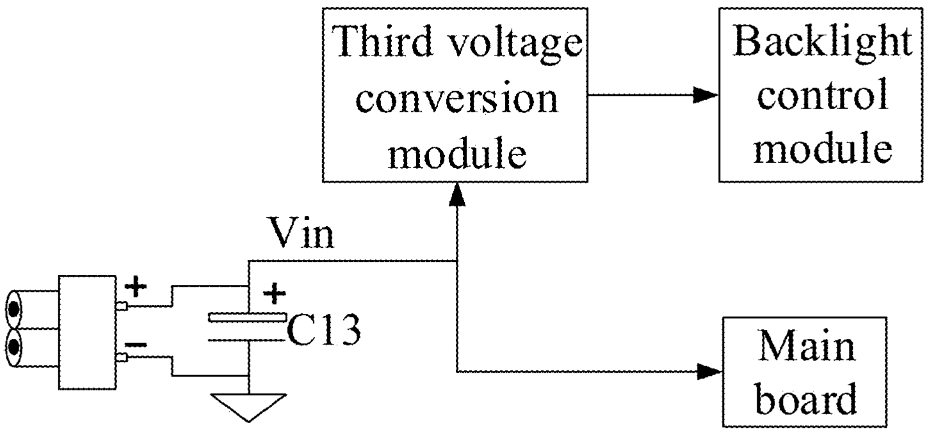
FIG. 44 is a third schematic diagram of a circuit for supplying power to a main board.

In some embodiments, the display apparatus provided in the embodiment can further include a main board. The main board is connected with the power supply interface. The DC input voltage is used for supplying power to the main board. FIG. 44 is a schematic structural diagram of a circuit for supplying power to a main board provided by embodiments of the disclosure. When the DC input voltage is equal to the required voltage of the main board, the main board can be directly powered by the DC input voltage.

Figure 45:
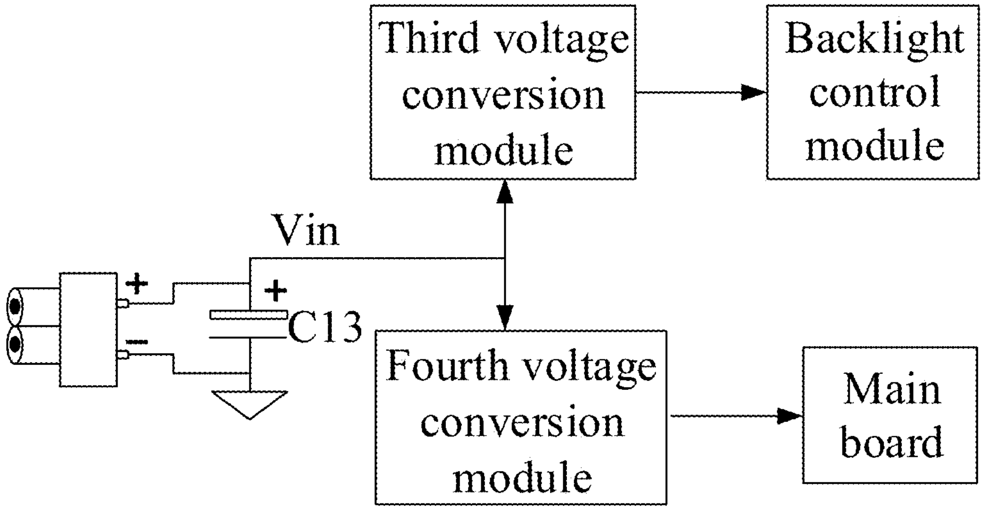
FIG. 45 is a fourth schematic diagram of a circuit for supplying power to a main board.

In some embodiments, the display apparatus provided in the embodiment can further include a fourth voltage conversion module. The fourth voltage conversion module is connected with the power supply interface and the main board, and can be configured to output a tenth voltage according to the DC input voltage. The tenth voltage is the required voltage of the main board. FIG. 45 is another schematic structural diagram of a circuit for supplying power to the main board provided by the embodiment of the disclosure. When the DC input voltage does not equal to the required voltage of the main board, the fourth voltage conversion module may be configured to perform DC-DC voltage conversion on the DC input voltage. When the power of the TV is high, in order to reduce the loss on the cable, the voltage is often increased and the current is reduced, so the DC input voltage will be higher than the required voltage of the main board. In some embodiments, since the main board generally requires a fixed voltage, the fourth voltage conversion module may use a buck circuit for stepping down voltage, a boost-buck circuit for stepping up/down voltage, and the like.

Embodiments of the disclosure further provide a display control method, applied to the display apparatus mentioned above. The method can include: receiving a feedback signal, where the feedback signal is generated by the backlight control module and sent by the feedback module; and adjusting a ninth voltage by adjusting an additional voltage according to the feedback signal. The ninth voltage is the required voltage of the backlight control module.

In embodiments of the disclosure, the additional voltage generated by the third voltage conversion module can be adjusted according to the feedback signal for the real-time current output from the backlight control module, to adjust the ninth voltage, so that the backlight module can work at the rated current, preventing the element damage due to too large current flow through the LED components in the LED string. The additional voltage serves as a “variable voltage”, and the tenth voltage serves as a “fixed voltage”. The superposition of the two allows the stepped power supply, which helps reduce thermal loss.

The display apparatus according to embodiments of the disclosure can include: a backlight control module configured to control LEDs to emit light, where the LEDs are configured to light up the panel of the display apparatus; a power supply interface configured to receive a DC input voltage provided by an external adaptor; a third voltage conversion module, configured to generate an additional voltage according to the DC input voltage, superpose the additional voltage and the DC input voltage and output a superposed ninth voltage which is a required voltage of the backlight control module; an energy storage element, having a first end connected with an output end of the third voltage conversion module and a second end connected with the DC input voltage, and configured to storage the additional voltage and coordinate with the third voltage conversion module to output the ninth voltage alternately; and a feedback module, configured to send the feedback signal generated by the backlight control module to the third voltage conversion module, where the feedback signal can be configured to instruct the third voltage conversion module to adjust the ninth voltage.

In the embodiments of the disclosure, a power supply interface for connecting the external adaptor is provided, and configured to receive the DC input voltage, to adapt with the external adaptor in the power supply mode. The additional voltage can be generated based on the DC input voltage, and can be combined with the DC input voltage to realize the stepped power supply, which helps reduce the thermal loss. The energy storage element can be used to realize continuous power supply for the backlight control module. The voltage supplied to the backlight control module can be adjusted in time based on a real-time feedback, allowing the LED to work stably.

It should be understood that the disclosure is not limited to the precise structure already described above and shown in the drawings, and can be modified and changed in various ways without departing from its scope. The scope of the disclosure is limited only by the appended claims.

What is claimed is:

1. A display apparatus, comprising: a transformer, a voltage conversion module, a feedback module, and a light string group;

wherein the voltage conversion module corresponds one-to-one with the light string group, and the light string group comprises a first light string and a second light string;

a first secondary coil and a second secondary coil of the transformer are coupled with a primary coil of the transformer; the first secondary coil is configured to output a first voltage according to a power received by the primary coil;

the second secondary coil is configured to output a second voltage from both ends of the second secondary coil alternately according to the power received by the primary coil; the second secondary coil corresponds one-to-one with the light string group;

the voltage conversion module is configured to generate an additional voltage according to the first voltage, and superimpose the additional voltage onto a corresponding second voltage at both ends of the second secondary coil to output a superimposed third voltage;

the feedback module is configured to generate a feedback signal based on an output current of the light string group and send the feedback signal to the voltage conversion module, wherein the feedback signal is configured to instruct the voltage conversion module to adjust the third voltage;

the first light string is connected with one corresponding end of the second secondary coil, the second light string is connected with the other corresponding end of the second secondary coil, and both are configured to emit light based on the third voltage.

2. The display apparatus according to claim 1, wherein the voltage conversion module comprises: a voltage adjustment module and a voltage superimposition module;

the voltage adjustment module is connected with an output end of the first secondary coil and configured to generate the additional voltage based on the first voltage;

the voltage superimposition module is configured to receive the additional voltage and is connected with both ends of the second secondary coil, and is configured to superimpose the additional voltage onto the corresponding second voltage at both ends of the second secondary coil and output the superimposed third voltage;

wherein the feedback signal is configured to instruct the voltage adjustment module to adjust the third voltage by adjusting the additional voltage.

3. The display apparatus according to claim 2, wherein the voltage superimposition module comprises a first current equalization capacitor, a first rectifier diode, a second rectifier diode, a third rectifier diode, and a fourth rectifier diode;

one end of the first current equalization capacitor is connected with the one end of the second secondary coil, and the other end of the first current equalization capacitor is connected with a positive electrode of the first rectifier diode and a negative electrode of the second rectifier diode;

a positive electrode of the second rectifier diode is provided with the additional voltage;

a negative electrode of the first rectifier diode is connected with a positive electrode of the first light string, and a negative electrode of the first light string is grounded;

a positive electrode of the third rectifier diode is connected with the other end of the second secondary coil and a negative electrode of the fourth rectifier diode;

a positive electrode of the fourth rectifier diode is provided with the additional voltage;

a negative electrode of the third rectifier diode is connected with a positive electrode of the second light string; and a negative electrode of the second light string is grounded.

4. The display apparatus according to claim 2, wherein the voltage adjustment module comprises: a second transistor, a third transistor, a second inductor, and a second capacitor;

one end of the second transistor is connected with an output end of the first secondary coil, and the other end of the second transistor is connected with one end of the third transistor and one end of the second inductor;

the other end of the third transistor is grounded;

the other end of the second inductor serves as an output end of the voltage adjustment module, outputting the additional voltage;

one end of the second capacitor is connected with the other end of the second inductor;

the other end of the second capacitor is grounded;

control electrodes of the second transistor and the third transistor are both connected with the feedback module and are configured to adjust switching frequencies of the second transistor and the third transistor based on the feedback signal to adjust the additional voltage.

5. The display apparatus according to claim 4, wherein the voltage adjustment module further comprises a second diode;

a negative electrode of the second diode is connected to the one end of the second capacitor, and a positive electrode of the second diode is connected to the other end of the second capacitor.

6. The display apparatus according to claim 1, further comprising a first switching circuit and a first grounding resistor;

wherein the first switching circuit is located between the light string group and the first grounding resistor;

one end of the first switching circuit is connected with a negative electrode of the first light string and a negative electrode of the second light string, and the other end of the first switching circuit is connected with one end of the first grounding resistor and an input end of the feedback module;

the other end of the first grounding resistor is grounded; and the first switching circuit is configured to be turned on or off based on a duty cycle control signal.

7. The display apparatus according to claim 1, further comprising: a second switching circuit and a second grounding resistor;

wherein the second switching circuit is located between the light string group and the second grounding resistor;

one end of the second switching circuit is connected with a negative electrode of the first light string and a negative electrode of the second light string, and the other end of the second switching circuit is connected with one end of the second grounding resistor;

the other end of the second grounding resistor is grounded; and the second switching circuit is configured to change a loop current for analog dimming.

8. The display apparatus according to claim 7, wherein the second switching circuit comprises: a fifth transistor and a comparator;

one end of the fifth transistor is connected with the negative electrode of the first light string and the negative electrode of the second light string, and the other end of the fifth transistor is connected with the one end of the second grounding resistor and an inverting input end of the comparator;

a non-inverting input end of the comparator is provided with a required voltage of the light string group, and an output end of the comparator is connected with a gate of the fifth transistor;

wherein a resistance of the fifth transistor is configured to be adjusted to change the loop current for analog dimming.

9. The display apparatus according to claim 1, wherein a plurality of second secondary coils, a plurality of voltage conversion modules, and a plurality of light string groups are provided;

the display apparatus further comprises a plurality of current equalization inductors;

wherein mutually-coupled current equalization inductors are provided between two adjacent ones of the plurality of second secondary coils.

10. The display apparatus according to claim 1, further comprising:

a backlight control module configured to control light emitting diodes to emit light, wherein the light emitting diodes is configured to light up the display panel of the display apparatus;

a power supply interface configured to receive a DC input voltage provided by an external adapter;

a first voltage conversion module configured to generate a fifth voltage according to the DC input voltage;

an energy storage element, connected with the first voltage conversion module and configured to store the fifth voltage, wherein the energy storage element and the first voltage conversion module alternately outputs the fifth voltage;

a negative electrode of the backlight control module is provided with the fifth voltage, wherein the fifth voltage serves as a negative reference voltage of the backlight control module; a positive electrode of the backlight control module is provided with the DC input voltage; a sum of an absolute value of the DC input voltage and an absolute value of the fifth voltage is equal to a required voltage of the backlight control module;

a feedback module configured to send a feedback signal generated by the backlight control module to the first voltage conversion module, wherein the feedback signal is configured to instruct the first voltage conversion module to adjust the fifth voltage to adjust the required voltage of the backlight control module.

11. The display apparatus according to claim 10, wherein the first voltage conversion module comprises: a charge pump module;

the charge pump module is configured to generate the fifth voltage in a charging state, and provide the fifth voltage to the negative electrode of the backlight control module in a discharging state;

a first end of the energy storage element is connected with a positive output end of the charge pump module and grounded; a second end of the energy storage element is connected with a negative output end of the charge pump module;

the energy element is configured to store the fifth voltage while the charge pump module being discharged, and provide the fifth voltage to the negative electrode of the backlight control module while the charge pump module being charged;

wherein the feedback signal is configured to instruct the charge pump module to adjust the fifth voltage to adjust the required voltage of the backlight control module.

12. The display apparatus according to claim 10, wherein the first voltage conversion module comprises: a flyback isolation voltage conversion module;

the flyback isolation voltage conversion module is configured to generate the fifth voltage via a secondary winding while a primary winding is conducting, and deliver the fifth voltage to the negative electrode of the backlight control module;

a first end of the energy storage element is connected with a positive output end of the flyback isolation voltage conversion module and grounded; a second end of the energy storage element is connected with a negative output end of the flyback isolation voltage conversion module; the energy storage element is configured to store the fifth voltage while a conducting path is formed in the primary winding, and provide the negative electrode of the backlight control module with the fifth voltage while the primary winding is cut off;

wherein the feedback signal is configured to instruct the flyback isolation voltage conversion module to adjust the fifth voltage to adjust the required voltage of the backlight control module.

13. The display apparatus according to claim 11, wherein the charge pump module comprises: a first controller, a first energy storage capacitor, a first switch, a second switch, a third switch, and a fourth switch;

a first end of the first switch is provided with the DC input voltage, a second end of the first switch is connected with a first end of the second switch; a second end of the second switch serves as a positive output end of the charge pump module, and is connected with the first end of the energy storage element and grounded;

a first end of the first energy storage capacitor is connected with the second end of the first switch and the first end of the second switch, and a second end of the first energy storage capacitor is connected with a first end of the third switch and a first end of the fourth switch; a second end of the fourth switch is grounded;

a second end of the third switch serves as a negative output end of the charge pump module, is connected with the second end of the energy storage element, and is configured to output the fifth voltage;

the first controller is connected with control ends of the first switch, the second switch, the third switch, and the fourth switch, and is configured to control switching frequencies of the first switch, the second switch, the third switch, and the fourth switch according to the feedback signal to adjust the fifth voltage;

wherein switching states of the first switch and the second switch are different, the first switch and the fourth switch are turned off or turned on simultaneously, and the second switch and the third switch are turned off or turned on simultaneously.

14. The display apparatus according to claim 12, wherein the flyback isolation voltage conversion module comprises: the primary winding, the secondary winding, a first diode, a second controller, and a fifth switch;

a first end of the primary winding is provided with the DC input voltage, a second end of the primary winding is connected with a first end of the fifth switch, and a second end of the fifth switch is grounded;

the secondary winding is coupled to the primary winding, and a first end of the secondary winding is connected with a positive electrode of the first diode; a negative electrode of the first diode serves as a positive output end of the flyback isolation voltage conversion module and is connected with the first end of the energy storage element and grounded;

a second end of the secondary winding serves as a negative output end of the flyback isolation voltage conversion module, is connected with the second end of the energy storage element, and is configured to output the fifth voltage;

the second controller is connected with a control end of the fifth switch, and is configured to adjust the fifth voltage by controlling a switching frequency of the fifth switch according to the feedback signal.

15. The display apparatus according to claim 11, wherein the feedback module comprises a level conversion circuit;

the level conversion circuit is configured to receive a first feedback signal output from the backlight control module, convert the first feedback signal into a second feedback signal, and output the second feedback signal to the first voltage conversion module;

wherein reference voltages of the first feedback signal and the second feedback signal are different.

16. The display apparatus according to claim 10, further comprising: a second diode;

a positive electrode of the second diode is connected with the second end of the energy storage element, and a negative electrode of the second diode is connected with the first end of the energy storage element.

17. The display apparatus according to claim 10, further comprising: a main board;

the main board is connected with the power supply interface, and the DC input voltage is used for supplying power to the main board.

18. The display apparatus according to claim 17, further comprising a second voltage conversion module;

wherein the second voltage conversion module is connected with the power supply interface and the main board, and is configured to output a sixth voltage according to the DC input voltage;

wherein the sixth voltage is a required voltage of the main board.

19. The display apparatus according to claim 1, further comprising:

a backlight control module configured to control the light emitting diodes to emit light, wherein the light emitting diodes is configured to light up the display panel of the display apparatus;

a power supply interface configured to receive a DC input voltage provided by an external adapter;

a third voltage conversion module configured to generate an additional voltage according to the DC input voltage, superimpose the additional voltage and the DC input voltage, and output a superimposed ninth voltage; wherein the ninth voltage is a required voltage of the backlight control module;

an energy storage element comprising a first end of connected with the third voltage conversion module and a second end provided with the DC input voltage, and configured for storing the superimposed voltage; wherein the third voltage conversion module and the energy storage element alternately output the ninth voltage;

a feedback module configured to send a feedback signal generated by the backlight control module to the third voltage conversion module, wherein the feedback signal is configured to instruct the third voltage conversion module to adjust the ninth voltage.

20. The display apparatus according to claim 19, wherein the third voltage conversion module comprises: a charge pump module;

the charge pump module is configured to: in a charging state, generate an additional voltage;

and in a discharging state, superimpose the additional voltage and the DC input voltage, and output a superimposed ninth voltage to the backlight control module;

the first end of the energy storage element is connected with an output end of the charge pump module; the energy storage element is configured to store the superimposed voltage while the charge pump module being discharged, and superimpose the additional voltage and the DC input voltage while the charge pump module being charged, and output the superimposed ninth voltage to the backlight control module;

wherein the feedback signal is configured to instruct the charge pump module to adjust the ninth voltage by adjusting the additional voltage.

* * * * *